United States Patent
Hadrup et al.

(10) Patent No.: US 12,497,592 B2
(45) Date of Patent: Dec. 16, 2025

(54) SCAFFOLDS WITH STABILIZED MHC MOLECULES FOR IMMUNE-CELL MANIPULATION

(71) Applicant: Danmarks Tekniske Universitet, Kgs. Lyngby (DK)

(72) Inventors: Sine Reker Hadrup, Virum (DK); Søren Nyboe Jakobsen, Charlottenlund (DK); Sunil Kumar Saini, Bagsværd (DK)

(73) Assignee: Danmarks Tekniske Universitet, Ks. Lyngby (DK)

( * ) Notice: Subject to any disclaimer, the term of this patent is extended or adjusted under 35 U.S.C. 154(b) by 1182 days.

(21) Appl. No.: 17/056,157

(22) PCT Filed: Jun. 19, 2019

(86) PCT No.: PCT/EP2019/066286
§ 371 (c)(1),
(2) Date: Nov. 17, 2020

(87) PCT Pub. No.: WO2019/243463
PCT Pub. Date: Dec. 26, 2019

(65) Prior Publication Data
US 2023/0138095 A1    May 4, 2023

(30) Foreign Application Priority Data
Jun. 20, 2018  (EP) ................... 18178769

(51) Int. Cl.
| | | |
|---|---|---|
| C12N 5/0783 | (2010.01) | |
| A61K 39/00 | (2006.01) | |
| A61K 40/11 | (2025.01) | |
| A61K 40/42 | (2025.01) | |
| A61P 17/00 | (2006.01) | |
| A61P 35/00 | (2006.01) | |

(52) U.S. Cl.
CPC ............ *C12N 5/0636* (2013.01); *A61K 40/11* (2025.01); *A61K 40/42* (2025.01); *A61P 17/00* (2018.01); *A61P 35/00* (2018.01); *A61K 2039/876* (2018.08); *A61K 2239/31* (2023.05); *A61K 2239/57* (2023.05); *C12N 2501/2302* (2013.01); *C12N 2501/2315* (2013.01); *C12N 2501/2321* (2013.01); *C12N 2501/50* (2013.01)

(58) Field of Classification Search
CPC ................................. A61P 17/00; A61P 35/00
See application file for complete search history.

(56) References Cited

U.S. PATENT DOCUMENTS

| | | | |
|---|---|---|---|
| 9,494,588 | B2 | 11/2016 | Springer et al. |
| 2011/0318380 | A1 | 12/2011 | Brix et al. |
| 2014/0162293 | A1* | 6/2014 | Springer .......... C07K 14/70539 435/325 |
| 2016/0051698 | A1 | 2/2016 | Schneck et al. |

FOREIGN PATENT DOCUMENTS

| | | | |
|---|---|---|---|
| CN | 101448951 A | 6/2009 | |
| CN | 105431523 A | 3/2016 | |
| EP | 1377609 B1 | 6/2015 | |
| EP | 2711418 B1 | 8/2017 | |
| GB | 2398300 A * | 8/2004 | ....... C07K 14/70539 |
| WO | WO 02/072631 A1 | 9/2002 | |
| WO | WO 2004/006951 A1 | 1/2004 | |
| WO | WO 2009/003492 A1 | 1/2009 | |
| WO | WO 2009/094273 A2 | 7/2009 | |
| WO | WO 2017/161092 A1 | 9/2017 | |
| WO | WO 2018/170168 A1 | 9/2018 | |

OTHER PUBLICATIONS

Rosenberg et al. Clin Cancer Res. 2011; 17(13): 4550-7. (Year: 2011).*
Abuwatfa et al. Scaffold-based 3D cell culture models in cancer research. Journal of Biomedical Science. 2024; 31:7, p. 1-39. (Year: 2024).*
Andersen, Rikke Sick et al., "Dissection of T-cell Antigen Specificity in Human Melanoma" Cancer Research, Apr. 2012, pp. 1642-1650, vol. 72.
Barrett, David M. et al., "Relation of clinical culture method to T cell memory status and efficacy in xenograft models of adoptive immunotherapy" Cytotherapy, May 2014, pp. 619-630, vol. 16, No. 5.
Brimnes, Marie Klinge et al., "Generation of autologous tumor-specific T cells for adoptive transfer based on vaccination, in vitro restimulation and CD3/CD28 dynabead-induced T cell expansion" Cancer Immunol Immunother, 2012, pp. 1221-1231, vol. 61.
Bruns, Heiko et al., "CD47 enhances in vivo functionality of artificial antigen-presenting cells" Clin Cancer Res., May 2015, pp. 2075-2083, vol. 21, No. 9.
Buchholz, Veit R. et al., "The origin of diversity: studying the evolution of multi-faceted CD8+ T cell responses" Cell. Mol. Life Sci., 2012, pp. 1585-1595, vol. 69.

(Continued)

*Primary Examiner* — James D Schultz
*Assistant Examiner* — Jianjian Zhu
(74) *Attorney, Agent, or Firm* — KNOBBE, MARTENS, OLSON & BEAR, LLP

(57) ABSTRACT

The present invention relates to artificial antigen presenting cell (aAPC) scaffolds to provide cells with specific functional stimulation to obtain phenotypic and functional properties ideal to mediate tumor regression or viral clearance. In particular, the scaffolds of the present invention comprise stabilized MHC class I molecules comprising a heavy chain comprising an alpha-1 domain and an alpha-2 domain connected by a disulfide bridge, wherein said MHC class I molecules are free of antigenic peptide. The scaffolds can be loaded with antigenic peptide on demand, providing an agile platform for effective expansion and functional stimulation of specific T cells in a peptide-MHC-directed fashion.

16 Claims, 11 Drawing Sheets

Specification includes a Sequence Listing.

(56) References Cited

OTHER PUBLICATIONS

Graef, Patricia et al., "Serial Transfer of Single-Cell-Derived Immunocompetence Reveals Stemness of CD8+ Central Memory T Cells" Immunity, Jul. 2014, pp. 116-126, vol. 4.
Hein, Zeynep et al., "Peptide-independent stabilization of MHC class I molecules breaches cellular quality control" Journal of Cell Science, 2014, pp. 2885-2897, vol. 127.
Huarte, Eduardo et al., "Ex vivo expansion of tumor specific lymphocytes with IL-15 and IL-21 for adoptive immunotherapy in melanoma" Cancer Lett., Nov. 2019, pp. 80-88, vol. 285, No. 1.
Perica, Karlo et al., "Linking form to function: Biophysical aspects of artificial antigen presenting cell design" Biochimica et Biophysica Acta, 2015, pp. 781-790, vol. 1853.
Poschke, I. et al., "Tumor-induced changes in the phenotype of blood-derived and tumor-associated T cells of early stage breast cancer patients" Int. J. Cancer, 2012, pp. 1611-1620, vol. 131.
Radvanyi, Laszlo G. et al., "Specific lymphocyte subsets predict response to adoptive cell therapy using expanded autologous tumor-infiltrating lymphocytes in metastatic melanoma patients" Clin Cancer Res., Dec. 2012, pp. 6758-6770, vol. 18, No. 24.
Rapoport, Aaron P. et al., "Rapid Immune Recovery and GVHD-like Engraftment Syndrome Following Adoptive Transfer of Costimulated Autologous T Cells" Clin Cancer Res., Jul. 2009, pp. 4499-4507, vol. 15, No. 13.
Rasmussen VM, et al., "Peptide-MHC-directed expansion of multifunctional antigen-responsive T cells", Annals of Oncology, Dec. 2017, pp. xi20, vol. 28, No. Supplement 11.
Rosenberg, Steven A. et al., "Adoptive cell transfer as personalized immunotherapy for human cancer" Science, Apr. 2015, pp. 62-68, vol. 348, No. 6230.
Toebes M. et al., "Design and use of conditional MHC class I ligands", Nature Medicine, Mar. 2006, pp. 246-251, vol. 12.
Wu, Fenglin et al., "Human effector T cells derived from central memory cells rather than CD8+T cells modified by tumor-specific TCR gene transfer possess superior traits for adoptive immunotherapy" Cancer Letter, 2013, pp. 195-207, vol. 339.
Yu, Xia et al., "Artificial antigen-presenting cells plus IL-15 and IL-21 efficiently induce melanoma-specific cytotoxic CD8+CD28+ T lymphocyte responses" Asian Pacific Journal of Tropical Medicine, 2013, pp. 467-472.
Zhou, Johua et al., "Persistence of Multiple Tumor-Specific T-Cell Clones Is Associated with Complete Tumor Regression in a Melanoma Patient Receiving Adoptive Cell Transfer Therapy" J Immunother., 2005, pp. 53-62, vol. 28, No. 1.
International Search Report for PCT/EP2019/066286 dated Aug. 21, 2019.

\* cited by examiner

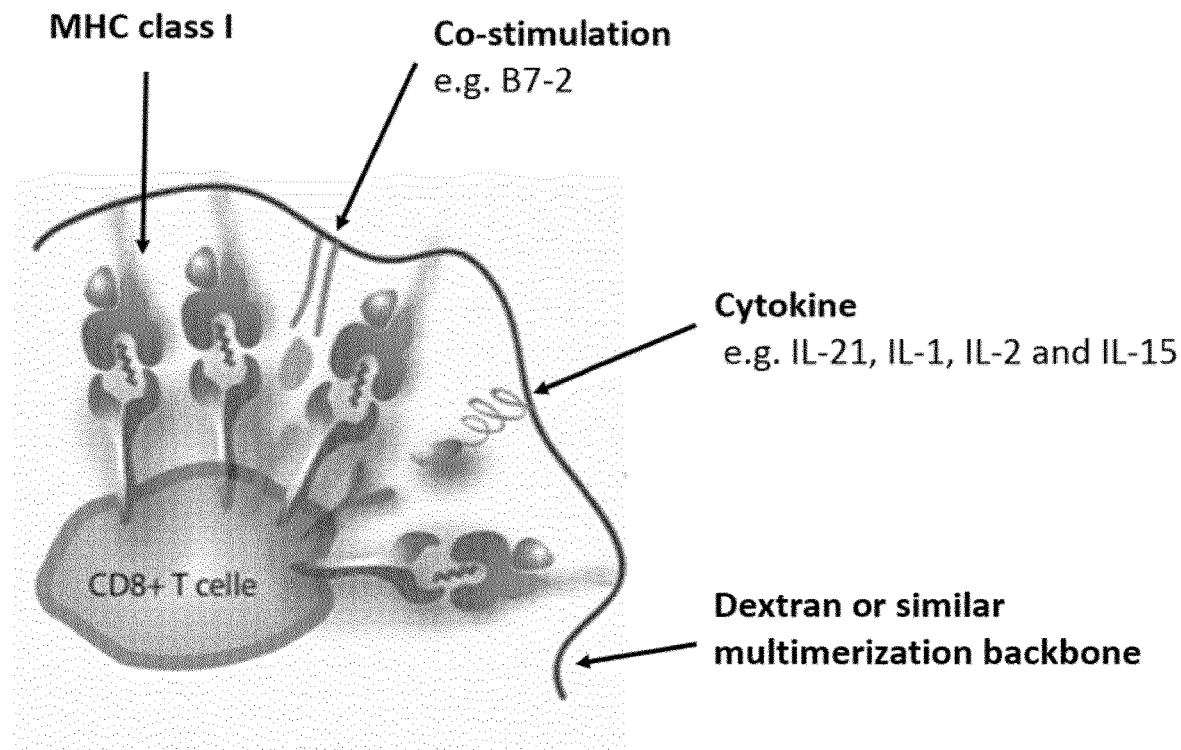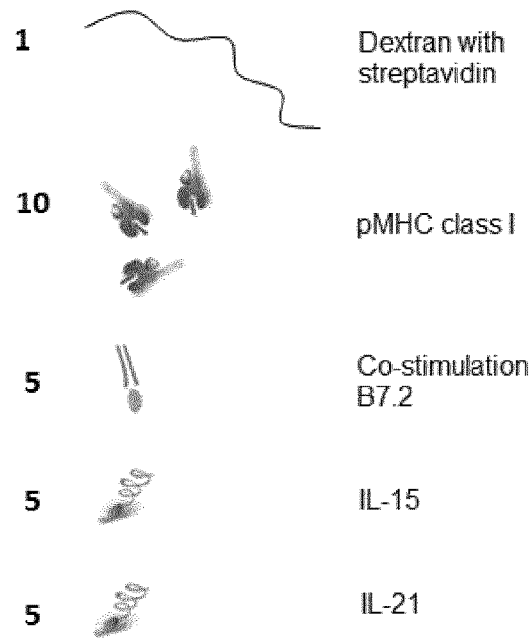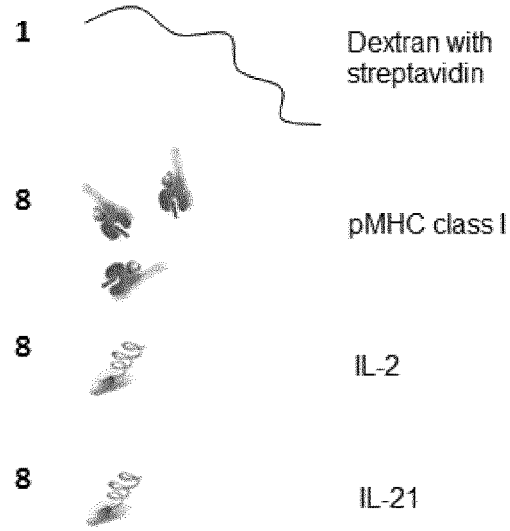
Fig. 1A

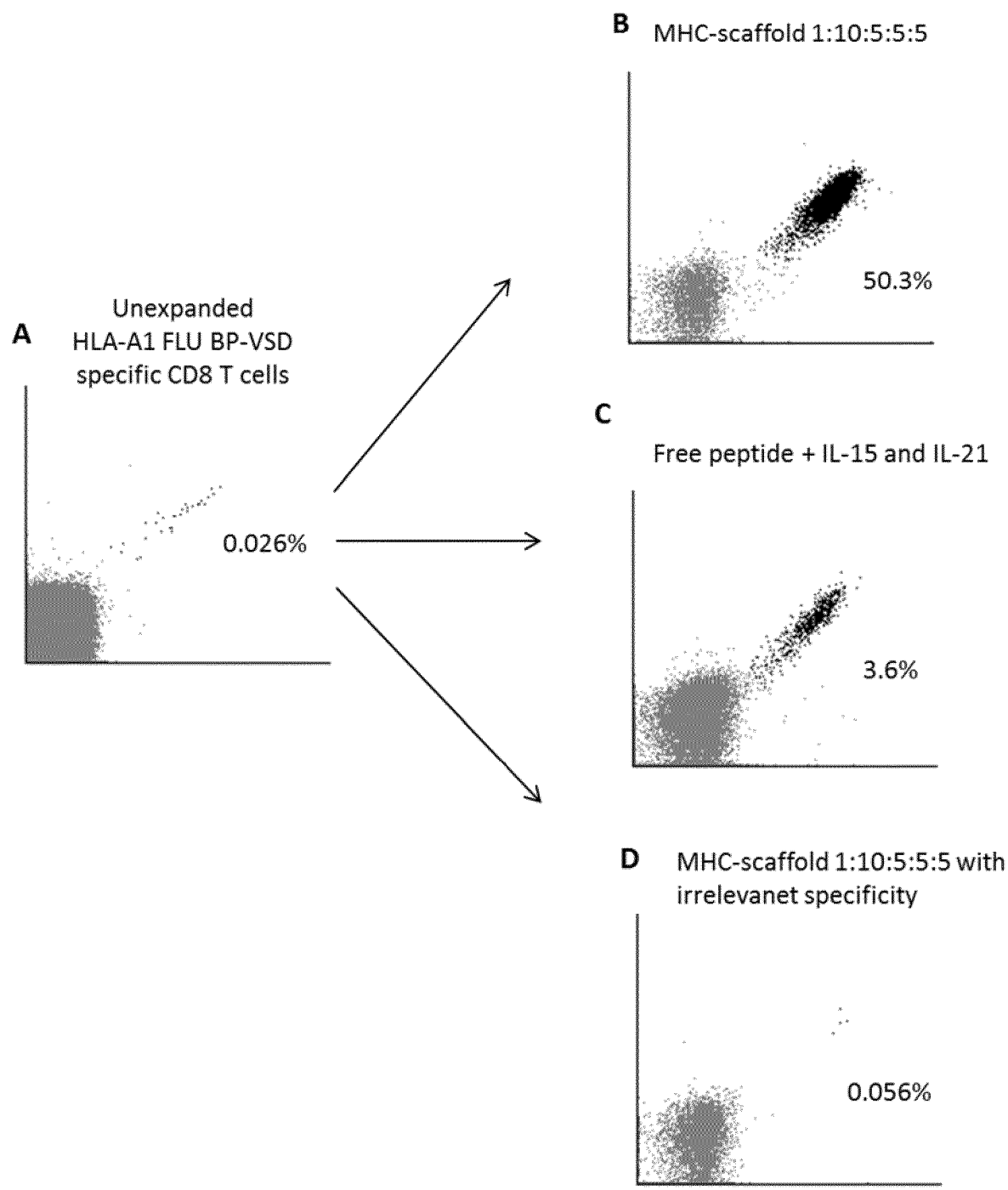
Fig. 2A-D

E
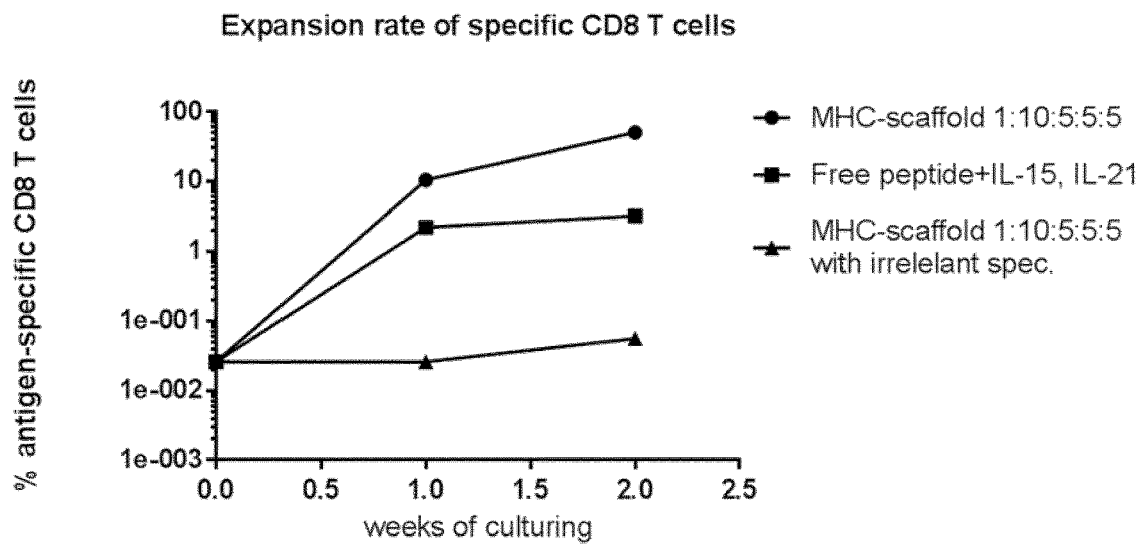
F
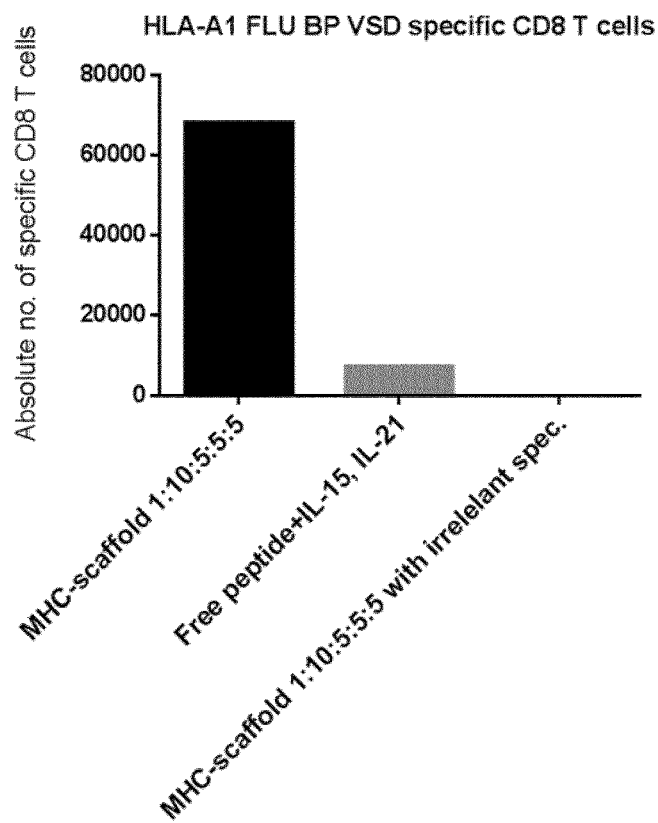
Fig. 2E-F

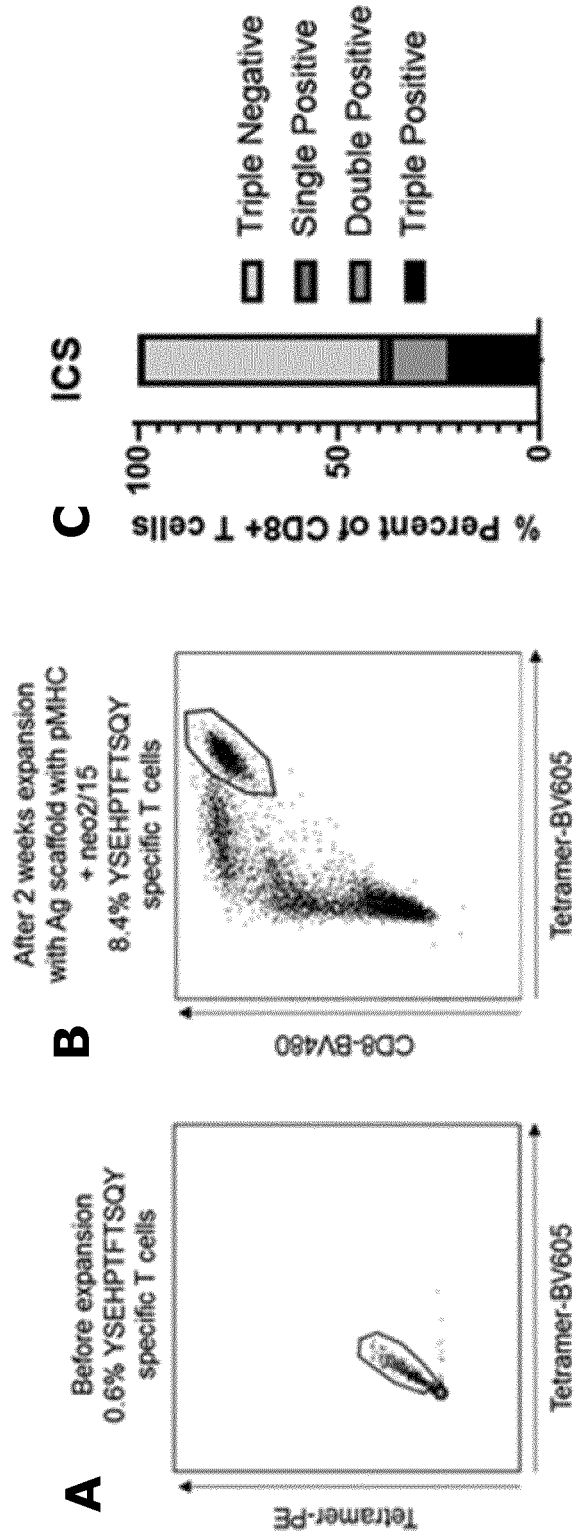
Fig. 9A-C

SCAFFOLDS WITH STABILIZED MHC MOLECULES FOR IMMUNE-CELL MANIPULATION

CROSS REFERENCE TO RELATED APPLICATIONS

This application is a U.S. National Phase Application of PCT International Application Number PCT/EP2019/066286, filed on Jun. 19, 2019, designating the United States of America and published in the English language, which is an International Application of and claims the benefit of priority to European Patent Application No. 18178769.8, filed on Jun. 20, 2018. The disclosures of the above-referenced applications are hereby expressly incorporated by reference in their entireties.

REFERENCE TO SEQUENCE LISTING

A Sequence Listing submitted as an ASCII text file via EFS-Web is hereby incorporated by reference in accordance with 37 U.S.C. § 1.52 (e). The name of the ASCII text file for the Sequence Listing is SeqList-PLOUG39-085APC.txt, the date of creation of the ASCII text file is Nov. 3, 2020, and the size of the ASCII text file is 48 KB.

TECHNICAL FIELD OF THE INVENTION

The present invention relates to artificial antigen presenting cell (aAPC) scaffolds to provide cells with specific functional stimulation to obtain phenotypic and functional properties ideal to mediate tumor regression or viral clearance. In particular, the scaffolds of the present invention comprise stabilized MHC class I molecules free of antigenic peptide. The scaffolds can be loaded with antigenic peptide on demand, providing an agile platform for effective expansion and functional stimulation of specific T cells in a peptide-MHC-directed fashion.

BACKGROUND OF THE INVENTION

The immunotherapeutic approach adoptive cell transfer (ACT), in which tumor-reactive T cells from peripheral blood (PBMC) or tumor infiltrating lymphocytes (TILs) are extracted from a patient, activated and expanded ex vivo, and subsequently given back to the patient, has in malignant melanoma studies showed clinical durable responses in more than 50% of patients. However, the expansion of tumor-reactive T cells from PBMCs or TILs requires extensive ex vivo culturing often at the cost of T cell differentiation and functional capacity. As a result, the transferred T cell product may not contain a sufficient frequency of tumor-reactive CD8 T cells with the appropriate phenotypic and functional characteristics to mediate tumor regression. Furthermore, the majority of such tumor infiltrating T cells may not be tumor specific but rather bystander infiltration of T cells from the periphery, with a T cell receptor (TCR) recognition not matching any tumor antigens. Finally, the fraction of tumor-reactive T cells may have a reduced growth potential due to the suppressive environment present at the tumor site.

Attempts have been made to utilize artificial antigen presenting cells (aAPCs) to overcome the problem of insufficient differentiation and functional capacity of the expanded T cells. The simple concept behind aAPCs is that they mimic the natural interaction between the TCR and the specific antigenic peptide presented by the major histocompatibility complex (MHC). This interaction is the core step in generation of immunity through activation, expansion and differentiation of T cells that are capable of eliciting an efficient immune response. The natural generation of a T cell response is further aided by T cell affecting molecules, such as cytokines and co-stimulatory molecules, which serves to induce T cell activation and function. Thus, incorporation of all the necessary molecules into a single aAPC scaffold is a promising tool to overcome some of the challenges of expansion of T cells. The aAPCs form the ideal immunological synapse for T cell activation and differentiation. However, a crucial challenge is the uncovering of combinations of molecules enabling the aAPCs to efficiently expand the extracted TILs while also maintaining a functional phenotype.

In WO2002072631 are disclosed many concepts of utilizing MHC platforms, wherein one of them is a MHC construct comprising a carrier molecule having attached thereto one or more MHC molecules. The construct may also contain biologically active molecules such as co-stimulatory molecules or cell modulating molecules. The MHC construct is envisioned amongst others to be used for expansion of cells recognizing the construct and used to generate a therapeutic composition for use in treatment of disease, such as cancer and others. WO2002072631 discloses many co-stimulatory molecules and cytokines that may be suitable for T cell expansion, but fails to identify any specific combinations particularly suitable and effective for the purpose of expansion of T cells.

US 2011/318380 disclose application of the MHC construct described in WO2002072631 for cancer vaccines and immune monitoring. However, US 2011/318380 do not exemplify any specific combinations of co-stimulatory molecules and cytokines particularly suitable and effective for the purpose of expansion of T cells.

WO2009003492 is mainly focused on detection of antigen specific T cells, but also discloses the expansion of antigen specific T cells. Described therein is MHC multimers with and without complexed peptides, methods for their preparation and methods for their use in analysis and therapy, including isolation of antigen specific T-cells capable of inactivation or elimination of undesirable target T-cells. The MHC multimers according to WO2009003492 may comprise a dextran scaffold and co-stimulatory- and cell modulating molecules. However, the disclosure fails to pinpoint specific combinations of molecules especially effective for the purpose of expansion of T cells.

In WO2009094273 is disclosed an aAPC composition comprising nanoparticles, cytokines, coupling agents, T cell receptor activators and co-stimulatory molecules for use to expand antigen-specific T cells. The T cell receptor activator may be an MHC molecule bound to an antigenic peptide. Furthermore, the use of the expanded T cells in adoptive immunotherapy is described. However, only the suitability of a single cytokine on an aAPC, namely IL-2, is explored and only in comparison with the exogenous cytokine.

Thus, common for the previous disclosures of aAPC scaffolds is that they only describe the concept in a largely generic manner. Since the success criteria for T cell expansion, i.e. high ratio of active T cells, high antigen specificity of the T cells and high functionality of the T cells, is only met when specific combinations of stimulatory molecules are combined, a great need for well-defined and effective aAPC scaffolds exists. Only when all of the three success criteria for T cell expansion is fulfilled will the resulting population of T cells be optimally prepared to apply their antitumor or antiviral functions.

Another limitation of known aAPC scaffold is their inefficient and inflexible production, which is not aligned with the demand for high-throughput platforms to accelerate development of new immunotherapies. The major bottleneck in the preparation of aAPC scaffolds is caused by the requirement of MHC molecules for antigenic peptide presentation. Briefly, the refolding process of MHC molecules is complicated by the fact that the heavy chain cannot fold to its native state in the absence of β2-microglobulin (β2M) and antigenic peptide. Therefore, empty MHC class I molecules are highly unstable and prone to aggregation. Hence every peptide-MHC combination desired for T cell stimulations, requires an independently production line. This is problematic because the landscape of antigenic peptides is extremely broad, with an estimated range of 200.000 peptides efficiently presented per HLA molecule per patient and the MHC class I molecules is very diverse, with more than 12.000 known MHC class I molecules existing. Furthermore, the choice of antigenic peptides of relevance in a given context depends on the disease of interests, the MHC profile of the patient and the available T cell repertoire. Thus, the current one production line that can generate only one antigenic peptide specific aAPC scaffold, makes it virtually impossible to comply with the huge antigenic peptide diversity, and the challenge of covering the broad array of possible antigenic peptide and MHC molecule combinations utilizing conventional individualized aAPC production techniques.

Recombinant MHC class I molecules is produced in e.g. bacteria to form insoluble inclusion bodies. Previously, these inclusion bodies are then denatured in a solution of a chaotropic agent followed by removal of the chaotropic agent (e.g. by renaturation and refolding) in the presence of the specific antigenic peptide of interest, resulting in formation of a pMHC complex. The pMHC complex is then purified from unfolded protein by gel filtration chromatography. This is a laborious and inefficient technique that only produce one type of pMHC.

Inefficient production of MHC molecules have been sought solved by production of MHC molecules with an intermediate peptide, which subsequent to refolding of the MHC molecule is replaced with the antigenic peptide of interest. This technique is known as MHC peptide exchange. However, the exchange rate is not 100% and the loss of the exchangeable peptide may lead to a substantial loss of MHC molecules (up 50%) that is not available for new peptide binding. Furthermore, this production method is time consuming and typically peptide exchange occur at the MHC monomer stage making the technology unsuitable for use with larger scaffolds. The above mentioned limitations provides lack of control for stoichiometry for aAPC scaffold assembly and challenges related to variable product stability, dependent on the pMHC molecule in place.

Yet another limitation of current aAPC scaffold technologies comprising pMHC is the inherent instability of the major histocompatibility complex which is known to have an antigenic peptide dependent lifetime. The instability of pMHC limits the window in which pMHC remains fully functional and thus useful for assembling functional aAPC scaffolds. Also the instability of the pMHC complex limits the time an assembled aAPC complex can remain fully functional and capable of efficiently and antigen-specifically stimulating CD8 T cells.

In U.S. Pat. No. 9,494,588, the provision of empty MHC class I molecules that can be loaded with antigenic peptide subsequent to folding of the MHC class I molecule has been proposed as a convenient method for producing any antigen specific MHC class I molecule from a single production line. However, whether this methodology is applicable for use with a large aAPC scaffold is purely speculative and is not disclosed. E.g. their ability to interact with T cells with similar antigen-specific interaction properties as wt MHC molecules has not been demonstrated. Furthermore, it is unclear whether the introduced mutation may structurally affect the TCR-pMHC interactions. And similarly, the functionality of this modified interaction has not been described.

Hence, improved aAPC scaffolds for high-throughput setups would be advantageous. In particular, the provision of aAPC scaffolds that can be produced in advance and loaded with antigenic peptide on demand to expand and stimulate T cell populations thereby yielding a high ratio of active T cells, high antigen specificity of the T cells and high functionality of the T cells would be favourable.

SUMMARY OF THE INVENTION

Thus, an object of the present invention relates to the provision of artificial antigen presenting cell (aAPC) scaffolds with improved capabilities for expansion of tumor-reactive T cells extracted from peripheral blood (PBMC) or tumor infiltrating lymphocytes (TILs).

Another object of the present invention is to provide a more user-friendly and high-throughput platform for generation of a large library of improved aAPCs presenting different antigenic peptides.

Further, the production of large batches of quality assured aAPC scaffolds would better serve the increasing requirements from regulatory authorities for quality assurance. Here we can provide an 'off the shelf' solution for the production challenge, with one large batch of quality controlled aAPC scaffolds, available for antigenic peptide loading at the site of the end-user. This would be an ideal solution to the increasing number of highly personalized immunotherapeutic protocols where patient tumors are sequenced to identify tumor mutations to predict cancer-specific peptide antigens. Such antigenic peptides could be envisioned to be directly loaded into ready-made antigenic peptide receptive aAPC scaffolds.

In particular, it is an object of the present invention to provide an aAPC scaffold that solves the above mentioned problems of the prior art of insufficient T cell differentiation and functional capacities of the expanded T cell population.

Another object of the present invention is to utilize the obtained expanded T cell populations with optimized phenotypic and functional properties to mediate tumor regression or viral clearance.

Thus, one aspect of the invention relates to an artificial antigen presenting cell (aAPC) scaffold comprising a polymeric backbone to which are attached the following template molecules:
  i. at least one T cell affecting molecule, and
  ii. at least one MHC class I molecule,
wherein the MHC class I molecule comprises a heavy chain comprising an alpha-1 domain and an alpha-2 domain connected by a disulfide bridge.

Another aspect of the present invention relates to a method for simultaneous in vitro stimulation and expansion of T cells, comprising the following steps:
  i. providing a sample comprising T cells,
  ii. contacting said sample with an expansion solution comprising an aAPC scaffold according to the present invention,
  iii. stimulating and expanding T cells with specificity for said aAPC scaffold in culture, and iv. harvesting the T cells of step iii) from the culture to obtain an expanded antigen-specific population of T cells.

A further aspect of the present invention is to provide an expanded T cell population obtained by the method according to the present invention.

Yet another aspect of the present invention relates to an expanded T-cell population obtained by the method according to present invention for use as a medicament.

Still another aspect of the present invention is to provide an expanded T-cell population obtained by the method according to the present invention for use in the treatment of a cancer or viral condition.

An even further aspect of the present invention is to provide a kit for expansion of T cells, the kit comprising:
i. a first storage means comprising at least one aAPC scaffold according to the present invention, and
ii. a second storage means comprising at least one antigenic peptide, wherein the contents of the first storage means and the second storage means are configured to be combined.

BRIEF DESCRIPTION OF THE FIGURES

FIG. 2 shows (A) Frequency of HLA-A1 FLU BP-VSD specific CD8 T cells from a healthy donor detected directly ex vivo with PE (X-axis) and APC (Y-axis) labeled tetramers. (B) Frequency of HLA-A1 FLU BP-VSD specific CD8 T cells after two weeks culturing with antigen presenting scaffolds with either the ratio 1:10:5:5:5 (scaffold:pMHC:B7-2:IL-15:IL-21), plus 20 IU/ml IL-2 added in the culture media, (C) free FLU BP-VSD peptide, IL-15, and IL-21, or (D) Antigen presenting scaffold with the ratio 1:10:5:5:5 carrying an irrelevant peptide specificity. (E) Expansion rate based on frequency of HLA-A1 FLU BP-VSD specific CD8 T cells, detected by tetramer staining from baseline, 1 week and 2 weeks after expansion. (F) Absolute number of HLA-A1 FLU BP-VSD specific CD8 T cells after 2 weeks expansion.

FIG. 5A, baseline frequency of HLA-A*02:01 CMV pp65 NLVPMVATV specific CD8 T cells (in % of total CD8 T cells determined by pMHC specific double positive tetramers). FIG. 5B, compares HLA-A*02:01 CMV pp65 NLVPMVATV specific CD8 T cells expanded for 10 days and quantified using pMHC specific PE tetramers across post assembly peptide-antigen loaded aAPC with Cys-mutant MHC, pre-loaded aAPC with Cys-mutant MHC, and pre-loaded aAPC with wild type MHC.

FIG. 9 shows expansion of CD8 T cells following stimulation with HLA-A*01:01 CMV pp65 YSEHPTFTSQY peptide (SEQ ID NO: 30). (A) Identification of HLA-A*01:01 CMV pp65 YSEHPTFTSQY specific CD8 T cells from peripheral blood, using MHC tetramers labelled with the fluorescent markers PE and BV605, respectively. The plot is pregated on CD8 T cells. (B) The population of HLA-A*01:01 CMV pp65 YSEHPTFTSQY specific CD8 T cells after 2 weeks expansion using the neo2/15+pMHC Ag scaffold. Depicted is the CD8 T cells (Y-axes) and the MHC tetramers positive T cells labelled BV605 (x-axes). The population is enhanced from 0.6% of HLA-A*01:01 CMV pp65 YSEHPTFTSQY specific CD8 T cells out of total CD8 T cells before to 8.4% after expansion. (C) Capacity of the HLA-A*01:01 CMV pp65 YSEHPTFTSQY specific CD8 T cells to respond to antigen exposure. 40% of all T cell respond with multi cytokine secretion.

Figure 1B:
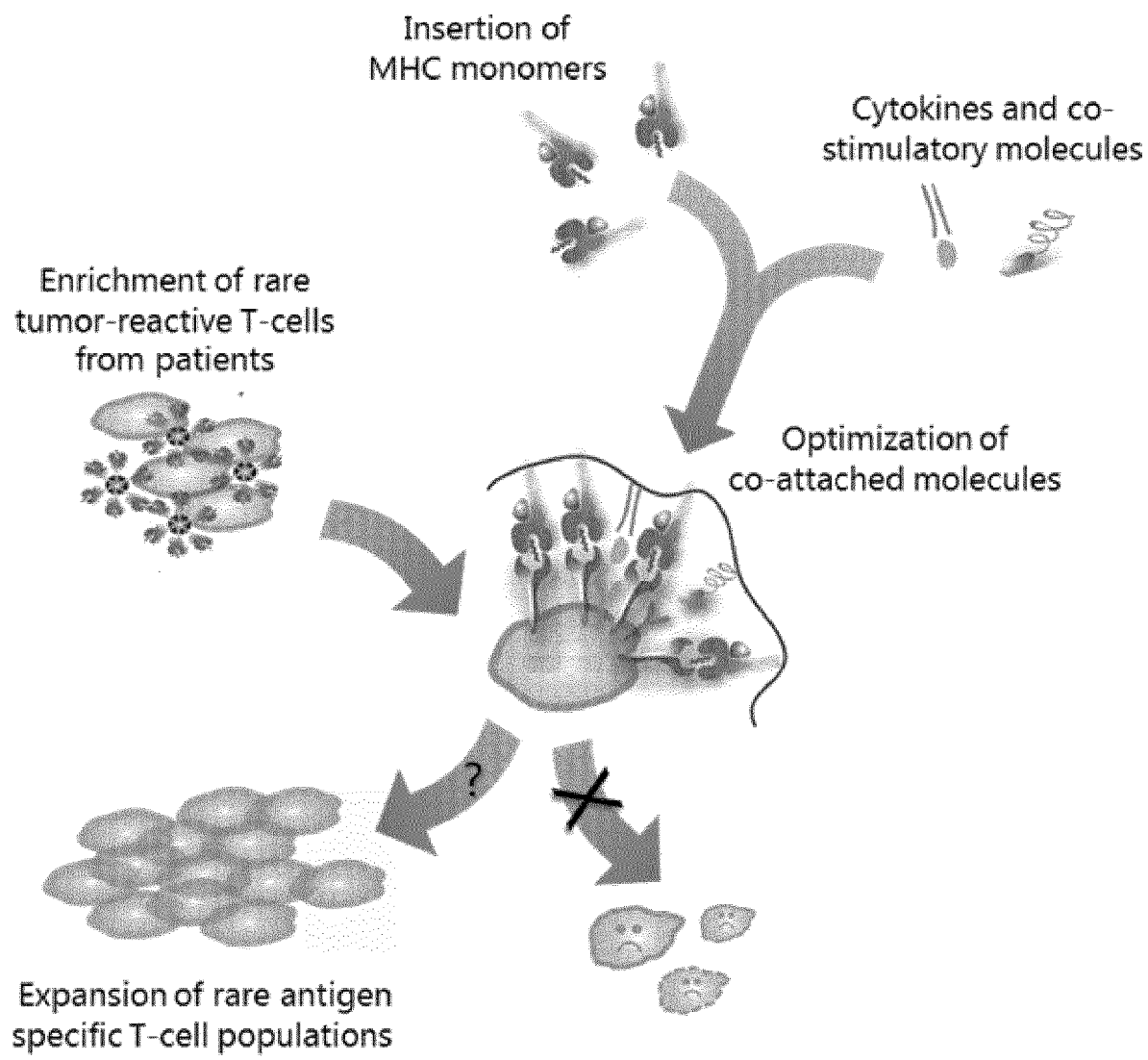
FIG. 1 shows (A) a schematic overview over an exemplary artificial antigen presenting cell (aAPC) scaffold. The aAPC scaffold is comprised of a backbone to which are attached template molecules, such as unloaded MHC class I molecules (or loaded peptide-MHC (pMHC) class I molecules) and T cell affecting molecules, such as cytokines or co-stimulatory molecules. Examples are given of aAPC scaffolds, wherein different ratios of the backbone and template molecules are assembled into aAPC scaffolds. (B) Illustration of how carefully selected combinations of template molecules may be combined in an aAPC scaffold and utilized to expand specific T cell populations extracted from patients.

The present invention will now be described in more detail in the following.

DETAILED DESCRIPTION OF THE INVENTION

Definitions

Prior to discussing the present invention in further details, the following terms and conventions will first be defined:

Artificial Antigen Presenting Cell (aAPC) Scaffold

In the present context, the term "artificial antigen presenting cell (aAPC) scaffold" means an assembly of the necessary molecules as defined herein to function similar to an antigen presenting cell.

Polymeric Backbone

In the present context, the term "polymeric backbone" means the part of the aAPC scaffold onto which the individual template molecules are fixed. The template molecules are attached by means of an interaction between a coupling agent located on or as an integrated part of the polymeric backbone and an affinity tag placed on the template molecule. Alternatively, the coupling agent may be on the template molecule, with the corresponding affinity tag being on the polymeric backbone.

The polymeric backbone may be of a material selected from polysaccharides, vinyl polymers, poly ethylene glycol, poly propylene glycol, strep-tactin, poly-streptavidin, biotin-binding proteins and polyhistidine-binding polymers.

Template Molecules

In the present context, the term "template molecule" refers to any molecule attached onto the polymeric backbone of the aAPC scaffold. They may be selected from MHC class I molecules, T cell affecting molecules, such as cytokines and co-stimulatory molecules, and CD47. Template molecules comprise an affinity tag.

In some embodiments, the template molecules may be directly attached to a solid support and not on a polymeric backbone.

T Cell Affecting Molecule

In the present context, the term "T cell affecting molecule" refers to any molecule that has a biological effect on a T cell. Biological effects include, but are not limited to, proliferation, differentiation and stimulation of T cells.

Thus, T cell affecting molecules may be utilized for expanding and functionally manipulating a T cell population to obtain the desired differentiation resulting in high specificity, high killing capacity, high in vivo expansion and survival properties. T cell affecting molecules include, but are not limited to, cytokines, co-stimulatory molecules and adhesion molecules.

The aAPC scaffolds of the present invention may comprise one or more different types of T cell affecting molecules, such as at least one, at least two, at least three, at least four or at least five different types of T cell affecting molecules.

Additionally, the number of T cell affecting molecules positioned on each aAPC can also be one or more, and may be varied depending on the design of the aAPC. Thus, the number of T cell affecting molecules on an aAPC scaffold may be in the range of 1-100, such as 1-50, such as 1-25, such as 1-20, such as 1-15, such as 1-10, or such as 1-5.

Mutant Cysteine Residue

In the present context, the term "mutant cysteine residue" refers to a cysteine residues that has artificially been introduced in the heavy chain of a MHC class I molecule. Thus, a mutant cysteine residue is not present in the heavy chain of the corresponding wild type MHC class I molecule.

A mutant cysteine residue may be introduced by mutagenesis techniques known to the person skilled in the art, e.g. site-directed mutagenesis.

Non-Covalent Interaction

In the present context, the term "non-covalent interaction" means any bonding via other interactions than a covalent bond. A non-covalent bond may be formed by e.g. hydrophobic interactions, hydrophilic interactions, ionic interactions, van der walls forces, hydrogen bonding, and combinations thereof.

Coupling Agent

In the present context, the term "coupling agent" refers to a molecular entity positioned on the polymeric backbone of the aAPC. A coupling agent can be non-covalently bound to an affinity tag. Examples of coupling agents include streptavidin, avidin, strep-tactin, antibodies, poly His-tags, metal ion chelates etc.

Alternatively, the coupling agent may be on the template molecule, with the corresponding affinity tag being on the polymeric backbone.

Affinity Tag

In the present context, the term "affinity tag" refers to a molecular species located on a template molecule. An affinity tag binds highly specifically to a coupling agent by non-covalent interaction. Examples of coupling agents include biotin, antibody epitopes, His-tags, streptavidin, strep-tactin, polyhistidine, peptides, metal ion chelates etc.

Alternatively, the affinity tag may be on the polymeric backbone, with the corresponding coupling agent being on the backbone of the template molecule.

Antigenic Peptide

In the present context, the term "antigenic peptide" refers to a peptide that is capable of binding to a major histocompatibility complex (MHC) molecule to form a peptide-MHC (pMHC) complex. The pMHC complex can present the antigenic peptide to immune cells to induce a T-cell receptor dependent immune response.

The MHC molecule may be a MHC class I molecule.

MHC

In the present context, the term "MHC" refers to the major histocompatibility complex, a protein complex whose main function is to bind antigenic peptides derived from pathogens and display them on the cell surface for recognition by the appropriate T-cells.

There are two major classes of MHC molecules, MHC class I molecules and MHC class II molecules. Herein, "MHC" refers to MHC class I molecules. MHC class I molecules consists of an alpha-chain (heavy chain) produced by MHC genes and a beta-chain (light chain or β2-microglobulin) produced by the β2-microglobulin gene.

The heavy chain consists of three domains denoted alpha-1, alpha-2 and alpha-3, respectively. The alpha-1 domain is located next to the non-covalently associated β2-microglobulin. The alpha-3 domain is a transmembrane domain, which anchors the MHC class I molecule in the cell membrane. Together, the alpha-1 and alpha-2 domains forms a heterodimer containing a peptide-binding groove which bind a specific antigenic peptide. The amino acid sequence of the peptide-binding groove is the determinant as to which specific antigenic peptide is bound to the MHC class I molecule.

Naturally, the heavy chain of MHC class I molecules contains four conserved cysteine residues resulting in formation of two disulfide bridges. In the correctly folded conformation of the MHC class I molecule, one disulfide bridge is positioned inside the alpha-2 domain between Cys101 and Cys164, and another disulfide bridge is positioned inside the alpha-3 domain between Cys203 and Cys259, with amino acid numbering referencing to HLA-A without a signal peptide.

In the present invention, an additional disulfide bridge is introduced between the alpha-1 domain and the alpha-2 domain by recombinant introduction of two cysteine residues. Preferably, the two mutated cysteines are introduced at positions in the heavy chain at which the spatial distance between the cysteine residue in the alpha-1 domain and the cysteine residue in the alpha-2 domain is between 2 and 10 angstrom.

The MHC molecule may either be empty or bound to an antigenic peptide. Thus, in the present context there is a distinction between MHC molecules free of antigenic peptide (i.e. empty MHC molecules), and pMHC molecules, which refers to an MHC molecule with bound antigenic peptide.

In the present context, the terms "loadable aAPC scaffold", "antigenic peptide receptive aAPC scaffold" and "empty aAPC scaffold" are used interchangeably to denote an aAPC scaffold with MHC molecules free of antigenic peptide.

In humans, the MHC complex is encoded by the human leukocyte antigen (HLA) gene complex. Thus, in the present context, the term "MHC" encompasses also "HLA". There exist three major types of HLA and therefore MHC in the present context include, but are not limited to, HLA alleles that are coded in the gene loci for HLA-A, HLA-B, and HLA-C. Similarly, MHC include, but are not limited to, MHC class I-like molecules such as HLA-E, HLA-F, HLA-G, HLA-H, MIC A, MIC B, CD1d, ULBP-1, ULBP-2, and ULBP-3.

pMHC

In the present context, the term "pMHC" refers to a MHC molecule as defined above to which is bound an antigenic peptide. Thus, the term pMHC refers to MHC class I molecules loaded with antigenic peptide.

Cytokine

In the present context, the term "cytokine" means an immune-regulatory molecule that affects expansion, survival and effector function of stimulated T cells. Cytokines include chemokines, interferons, interleukins, lymphokines, and tumor necrosis factors.

Examples of interleukins include, but are not limited to, IL-21, IL-2, IL-15, IL-1, IL-4, IL-6, IL-7, IL-9, IL-10, IL-12, IL-17, IL-22, and IL-23. Cytokines include also variants or mimics of interleukins that induces T cell stimulation and activation corresponding to one or more interleukins. Variants or mimics of interleukins may comprise the binding sites of native cytokines, but vary in the remaining parts of the protein. Thus, variants or mimics of interleukins include, but are not limited to, variants of IL-2, IL-15 and IL-21, or combinations thereof, such as IL-2/IL-15.

A specific interleukin variant or mimic encompassed in the group of cytokines is termed Neoleukin-2/15. Neoleukin-2/15 (Neo-2/15) is a designer cytokine which is highly stable and binds strongly to IL-2Rβγc, but not to CD25.

Gamma-Chain Receptor Cytokines

In the present context, the term "gamma-chain receptor cytokines" refers to the group of cytokines that bind to a corresponding cytokine receptor comprising the common gamma-chain subunit. The common gamma-chain ($\gamma_c$) receptor is also known as CD132 or interleukin-2 receptor subunit gamma (IL-2RG). One common denominator for the gamma-chain receptor cytokines is that they all deliver their intracellular signal through the shared gamma-chain receptor and influence T-cell activation and differentiation.

The $\gamma_c$ glycoprotein is a transmembrane protein, which comprises extracellular, transmembrane and intracellular domains and is typically expressed on lymphocytes. The $\gamma_c$ subunit is part of the receptor complexes of at least six different cytokine receptors, namely the IL-2, IL-4, IL-7, IL-9, IL-15 and IL-21 receptors. Therefore, the group of gamma-chain receptor cytokines comprises at least IL-2, IL-4, IL-7, IL-9, IL-15 and IL-21. Gamma-chain receptor cytokines include also variants or mimics of gamma-chain receptor cytokines that induces T cell stimulation and activation corresponding to one or more interleukins, e.g. such as variants of IL-2, IL-15 and IL-21, or combinations thereof, such as IL-2/IL-15.

Co-Stimulatory Molecule

In the present context, the term "co-stimulatory molecule" means a molecule that upon interaction with T cells enhances T cell response, proliferation, production and/or secretion of cytokines, stimulates differentiation and effector functions of T cells or promotes survival of T cells relative to T cells not contacted with a co-stimulatory molecule. Examples of co-stimulatory molecules include, but are not limited to, B7.1, B7.2, ICOS, PD-L1, a-galactosylceramide, CD3, CD4, CD5, CD8, CD9, CD27, CD28, CD30, CD69, CD134 (OX40), CD137 (4-1BB), CD147, CDw150 (SLAM), CD152 (CTLA-4), CD153 (CD30L), CD40L (CD154), Fas (CD95), CD40, CD48, CD70, and CD72.

Adhesion Molecule

In the present context, the term "adhesion molecule" refers to molecules that induce adhesion between the aAPC scaffold and T cells. Adhesion molecules include, but are not limited to, ICAM-1, ICAM-2, GlyCAM-1, CD34, anti-LFA-1, anti-LFA-2 (CD2), LFA-3 (CD58), anti-CD44, anti-beta-7, CXCR4, CCR5, anti-selectin L, anti-selectin E, and anti-selectin P.

Epitope

In the present context, the term "epitope" means the antigenic determinant recognized by the TCR of the T cell. The epitope presented by the pMHC is highly specific for any foreign substance and the interaction with the TCR ensures effective expansion and functional stimulation of the specific T cells in a peptide-MHC-directed fashion.

Solid Support

In the present context, the term "solid support" refers to any type of insoluble material to which an aAPC scaffold may be attached. aAPC scaffolds may be covalently or reversibly attached to the solid support. aAPC scaffolds that are attached to a solid support may be readily separated (by e.g. filtration, chromatography, centrifugation, etc.) from excess reagents or solvents.

Solid supports include, but are not limited to, beads, well plates, particles, filters, gels, tubes, and petri dishes.

In some embodiments of the present invention, the template molecules, i.e. T cell affecting molecules and MHC class I molecules, may be directly attached to a solid support.

Sample

In the present context, the term "sample" refers to a solution extracted from a subject, with the solution comprising a population of T cells. The sample is not limited to any specific source, but may be extracted e.g. from blood, a tissue or a body fluid. The T cell population may contain T cells with different specificities.

Expansion Solution

In the present context, the term "expansion solution" refers to a solution comprising an aAPC scaffold for use in expansion of T cells with specificity for the aAPC. The expansion solution may further comprise other entities that support expansion, differentiation and stimulation of the T cells, e.g. the expansion solution may comprise additional cytokines, co-stimulatory molecules or adhesion molecules in addition to those immobilized on the aAPC scaffold.

Clinically Relevant Number

In the present context, the term "clinical relevant number" refers to the number of cells necessary for fighting a disease. The absolute value of the clinical relevant number of cells varies depending on the disease. The number of cells available before re-introduction into a patient may be in the range of $10^5$-$10^{12}$ cells per administration, such as $10^5$-$10^{10}$ cells per administration, such as $10^6$-$10^9$ cells per administration.

Pharmaceutical Composition

In the present context, the term "pharmaceutical composition" refers to a composition comprising an expanded T cell population obtained according to the invention, suspended in a suitable amount of a pharmaceutical acceptable diluent or excipient and/or a pharmaceutically acceptable carrier.

Pharmaceutically Acceptable

In the present context, the term "pharmaceutically acceptable" refers to molecular entities and compositions that are physiologically tolerable and do not typically produce an allergic or similar untoward reaction, such as gastric upset, dizziness and the like, when administered to a human. Preferably, as used herein, the term "pharmaceutically acceptable" means approved by a regulatory agency of the Federal or a state government or listed in the U.S. Pharmacopoeia or other generally recognized pharmacopoeia for use in animals, and more particularly in humans.

Adjuvant

In the present context, the term "adjuvant" refers to a compound or mixture that enhances the immune response to an antigen. An adjuvant can serve as a tissue depot that slowly releases the antigen and as a lymphoid system activator, which non-specifically enhances the immune response. Often, a primary challenge with an antigen alone, in the absence of an adjuvant, will fail to elicit a humoral or cellular immune response. Adjuvants include, but are not limited to, complete Freund's adjuvant, incomplete Freund's adjuvant, saponin, mineral gels such as aluminum hydroxide, surface active substances such as lysolecithin, pluronic polyols, polyanions, peptides, oil or hydrocarbon emulsions, keyhole limpet hemocyanins, dinitrophenol, and potentially useful human adjuvants such as BCG (bacille Calmette-Guerin) and *Corynebacterium parvum*. Preferably, the adjuvant is pharmaceutically acceptable.

Excipient

In the present context, the term "excipient" refers to a diluent, adjuvant, carrier, or vehicle with which the composition of the invention is administered. Such pharmaceutical carriers can be sterile liquids, such as water and oils, including those of petroleum, animal, vegetable or synthetic origin, such as peanut oil, soybean oil, mineral oil, sesame oil and the like. Water or aqueous solution saline solutions and aqueous dextrose and glycerol solutions are preferably employed as carriers, particularly for injectable solutions. Suitable pharmaceutical carriers are described in "Remington's Pharmaceutical Sciences" by E. W. Martin.

Sequence Identity

In the present context, the term "sequence identity" is here defined as the sequence identity between genes or proteins at the nucleotide, base or amino acid level, respectively. Specifically, a DNA and a RNA sequence are considered identical if the transcript of the DNA sequence can be transcribed to the identical RNA sequence.

Thus, in the present context "sequence identity" is a measure of identity between proteins at the amino acid level and a measure of identity between nucleic acids at nucleotide level. The protein sequence identity may be determined by comparing the amino acid sequence in a given position in each sequence when the sequences are aligned. Similarly, the nucleic acid sequence identity may be determined by comparing the nucleotide sequence in a given position in each sequence when the sequences are aligned.

To determine the percent identity of two amino acid sequences or of two nucleic acids, the sequences are aligned for optimal comparison purposes (e.g., gaps may be introduced in the sequence of a first amino acid or nucleic acid sequence for optimal alignment with a second amino or nucleic acid sequence). The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences (i.e., % identity=# of identical positions/total # of positions (e.g., overlapping positions)×100). In one embodiment, the two sequences are the same length.

In another embodiment, the two sequences are of different length and gaps are seen as different positions. One may manually align the sequences and count the number of identical amino acids. Alternatively, alignment of two sequences for the determination of percent identity may be accomplished using a mathematical algorithm. Such an algorithm is incorporated into the NBLAST and XBLAST programs of (Altschul et al. 1990). BLAST nucleotide searches may be performed with the NBLAST program, score=100, wordlength=12, to obtain nucleotide sequences homologous to a nucleic acid molecules of the invention. BLAST protein searches may be performed with the XBLAST program, score=50, wordlength=3 to obtain amino acid sequences homologous to a protein molecule of the invention.

To obtain gapped alignments for comparison purposes, Gapped BLAST may be utilized. Alternatively, PSI-Blast may be used to perform an iterated search, which detects distant relationships between molecules. When utilizing the NBLAST, XBLAST, and Gapped BLAST programs, the default parameters of the respective programs may be used. See hypertext transfer protocol: //world wide web.ncbi.nlm.nih.gov. Alternatively, sequence identity may be calculated after the sequences have been aligned e.g. by the BLAST program in the EMBL database (www.ncbi.nlm.gov/cgi-bin/BLAST). Generally, the default settings with respect to e.g. "scoring matrix" and "gap penalty" may be used for alignment. In the context of the present invention, the BLASTN and PSI BLAST default settings may be advantageous.

The percent identity between two sequences may be determined using techniques similar to those described above, with or without allowing gaps. In calculating percent identity, only exact matches are counted. An embodiment of the present invention thus relates to sequences of the present invention that has some degree of sequence variation.

aAPC Scaffold with Stabilized MHC Class I Molecules

T cells play a crucial role in the immune response, where they recognize and respond to foreign substances by interacting with antigen presenting cells (APC), displaying antigenic peptides of the foreign substance in complex with MHC molecules (pMHC). The T cells are very specific and express only a single specificity of T cell receptor (TCR), thereby allowing the T cell only to recognize and respond to a single specific pMHC molecule. When the T cells are first primed to develop receptors of a specific combination of antigen and MHC molecule, they will not subsequently be able to recognize other specificities. This specialization of the T cell is called MHC restriction and can be utilized to expand T cells of a single specificity without any irrelevant specificities "polluting" the expanded T cell population.

MHC molecules exist in several variants, of which MHC class I and MHC class II molecules may be regarded as the most important. The MHC class I molecules interact with CD8 positive cytotoxic T cells (CD8+ T cells) and MHC class II molecules interact with CD4 positive helper T cells (CD4+ T cells). Once activated CD8+ T cells generally seek to kill cancer cells, cells that are infected (particularly with viruses), cells characterized by overexpressing cancer antigens, cells expressing mutations or neoantigens, cells expressing cancer testis antigens or cells that are damaged in other ways. CD4+ T cells on the other hand mainly function by assisting the immune system, e.g. by releasing cytokines and potentiate the CD8+ T cells. Although not limited to a single type of T cell, the present invention is mainly concerned with the activation, stimulation and expansion of CD8+ T cells. This is particularly true since the utilization of an aAPC scaffold, to some extent, fulfills the combined role of the CD4+ T cells and the antigen presenting cells.

Although the TCR-pMHC interaction is the main driver for the activation of T cells, several other stimuli are required to prepare the T cells for an effective immune response. Overall, the activation of CD8+ T cells requires two signals; 1) the interaction between the TCR and the pMHC class I molecule and 2) a co-stimulatory interaction between CD28, a membrane receptor on T-cells, and CD28 ligands located on the APC, such as B7.1 (CD80) or B7.2 (CD86). The second signal serves to enhance proliferation, cytokine production and cell survival.

In addition to the stimulatory signals, T cell response is also regulated by inhibitory signals. Tim-3, LAG-3 and PD-1 are examples of mediators of inhibitory signals. They serve as a natural mechanism to avoid excessive T cell activation and prevent the immune system from running rampant across the organism.

The secondary signal may be assisted, or in some cases replaced, by stimulation of the CD8+ T cell with cytokines released by CD4+ T cells. Thus, cytokines constitute another important group of molecules involved in the modulation of the immune response. Cytokines generally include interleukins, interferons, chemokines, lymphokines, and tumor necrosis factors. They act through receptors and amongst others regulate the maturation, growth, and responsiveness of T cell populations. Together, interleukin-2 (IL-2) and the co-stimulatory signals are the most crucial factors for preservation of continuous cell division. The delicate interplay between co-stimulatory molecules and cytokines is complex and one of the key factors of efficient and specific T cell expansion.

Another molecule that plays a key role in immune responses as well as in cellular processes, such as apoptosis, proliferation, adhesion, and migration, is CD47. This transmembrane protein is ubiquitously expressed in human cells, but is also overexpressed in many different tumor cells, with high levels of CD47 allowing the cancer cells to avoid phagocytosis. However, CD47 is also widely expressed in immune cells, functioning as a "don't eat me" signal that prolongs the circulation time of the immune cells. Expansion of T cells that express CD47 may be preferable as these cells are forecasted to have an increased half-life when used therapeutically.

Therefore, an embodiment of the present invention relates to the aAPC scaffold as described herein, wherein the template molecules comprise a ligand capable of stimulating CD47 expression in a T cell population.

CD47 may also infer beneficial properties to the aAPC itself, e.g. as a "don't eat me" signal that prolongs the half-life of the aAPC scaffold in culture or in circulation.

Thus, an embodiment of the present invention relates to the aAPC scaffold as described herein, wherein the aAPC scaffold further comprises CD47.

As exemplified by the above description, there are many factors involved in the activation and proliferation of T cells. However, for the purpose of immune therapy and/or expansion of a specific T cell population, it is possible to set some conditions that should ideally be fulfilled for the ability to provide a T cell population with high activity and functionality suited for these purposes. Thus, preferable characteristics of the expanded T cells include:

a. high expression of activators (such as CD28)
    b. low expression of inhibitors (such as PD1)
    c. multifunctionality, i.e. simultaneous secretion of several cytokines The cluster of different molecules required for efficient activation and stimulation has to be present simultaneously to provide the optimal capacity for T cell function and expansion. The use of an aAPC scaffold collects the combination of required molecules in a defined proximity to each other and thus constitutes a suitable platform for efficient expansion of the specific T cells.

The prospects of utilizing aAPC scaffolds for efficient expansion of highly specialized and active T cells are very promising. However, the persistent challenge of turning technologies based on MHC antigen presentation into truly high-throughput platforms remains. This is because refolding of MHC molecules is impossible in the absence of antigenic peptide and their production is consequently complex and expensive. Not only are there several thousand MHC class I allotypes, but also a new individualized aAPC scaffold must be produced for each antigenic peptide that is to be examined or utilized for therapeutic purposes. It would be more efficient and flexible to produce the MHC molecules without antigenic peptides and instead add the antigenic peptide as required just prior to assembling the aAPC scaffolds. Even more efficient and flexible it would be to produce to fully assembled aAPC scaffolds using MHC molecules without antigenic peptides and instead add the antigenic peptide as required.

Thus, to provide a high-throughput platform for expansion of T cells and development of new immunotherapies, the aAPC scaffolds of the present invention may be provided with empty MHC class I molecules to which can be added antigenic peptide subsequent to production of the aAPC scaffold. The MHC class I molecules are stabilized by artificial introduction of a disulfide bridge connecting the alpha-1 and alpha-2 domains of the heavy chain. The disulfide bridge is positioned outside of the peptide binding groove at the distal end of the C-terminal peptide binding pocket. This structural change of the MHC class I molecule mimics the conformational and dynamic effects of a bound specific antigenic peptide, thereby stabilizing the MHC class I molecule.

Native class I MHC molecules bind peptides of diverse sequences with specific affinity. This is accomplished by the use of conserved amino acids at the ends of peptide-binding groove forming pockets that facilitate peptide binding (typically the A and F pocket of the MHC binding groove). These binding pockets determines a set of requirements for binding of the antigenic peptides, typically referred to as anchor motifs (typically position 2 or 3, and the c-terminal position of the peptide). Although native MHC class I molecules bind many different antigenic peptides through recognition of the anchor motifs, each allele binds only a distinct subset of all available antigenic peptides with high affinity. However, since the artificially introduced disulfide bridge of the stabilized MHC class I molecules mimics the conformational and dynamic effects of a bound specific antigenic peptide, the aAPC scaffolds as described herein can be produced with empty MHC class I molecules that are capable of binding a wide variety of antigenic peptides. This is further emphasized by the finding that T cell interaction based on the disulfide bridge of the stabilized MHC class I molecules is fully identical to that obtain with wild type MHC molecules.

Thus, the aAPC scaffolds are constructed from a polymeric backbone conjugated with coupling agents to which affinity tagged disulfide stabilized empty MHC class I molecules are attached. The empty MHC class I molecules may be loaded with antigenic peptide to form a pMHC molecule able to govern the specific interaction with a specific T cell. In combination with co-attached affinity tagged T cell affecting molecules, such as cytokines and co-stimulatory molecules, the aAPC scaffolds stimulate the specific T cells to achieve increased functional properties. Therefore, the present invention demonstrates specific conditions required to expand tumor-reactive T cells, through use of MHC-loaded aAPC scaffolds to provide the cells with specific functional stimulation to obtain phenotypic and functional properties ideal to mediate tumor regression or viral clearance. The aAPC scaffolds, subsequent to loading of the empty MHC class I molecules with antigenic peptide, will specifically interact with T cells based on recognition of the pMHC molecule, and can through this specific interaction effectively expand and functionally stimulate specific T cells in a peptide-MHC-directed fashion.

The aAPC scaffolds may be assembled by combinations of a large variety of different template molecules (i.e. MHC class I molecules, T cell affecting molecules). The aAPC scaffolds described herein may comprise one or more co-stimulatory molecules including, but not limited to, B7.1, B7.2, ICOS, PD-L1, a-galactosylceramide, CD3, CD4, CD5, CD8, CD9, CD27, CD28, CD30, CD69, CD134 (OX40), CD137 (4-1BB), CD147, CDw150 (SLAM), CD152 (CTLA-4), CD153 (CD30L), CD40L (CD154), Fas (CD95), CD40, CD48, CD70, and CD72.

Furthermore, the aAPC scaffolds described herein may comprise one or more cytokines including, but not limited to interleukin-1 (IL-1), interleukin-2 (IL-2), interleukin-3 (IL-3), interleukin-4 (IL-4), interleukin-5 (IL-5), interleukin-6 (IL-6), interleukin-7 (IL-7), interleukin-8 (IL-8), interleukin-9 (IL-9), interleukin-10 (IL-10), interleukin-12 (IL-12), interleukin-15 (IL-15), interleukin-17 (IL-17), interleukin-21 (IL-21), interleukin-22 (IL-22), interleukin-23 (IL-23), interferon alpha (IFN-α), interferon beta (IFN-β), interferon gamma (IFN-γ), IGIF, granulocyte macrophage colony stimulating factor (GM-CSF), tumor necrosis factor alpha (TNF-α), tumor necrosis factor beta (TNF-β) and macrophage colony stimulating factor (M-CSF), and variants and fragments thereof.

Herein are described aAPC scaffolds, which upon loading with antigenic peptide, are suitable for T cell expansion, ensuring a high ratio of active T cells, high antigen specificity of the T cells and high functionality of the T cells. Consequently, a first aspect of the present invention relates to an artificial antigen presenting cell (aAPC) scaffold comprising a polymeric backbone to which are attached the following template molecules:
  i. at least one T cell affecting molecule, and
  ii. at least one MHC class I molecule,
wherein the MHC class I molecule comprises a heavy chain comprising an alpha-1 domain and an alpha-2 domain connected by a disulfide bridge.

The disulfide bridge formed between the alpha-1 and alpha-2 domains are artificially introduced in the MHC class I molecule. Specifically, two mutant cysteine residues are introduced in the amino acid sequence of the heavy chain to enable disulfide bridge formation between the alpha-1 and alpha-2 domains. Introduction of the mutant cysteine residues may be performed by any type of suitable mutagenesis, with such techniques being known to a person skilled in the art. Preferably, the position of mutagenesis is selected such that the resulting mutant cysteine residues, placed in the alpha-1 and alpha-2 domains, are within a spatial distance from each other which would under normal protein folding conditions enable formation of a disulfide bridge.

Thus, an embodiment of the present invention relates to the aAPC scaffold as described herein, wherein said disulfide bridge is formed between a mutant cysteine residue positioned in the alpha-1 domain and a mutant cysteine residue positioned in the alpha-2 domain.

Another embodiment of the present invention relates to the aAPC scaffold as described herein, wherein the spatial distance between the mutant cysteine residue positioned in the alpha-1 domain and the mutant cysteine residue positioned in the alpha-2 domain is between 2 and 10 angstrom, such as between 2 and 8 angstrom, preferably between 2 and 5 angstrom.

A further embodiment of the present invention relates to the aAPC scaffold as described herein, wherein the heavy chain comprises an amino acid sequence selected from:
  a. SEQ ID NO: 1, or
  b. an amino acid sequence having at least 80% sequence identity to the sequence in (a), and wherein said amino acid sequence comprises a mutant cysteine residue positioned in the alpha-1 domain and a mutant cysteine residue positioned in the alpha-2 domain.

A yet further embodiment of the present invention relates to the aAPC scaffold as described herein, wherein the heavy chain comprises, or consists of, an amino acid sequence selected from:
 a. SEQ ID NO: 1, or
 b. an amino acid sequence having at least 80% sequence identity to the sequence in (a), such as at least 85%, at least 90%, at least 95%, at least 96%, at least 97%, at least 98%, or at least 99% sequence identity to the sequence in (a), and
wherein said amino acid sequence comprises a mutant cysteine residue positioned in the alpha-1 domain and a mutant cysteine residue positioned in the alpha-2 domain.

Preferred mutations of the two cysteine residues include the modification of the amino acid in position 139 and either of the amino acids in positions 84 or 85. The amino acid in position 139 is positioned in the alpha-2 domain of the heavy chain and is in many cases an alanine residue. The amino acid in position 84 or 85 is positioned in the alpha-1 domain of the heavy chain and is in many cases a tyrosine residue. The cysteine mutations may be introduced by amino acid substitution through modification of the gene sequence of the heavy chain using standard genetic engineering.

Thus, a preferred embodiment of the present invention relates to the aAPC scaffold as described herein, wherein the mutant cysteine residue in the alpha-1 domain is at amino acid residue 84 or 85 and the mutant cysteine residue positioned in the alpha-2 domain is at amino acid residue 139.

Upon folding of the MHC class I molecule, a disulfide bridge is formed between Cys-84 or Cys-85, and Cys-139. The newly formed disulfide bridge stabilize the MHC class I molecule so that it remains stable in solution in absence of an antigenic peptide. These stable empty MHC class I molecules may then be attached to the polymeric backbone of the aAPC scaffold by interaction between an affinity tag and a coupling agent.

The introduction of cysteine mutant residues may be applied to any type of MHC class I molecule or MHC class I-like molecules. Thus, an embodiment of the present invention relates to the aAPC scaffold as described herein, wherein the MHC class I molecule is selected from the group consisting of HLA-A, HLA-B, HLA-C, HLA-E, HLA-F, HLA-G, HLA-H, MIC A, MIC B, CD1d, ULBP-1, ULBP-2, and ULBP-3.

The aAPC scaffold as described herein is also applicable for use together with the MHC of a mouse, which is termed the H-2 complex. Thus, an embodiment of the present invention relates to the aAPC scaffold as described herein, wherein the heavy chain is a H-2 molecule, such as H-2Kb or H-2 Db. Another embodiment of the present invention relates to the aAPC scaffold as described herein, wherein the heavy chain comprises an amino acid sequence selected from:
 a. any one of SEQ ID NO: 12 or SEQ ID NO: 13, or
 b. an amino acid sequence having at least 80% sequence identity to any one of the sequences in (a).

Preferred variants of MHC class I molecules includes HLA-A, HLA-B and H-2, each comprising two mutant cysteine residues. Thus, an embodiment of the present invention relates to the aAPC scaffold as described herein, wherein the heavy chain comprises an amino acid sequence selected from:
 a. any one of SEQ ID NO: 2-13, or
 b. an amino acid sequence having at least 80% sequence identity to any one of the sequences in (a).

Another embodiment of the present invention relates to the aAPC scaffold as described herein, wherein the heavy chain comprises, or consists of, an amino acid sequence selected from:
 a. any one of SEQ ID NO: 2-13, or
 b. an amino acid sequence having at least 80% sequence identity to any one of the sequences in (a), such as at least 85%, at least 90%, at least 95%, at least 96%, at least 97%, at least 98%, or at least 99% sequence identity to any one of the sequences in (a).

It is noted that the term "SEQ ID NO: 2-13" is to be understood as "SEQ ID NO:2, SEQ ID NO:3, SEQ ID NO:4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, or SEQ ID NO: 13".

A further embodiment of the present invention relates to the aAPC scaffold as described herein, wherein the heavy chain comprises an amino acid sequence selected from:
 a. any one of SEQ ID NO: 2-11, or
 b. an amino acid sequence having at least 80% sequence identity to any one of the sequences in (a).

A yet further embodiment of the present invention relates to the aAPC scaffold as described herein, wherein the heavy chain comprises an amino acid sequence selected from:
 a. any one of SEQ ID NO: 2-6, or
 b. an amino acid sequence having at least 80% sequence identity to any one of the sequences in (a).

A much utilized allele of HLA for expansion of T cells is the HLA-A 02:01 allele. Therefore, a preferred embodiment of the present invention relates to the aAPC scaffold as described herein, wherein the heavy chain comprises an amino acid sequence selected from:
 a. SEQ ID NO: 2, or
 b. an amino acid sequence having at least 80% sequence identity to the sequence in (a).

Another embodiment of the present invention relates to the aAPC scaffold as described herein, wherein the heavy chain comprises, or consists of, an amino acid sequence selected from:
 a. SEQ ID NO: 2, or
 b. an amino acid sequence having at least 80% sequence identity to the sequence in (a), such as at least 85%, at least 90%, at least 95%, at least 96%, at least 97%, at least 98%, or at least 99% sequence identity to the sequence in (a).

The MHC class I molecules are attached to the polymeric backbone of the aAPC scaffold through interaction between an affinity tag and a coupling agent. Preferably, the affinity tag, such as biotin, is placed on the MHC class I molecule. The attachment of biotin to the heavy chain may be accomplished by inclusion of a handle, such as an Avi-tag, for biotinylation of the heavy chain. Thus, an embodiment of the present invention relates to the aAPC scaffold as described herein, wherein the heavy chain comprises, or consists of, an amino acid sequence selected from:
 a. any one of SEQ ID NO: 2-13, or
 b. an amino acid sequence having at least 80% sequence identity to any one of the sequences in (a), such as at least 85%, at least 90%, at least 95%, at least 96%, at least 97%, at least 98%, or at least 99% sequence identity to any one of the sequences in (a), and
wherein the heavy chain further comprises SEQ ID NO: 19.

A preferred embodiment of the present invention relates to the aAPC scaffold as described herein, wherein the heavy chain comprises an amino acid sequence selected from:
  a. SEQ ID NO: 14, or
  b. an amino acid sequence having at least 80% sequence identity to the sequence in (a).

Another embodiment of the present invention relates to the aAPC scaffold as described herein, wherein the heavy chain comprises, or consists of, an amino acid sequence selected from:
  a. SEQ ID NO: 14, or
  b. an amino acid sequence having at least 80% sequence identity to the sequence in (a), such as at least 85%, at least 90%, at least 95%, at least 96%, at least 97%, at least 98%, or at least 99% sequence identity to the sequence in (a).

A further embodiment of the present invention relates to the aAPC scaffold as described herein, wherein the heavy chain comprises, or consists of, an amino acid sequence selected from:
  a. SEQ ID NO: 17, or
  b. an amino acid sequence having at least 80% sequence identity to the sequence in (a), such as at least 85%, at least 90%, at least 95%, at least 96%, at least 97%, at least 98%, or at least 99% sequence identity to the sequence in (a).

The heavy chain is associated with a β2-microglobulin molecule (β2M) to form a MHC class I molecule. Specifically, the alpha-3 domain of the heavy chain is positioned adjacent to β2M. Thus, an embodiment of the present invention relates to the aAPC scaffold as described herein, wherein the at least one MHC class I molecule comprises a β2-microglobulin molecule.

Another embodiment of the present invention relates to the aAPC scaffold as described herein, wherein the β2-microglobulin molecule comprises an amino acid sequence selected from:
  a. SEQ ID NO: 15, or
  b. an amino acid sequence having at least 80% sequence identity to the sequence in (a).

The MHC class I molecule may also be provided as a finalized fusion protein with β2M connected to the heavy chain via a linker. Thus, an embodiment of the present invention relates to the aAPC scaffold as described herein, wherein the at least one MHC class I molecule comprises an amino acid sequence selected from:
  a. SEQ ID NO: 16, or
  b. an amino acid sequence having at least 80% sequence identity to the sequence in (a).

Another embodiment of the present invention relates to the aAPC scaffold as described herein, wherein the at least one MHC class I molecule comprises, or consists of, an amino acid sequence selected from:
  a. SEQ ID NO: 16, or
  b. an amino acid sequence having at least 80% sequence identity to the sequence in (a), such as at least 85%, at least 90%, at least 95%, at least 96%, at least 97%, at least 98%, or at least 99% sequence identity to the sequence in (a).

A further embodiment of the present invention relates to the aAPC scaffold as described herein, wherein the at least one MHC class I molecule comprises, or consists of, an amino acid sequence selected from:
  a. SEQ ID NO: 18, or
  b. an amino acid sequence having at least 80% sequence identity to the sequence in (a), such as at least 85%, at least 90%, at least 95%, at least 96%, at least 97%, at least 98%, or at least 99% sequence identity to the sequence in (a).

The expansion of some T cells may be enhanced when several T cell affecting molecules are present simultaneously. The advantage achieved can be synergistic effects of T cell affecting molecules serving different purposes (e.g. growth, differentiation, activation etc.) in the expansion and stimulation of the T cells. Therefore, the T cell affecting molecules may belong to the same type or different types of molecules. Thus, an embodiment of the present application relates to the aAPC scaffold as described herein, wherein the aAPC scaffold comprises at least two different T cell affecting molecules.

Another embodiment of the present invention relates to the aAPC scaffold as described herein, wherein the T cell affecting molecules are selected from the group consisting of cytokines, co-stimulatory molecules, adhesion molecules, and antibodies.

One preferred type of T cell affecting molecules is cytokines. Cytokines modulate the balance between humoral and cell-based immune responses, and they regulate the maturation, growth, and responsiveness of T cell populations. Some cytokines enhance or inhibit the action of other cytokines in complex ways, making the interplay between selections of cytokines unpredictable. Thus, an embodiment of the present invention relates to the aAPC scaffold as described herein, wherein the T cell affecting molecules are cytokines.

Cytokines described herein encompass both native cytokines as well as variants or mimics of cytokines, which are engineered to induce enhanced T cell activation and function. Accordingly, variants or mimics of cytokines, such as interleukins, may induce T cell activation and function corresponding to one or more cytokines. Thus, an embodiment of the present invention relates to the aAPC scaffold as described herein, wherein the T cell affecting molecules are cytokines, or variants and mimics thereof. Another embodiment of the present invention relates to the aAPC scaffold as described herein, wherein the cytokines are selected from natural cytokines, or variants and mimics thereof. A further embodiment of the present invention relates to the aAPC scaffold as described herein, wherein the variants or mimics of cytokines induces T cell stimulation corresponding to one or more interleukins selected from the group of IL-2, IL-15 and IL-21. An even further embodiment of the present invention relates to the aAPC scaffold as described herein, wherein the variants or mimics of cytokines induces T cell stimulation corresponding to two interleukins selected from the group of IL-2, IL-15 and IL-21, such as IL-2/IL-15, such as IL-2/IL-21, or such as IL-15/IL-21.

Another embodiment of the present invention relates to the aAPC scaffold as described herein, wherein the cytokines are selected from the group consisting of IL-21, IL-2, IL-15, IL-1, IL-4, IL-6, IL-7, IL-9, IL-10, IL-12, IL-17, IL-22, and IL-23.

IL-2 is used therapeutically to modulate the strength of immune responses. IL-2 delivers its message by simultaneously binding to two receptor subunits known as IL-2 receptor β and IL-2 receptor γ (IL-2RB and IL-2RY) forming a heterodimeric signalling protein called IL-2Rβγc. A third, non-signalling, receptor called IL-2Ra (also known as CD25) contributes to the formation of the signalling complex, strengthening the binding between IL-2 and IL-2Rβγc roughly 100-fold.

A further embodiment of the present invention relates to the aAPC scaffold as described herein, wherein the cytokines comprise at least IL-2, or variants and mimics thereof. An even further embodiment of the present invention relates to the aAPC scaffold as described herein, wherein the cytokines consist of IL-2, or variants and mimics thereof.

A variant or mimic of IL-2 is termed Neoleukin-2/15. Neoleukin-2/15 (Neo-2/15) is a designer cytokine which is highly stable and binds strongly to IL-2Rβγc, but not to CD25. Thus, an embodiment of the present invention relates to the aAPC scaffold as described herein, wherein the cytokines comprise at least Neo-2/15. Another embodiment of the present invention relates to the aAPC scaffold as described herein, wherein the cytokines consist of Neo-2/15.

Different groups of cytokines have been identified to produce especially favorable aAPC scaffolds. Without being bound by theory, one efficient group of cytokines are cytokines that deliver their intracellular signal through the shared gamma-chain receptor and influence T-cell activation and differentiation. In the present context, these cytokines are termed "gamma-chain receptor cytokines". Thus, an embodiment of the present invention relates to the aAPC scaffold as described herein, wherein the cytokines are gamma-chain receptor cytokines.

Another embodiment of the present invention relates to the aAPC scaffold as described herein, wherein the gamma-chain receptor cytokines are selected from the group consisting of IL-21, IL-2, IL-15, IL-4, IL-7 and IL-9.

The inventors have identified preferred combinations of stimulatory molecules within the gamma-chain receptor cytokine family.

Thus, an embodiment of the present invention relates to the aAPC scaffold as described herein, wherein the gamma-chain receptor cytokines are selected from the group consisting of IL-21, IL-2 and IL-15.

Another embodiment of the present invention relates to the aAPC scaffold as described herein, wherein the gamma-chain receptor cytokines comprise at least IL-21.

As outlined previously, interplay between several T cell affecting molecules, hereunder cytokines, may produce advantageous effects from which the expansion of T cells can benefit. This is true also for the group of gamma-chain receptor cytokines. Thus, an embodiment of the present invention relates to the aAPC scaffold as described herein, wherein the aAPC scaffold comprises at least two gamma-chain receptor cytokines.

Another embodiment of the present invention relates to the aAPC scaffold as described herein, wherein the gamma-chain receptor cytokines comprise:
 i. at least IL-2 and IL-21, or
 ii. at least IL-15 and IL-21.

A further embodiment of the present invention relates to the aAPC scaffold as described herein, wherein the gamma-chain receptor cytokines are:
 i. IL-2 and IL-21, or
 ii. IL-15 and IL-21.

Another embodiment of the present invention relates to the aAPC scaffold as described herein, wherein the gamma-chain receptor cytokines comprise:
 i. at least IL-4 and IL-21,
 ii. at least IL-7 and IL-21, or
 iii. at least IL-9 and IL-21.

Yet another embodiment of the present invention relates to the aAPC scaffold as described herein, wherein the gamma-chain receptor cytokines are:
 i. IL-4 and IL-21,
 ii. IL-7 and IL-21, or
 iii. IL-9 and IL-21.

Another type of T cell affecting molecules that may be included in the aAPC scaffolds are co-stimulatory molecules which enhance T cell response, proliferation, production and/or secretion of cytokines, stimulates differentiation and effector functions of T cells or promotes survival of T cells. Thus, co-stimulatory molecules work in nature, as well as with the aAPC scaffold, to induce T cell expansion and differentiation on their own and to enhance the effect of other T cell affecting molecules, such as cytokines. Thus, an embodiment of the present invention relates to the aAPC scaffold as described herein, wherein the T cell affecting molecule comprises at least one co-stimulatory molecule.

Another embodiment of the present invention relates to the aAPC scaffold as described herein, wherein the co-stimulatory molecule is selected from the group consisting of B7.2 (CD86), B7.1 (CD80), CD40, ICOS and PD-L1. The template molecules may be attached to the polymeric backbone via the interaction between coupling agents and affinity tags. Coupling agents are located on the polymeric backbone of the aAPC scaffold and may be attached to the backbone by, but not limited to, hydrophobic interactions, electrostatic interactions or covalent bonding. When positioned on the polymeric backbone, the coupling agents provide a flexible template to which affinity-tagged template molecules may be fixed in a modular fashion. Affinity tags are molecular species that bind specifically to the coupling agent through, but not limited to, non-covalent interactions. By attaching an affinity tag to each template molecule, it is therefore easy to assemble a custom-built aAPC scaffold.

Thus, an embodiment of the present invention relates to the aAPC scaffold as described herein, wherein the template molecules are attached to the polymeric backbone via non-covalent interactions between a coupling agent located on the polymeric backbone and an affinity tag on the template molecule.

Another embodiment of the present invention relates to the aAPC scaffold as described herein, wherein the template molecules are attached to the polymeric backbone via non-covalent interactions between a coupling agent located on the template molecule and an affinity tag on the polymeric backbone.

Many known compatible pairs of affinity tags and couplings agents may be used with the present invention and include, but are not limited to, biotin/streptavidin, biotin/avidin, biotin/neutravidin, biotin/strep-tactin, poly-His/metal ion chelate, peptide/antibody, glutathione-S-transferase/glutathione, epitope/antibody, maltose binding protein/amylase and maltose binding protein/maltose. Other known compatible pairs of affinity tags and couplings agents may also be used with the present invention.

Thus, an embodiment of the present invention relates to the aAPC scaffold as described herein, wherein the coupling agent/affinity tag is selected from the group consisting of biotin/streptavidin, biotin/avidin, biotin/neutravidin, biotin/strep-tactin, poly-His/metal ion chelate, peptide/antibody, glutathione-S-transferase/glutathione, epitope/antibody, maltose binding protein/amylase and maltose binding protein/maltose.

Another preferred embodiment of the present invention relates to the aAPC scaffold as described herein, wherein the coupling agent is streptavidin and the affinity tag is biotin.

The polymeric backbone of the aAPC scaffold to which the template molecules are attached may also be based on a variety of different materials. Thus, several types of backbones may be used with the present invention, including, but not limited to, polysaccharides, synthetic polysaccharides, vinyl polymers, poly ethylene glycol, poly propylene glycol, derivatised cellulosics, strep-tactin and poly-streptavidin. Polysaccharides may be dextran or different variants of dextrans, such as carboxy methyl dextran, dextran polyaldehyde, and cyclodextrins. An example of a synthetic polysaccharide is e.g. ficoll. Vinyl polymers include, but are not limited to, poly(acrylic acid), poly(acrylamides), poly (acrylic esters), poly(methyl methacrylate), poly(maleic acid), poly(acrylamide), poly(methacrylic acid) and poly (vinylalcohol). Polymeric backbones consisting of derivatised cellulosics include, but are not limited to, derivatised cellulosics including carboxymethyl cellulose, carboxymethyl hydroxyethyl cellulose and hydroxy-ethyl cellulose.

Additionally, there exist commercially available polymeric backbones that can serve as the basis for forming self-assembling aAPC scaffolds according to the present invention. These polymeric backbones include, but are not limited to, the Streptamers from IBA GmbH and Beckman Coulter, which are based on the Strep-tactin protein that oligomerizes to form a multimer capable of binding several biotinylated molecules such as biotinylated MHC complexes and T cell affecting molecules, such as cytokines and co-stimulatory molecules.

Thus, an embodiment of the present invention relates to the aAPC scaffold as described herein, wherein the polymeric backbone is selected from the group consisting of polysaccharides, vinyl polymers, poly ethylene glycol, poly propylene glycol, strep-tactin and poly-streptavidin.

Another embodiment of the present invention relates to the aAPC scaffold as described herein, wherein the polymeric backbone is a polysaccharide.

A further and preferred embodiment of the present invention relates to the aAPC scaffold as described herein, wherein the polysaccharide is dextran.

The size of the polymeric backbone sets the physical limits to how many template molecules that can be attached to each aAPC scaffold. The size of the polymeric backbone is given by its molecular weight.

Therefore, an embodiment of the present invention relates to the aAPC scaffold as described herein, wherein the dextran has a molecular weight in the range of 50-3000 kDa, such as 100-2500 kDa, such as 250-2500 kDa.

Another embodiment of the present invention relates to the aAPC scaffold as described herein, wherein the dextran has a molecular weight selected from the group of consisting of 250 kDa, 270 kDa, 750 kDa, and 2000 kDa.

In addition to the number of molecules attached to each aAPC scaffold, another important parameter is the density with which the template molecules are distributed on the polymeric backbone. The density may be varied by adjusting the ratio between all molecules comprised by the aAPC scaffold. Thus, an embodiment of the present invention relates to the aAPC scaffold as described herein, wherein the ratio between polymeric backbone:MHC class I molecule: co-stimulatory molecule:cytokine is selected from the group consisting of 1:1:1:1, 1:2:1:1, 1:4:1:1, 1:4:2:1, 1:4:2:2, 1:10: 5:5, 1:4:4:4, 1:8:8:8, 1:10:10:10, 1:20:20:20, 1:30:30:30, 1:40:40:40, 1:50:50:50, 1:50:10:10 or 1:50:20:20. Another embodiment of the present invention relates to the aAPC scaffold as described herein, wherein the ratio between polymeric backbone:MHC class I molecule:cytokine 1:cytokine 2 is selected from the group consisting of 1:1:1:1, 1:2:1:1, 1:4:1:1, 1:4:2:1, 1:4:2:2, 1:10:5:5, 1:4:4:4, 1:8:8:8, 1:10:10:10, 1:20:20:20, 1:30:30:30, 1:40:40:40, 1:50:50:50, 1:50:10:10 or 1:50:20:20.

Still another embodiment of the present invention relates to the aAPC scaffold as described herein, wherein the ratio between polymeric backbone:MHC class I molecule:co-stimulatory molecule:cytokine 1:cytokine 2 is selected from the group consisting of 1:1:1:1:1, 1:2:1:1:1, 1:4:1:1:1, 1:4: 2:1:1, 1:4:2:2:2, 1:10:5:5:5, 1:4:4:4:4, 1:8:8:8:8, 1:10:10:10: 10, 1:20:20:20:20, 1:30:30:30:30, 1:40:40:40:40, 1:50:50: 50:50, 1:50:10:10:10 or 1:50:20:20:20.

The present invention may be suitable for expansion of T cells from a variety of subjects. Thus, an embodiment of the present invention relates to the aAPC scaffold as described herein, wherein the at least one MHC class I molecule is a vertebrate MHC molecule, such as a human, murine, rat, porcine, bovine or avian molecule.

Another preferred embodiment of the present invention relates to the aAPC scaffold as described herein, wherein the vertebrate MHC class I molecule is a human molecule.

As described above, MHC molecules exist in several variants. MHC molecules include, but are not limited to, MHC class I molecules and MHC class I like molecules. MHC class I like molecules include, but are not limited to, CD1a, CD1b, CD1c, CD1d, MICA, MICB, MR1, ULBP-I, ULBP-2, and ULBP-3.

A preferred embodiment of the present invention relates to the aAPC scaffold as described herein, wherein the at least one MHC class I molecule is a human MHC class I molecule. In humans, the major histocompatibility complex (MHC) is encoded by a gene complex called the human leukocyte antigen (HLA) complex. The HLAs corresponding to MHC class I are called HLA-A, HLA-B and HLA-C. Thus, another embodiment of the present invention relates to the aAPC scaffold as described herein, wherein the at least one MHC class I molecule is selected from the group consisting of HLA-A, HLA-B and HLA-C.

The aAPC scaffold described herein comprises MHC class I molecules stabilized by a disulfide bridge connecting the alpha-1 and alpha-2 domains. While this enables the formation of aAPC scaffolds with MHC class I molecules free of antigenic peptide, the aAPC scaffolds may be provided either with or without antigenic loaded MHC class I molecules. Even when provided with unloaded MHC class I molecules, the eventually intended use of the aAPC scaffold includes loading with antigenic peptide, thereby forming pMHC molecules.

Thus, an embodiment of the present invention relates to the aAPC scaffold as described herein, wherein the MHC class I molecule comprises a peptide-binding groove free of antigenic peptide.

Another embodiment of the present invention relates to the aAPC scaffold as described herein, wherein the MHC class I molecule comprises a peptide-binding groove comprising an antigenic peptide (pMHC).

The antigenic peptide presented by the pMHC molecule ultimately decides which type of T cells will be expanded by the aAPC scaffold—the concept previously referred to as MHC restriction. The antigenic peptides suitable for use with the aAPC scaffold according to the present invention may essentially come from any source. The antigenic source may include, but is not limited to, a human, a virus, a bacterium, a parasite, a plant, a fungus, or a tumor. Thus, an embodiment of the present invention relates to the aAPC scaffold as described herein, wherein the antigenic peptide of the pMHC is derived from a source selected from the group consisting of a human, a virus, a bacterium, a parasite, a plant, a fungus, and a tumor.

One use of the aAPC scaffold of the present invention is in the expansion of tumor-reactive T cells for use in adoptive cell transfer (ACT). The strength of the ACT strategy is that T cells are present ex vivo in an environment that, contrary to the local tumor environment, is optimal for efficient expansion of an antigen specific T cell population.

Another potential use of the aAPC scaffold of the present invention is for expansion of a T cell population specific for fighting certain infections that typically arise in the wake of transplantation. Patients receiving transplants are typically subject to immunosuppressive treatment to avoid graft rejection. In many cases, such treatment leaves the patient vulnerable to aggressive viral strains causing severe infections of the already weakened patient. The aAPC scaffold of the present invention is perfectly suited for efficient expansion of T cells extracted from transplantation patients, with the aim of treating any severe infections by the ACT strategy.

Thus, an embodiment of the present invention relates to the aAPC scaffold as described herein, wherein the antigenic peptide of the pMHC is a cancer-associated epitope or virus epitope.

An alternative embodiment of the present invention relates to the aAPC scaffold as described herein, wherein the antigenic peptide of the pMHC is a neoepitope, such as a cancer neoepitope or a cancer neoantigen.

Another embodiment of the present invention relates to the aAPC scaffold as described herein, wherein the cancer-associated epitope is a virus epitope associated with a virus-induced cancer.

Yet, another embodiment of the present invention relates to the aAPC scaffold as described herein, wherein the cancer-associated epitope is an overexpression antigen associated with cancer.

A further embodiment of the present invention relates to the aAPC scaffold as described herein, wherein the cancer-associated epitope is a cancer testis antigen.

The aAPC scaffold of the present invention functions with any antigenic peptide that may be presented by the pMHC molecules attached to the polymeric backbone. Some indications are preferred in the present invention.

Thus, a preferred embodiment of the present invention relates to the aAPC scaffold as described herein, wherein the virus epitope is from a virus selected from the group consisting of human papillomavirus (HPV), Merkel cell polyomavirus (MCV), cytomegalovirus (CMV), Epstein-Barr virus (EBV), human T-lymphotropic virus (HTLV), hepatitis B virus (HBV), hepatitis C virus (HCV) and influenza virus.

To optimize the efficiency of each aAPC scaffold with regard to the accuracy with which the aAPC scaffold is capable of expanding a single T cell specificity, in one version of the present invention, each aAPC scaffold is only harbouring a single variant of MHC class I molecule, e.g. with the intention to purposefully load only one antigenic peptide for each type of aAPC scaffold.

Therefore, an embodiment of the present invention relates to the aAPC scaffold as described herein, wherein the aAPC scaffold comprises identical MHC class I molecules.

By displaying only a single antigenic peptide for each aAPC scaffold, competition between T cells of different specificities is limited to a minimum. If desired, several different scaffolds presenting different peptides may be pooled together and expanded simultaneously. The simultaneous expansion of T cells with a variety of different specificities is possible because competition between T cell is kept at a minimum due to the aAPC scaffold clustering all the template molecules (i.e. the pMHC and T cell affecting molecules) in close proximity to each other. Consequently, the T cell population expanded by use of the aAPC scaffolds of the present invention retain specificity and the pool of different specificities ensures the breadth of any immune response if re-introduced into a subject. This latter characteristic is clinically important to avoid immune escape variants. The breadth of the response may be tuned by deciding how many different aAPC scaffolds are pooled together in a single expansion.

The polymeric backbone may comprise any number of MHC class I molecules that is reasonable according to the size of the polymeric backbone. Therefore, an embodiment of the present invention relates to the aAPC scaffold as described herein, wherein each polymeric backbone comprises at least 5 MHC class I molecules, such as at least 8, such as at least 10, such as at least 20, such as at least 30, such as at least 40, such as at least 50 or such as at least 100.

An alternative embodiment of the present invention relates to the aAPC scaffold as described herein, wherein each polymeric backbone comprises at least 2 MHC class I molecules, such as at least 3 or such as at least 4.

For some applications it may be practical to immobilized the aAPC scaffolds on a solid support, e.g. for certain types of analytics or for separation of the aAPC scaffolds from the expanded T cell population. Thus, an embodiment of the present invention relates to the aAPC scaffold as described herein, wherein said aAPC scaffold is immobilized on a solid support.

Another embodiment of the present invention relates to a solid support whereto are directly attached template molecules as described herein. Thus, in this special case, the template molecules are not placed on the polymeric backbone of the aAPC scaffold.

Many variants of solid supports exist and may be selected according to the application of the aAPC scaffold. Variants of solid support include, but are not limited to, beads, well plates, particles, filters, gels, tubes, and petri dishes. Thus, an embodiment of the present invention relates to the aAPC scaffold as described herein, wherein the solid support is selected from the group consisting of beads, well plates, particles, filters, gels, tubes, and petri dishes.

The aAPC scaffold may be attached to the solid support by any conventional means, such as by linkers, antibodies or the like.

A plethora of different template molecules exist and therefore a multiplicity of different aAPC scaffold can be assembled. The inventors have found that certain combinations of template molecules yield especially efficient and preferred aAPC scaffolds.

A further embodiment of the present invention relates to the aAPC scaffold as described herein, wherein i. the polymeric backbone is dextran, ii. the gamma-chain receptor cytokines are IL-15 and IL-21, and iii. the co-stimulatory molecule is B7.2 (CD86).

Another embodiment of the present invention relates to the aAPC scaffold as described herein, wherein the ratio between MHC class I molecules, IL-15, IL-21 and B7.2 (CD86) on the dextran backbone is 2:1:1:1.

Yet another embodiment of the present invention relates to the aAPC scaffold as described herein, wherein the ratio between dextran backbone, MHC class I molecules, IL-15, IL-21 and B7.2 (CD86) is 1:10:5:5:5.

A further embodiment of the present invention relates to the aAPC scaffold as described herein, wherein the gamma-chain receptor cytokines are IL-2, IL-15 and IL-21.

An even further embodiment of the present invention relates to the aAPC scaffold as described herein, wherein
i. the polymeric backbone is dextran, and
ii. the gamma-chain receptor cytokines are IL-21, IL-2 and IL-15.

An embodiment of the present invention relates to the aAPC scaffold as described herein, wherein the ratio between dextran backbone, MHC class I molecules, IL-2, IL-15 and IL-21 is 1:10:5:5:5.

Yet another embodiment of the present invention relates to the aAPC scaffold as described herein, wherein
i. the polymeric backbone is dextran,
ii. the gamma-chain receptor cytokines are IL-2, IL-15 and IL-21, and
iii. the co-stimulatory molecule is B7.2 (CD86).

Another embodiment of the present invention relates to the aAPC scaffold as described herein, wherein the ratio between dextran backbone, MHC class I molecules, IL-2, IL-15, IL-21 and B7.2 (CD86) is 1:10:5:5:5:5.

A preferred embodiment of the present invention relates to the aAPC scaffold as described herein, wherein
i. the polymeric backbone is dextran, and
ii. the gamma-chain receptor cytokines are IL-2 and IL-21, or IL-15 and IL-21.

Still another embodiment of the present invention relates to the aAPC scaffold as described herein, wherein the cytokines comprise at least IL-6 and IL-10.

A further embodiment of the present invention relates to the aAPC scaffold as described herein, wherein
i. the polymeric backbone is dextran,
ii. the co-stimulatory molecule is B7.2 (CD86), and
iii. the cytokines are IL-6 and IL-10.

A still further embodiment of the present invention relates to the aAPC scaffold as described herein, wherein the ratio between MHC class I molecules, IL-6, IL-10 and B7.2 (CD86) on the dextran backbone is 2:1:1:1.

An even further embodiment of the present invention relates to the aAPC scaffold as described herein, wherein the ratio between dextran backbone, MHC class I molecules, IL-6, IL-10 and B7.2 (CD86) is 1:10:5:5:5.

An embodiment of the present invention relates to the aAPC scaffold as described herein, wherein the gamma-chain receptor cytokines comprise at least IL-2 and IL-21.

A further embodiment of the present invention relates to the aAPC scaffold as described herein, wherein
i. the polymeric backbone is dextran, and
ii. the gamma-chain receptor cytokines are IL-2 and IL-21.

Yet another embodiment of the present invention relates to the aAPC scaffold as described herein, wherein the ratio between MHC class I molecules, IL-2 and IL-21 on the dextran backbone is 1:1:1.

Another embodiment of the present invention relates to the aAPC scaffold as described herein, wherein the co-stimulatory molecules comprise at least B7.2 (CD86).

Still another embodiment of the present invention relates to the aAPC scaffold as described herein, wherein the ratio between dextran backbone, MHC class I molecules, IL-2 and IL-21 is 1:8:8:8.

A further embodiment of the present invention relates to the aAPC scaffold as described herein, wherein the polymeric backbone comprises at least IL-1 and PD-L1.

A still further embodiment of the present invention relates to the aAPC scaffold as described herein, wherein
i. the polymeric backbone is dextran,
ii. the co-stimulatory molecules are B7.2 (CD86) and PD-L1, and
iii. the cytokine is IL-1.

An even further embodiment of the present invention relates to the aAPC scaffold as described herein, wherein the ratio between MHC class I molecules, IL-1, B7.2 (CD86) and PD-L1 on the dextran backbone is 2:1:1:1.

Another embodiment of the present invention relates to the aAPC scaffold as described herein, wherein the ratio between dextran backbone, MHC class I molecules, IL-1, B7.2 (CD86) and PD-L1 is 1:10:5:5:5.

Yet another embodiment of the present invention relates to the aAPC scaffold as described herein, wherein
i. the polymeric backbone is dextran,
ii. the co-stimulatory molecules are B7.2 (CD86) and ICOS, and
iii. the cytokine is IL-10.

Still another embodiment of the present invention relates to the aAPC scaffold as described herein, wherein
i. the polymeric backbone is dextran, and
ii. the cytokines are IL-1 and IL-2.

A further embodiment of the present invention relates to the aAPC scaffold as described herein, wherein
i. the polymeric backbone is dextran, and
ii. the cytokines are IL-2 and IL-15.

The aAPC scaffolds of the present invention may be part of a kit suitable for use by hospitals and laboratories. Such a kit may comprise one or more different aAPC scaffolds suitable for expanding T cells with different specificities, as well as medium suitable for expanding T cells extracted from a sample. The kit may also hold other compounds or molecules necessary for the expansion of a T cell-containing sample.

Thus, an aspect of the present invention relates to a kit for expansion of T cells, the kit comprising:
i. a first storage means comprising at least one aAPC scaffold as described herein, and
ii. a second storage means comprising at least one antigenic peptide, wherein the contents of the first storage means and the second storage means are configured to be combined.

An embodiment of the present invention relates to the kit as described herein, wherein the second storage means comprises a library of antigenic peptides. The library of antigenic peptides may contain a selection of the most frequently used antigenic peptides.

The aAPC scaffolds of the present invention may be used as an immunotherapy for direct administration into a subject to aid the immune system of the subject. The aAPC may be administered either locally or systemically via any route, such as intravenous, intraperitoneal, intramuscular, subcutaneous, transdermal or oral.

The aAPC scaffold as described herein may be utilized as part of an automated system for T cell expansion and/or adoptive T cell (ACT) therapy. Thus, the aAPC scaffolds may be a constituent of a device or system e.g. for manufacturing of T cells for clinical use. Thus, an embodiment of the present invention relates to a device or system for T cell expansion and/or adoptive T cell (ACT) therapy comprising the aAPC scaffold as described herein. The aAPC scaffold may be used for cell manufacturing in combination with various form of fluorescence activated cell sorting or similar cell-selection strategies.

Method of T-Cell Expansion

By extracting immune-reactive T cells from a unhealthy subject, expanding the T cells ex vivo and re-introducing the expanded T cell population into the subject, it is possible to overcome some of the challenges of immune suppressive diseases that otherwise render the immune system paralysed.

However, although the extraction of T cells from e.g. peripheral blood by apheresis procedures and subsequent re-introduction into the patient is unproblematic, the activation and expansion of T cells of a given specificity remains a great challenge with the resulting T cell population often lacking sufficient differentiation and functional capacity.

The aAPC scaffold of the present invention is suitable for simultaneous in vitro stimulation and expansion of T cells and yields T cell populations with a high ratio of active T cells, high antigen specificity of the T cells and high functionality of the T cells. Thus, another aspect of the present invention relates to a method for simultaneous in vitro stimulation and expansion of T cells, comprising the following steps:

i. providing a sample comprising T cells,
ii. contacting said sample with an expansion solution comprising an aAPC scaffold as described herein,
iii. stimulating and expanding T cells with specificity for said aAPC scaffold in culture, and
iv. harvesting the T cells of step iii) from the culture to obtain an expanded antigen-specific population of T cells.

An embodiment of the present invention relates to the method for simultaneous in vitro stimulation and expansion of T cells, comprising the following steps:

i. providing an aAPC scaffold as described herein, wherein the MHC class I molecule comprises a peptide-binding groove free of antigenic peptide,
ii. mixing said aAPC scaffold with an antigenic peptide to provide a loaded aAPC scaffold comprising pMHC molecules,
iii. providing a sample comprising T cells,
iv. contacting said sample with the loaded aAPC scaffold of step ii),
v. stimulating and expanding T cells with specificity for said loaded aAPC scaffold in culture, and
vi. harvesting the T cells of step iii) from the culture to obtain an expanded antigen-specific population of T cells.

The sample comprising the T cells is extracted from a subject and subsequently put into a culture comprising the aAPC scaffold under conditions that allow growth of the T cells. Thus, it is to be understood that the expansion of the T cells is to be carried out in a solution or medium that in addition to the aAPC scaffold contains all the necessary compounds and factors for cell proliferation. Thus, the culture in which the T cell expansion is carried out may contain compounds that inhibit growth of irrelevant cells or promote growth of the T cells, e.g. IL-2.

To enhance the quality of the expanded T cell population, the aAPC scaffold may be filtered by centrifugation through a molecular weight cut-off filter in order to remove all non-bound pMHC molecules prior to mixing of the aAPC with the sample. This is to avoid stimulation from pMHC molecules not conjugated to scaffolds, and to remove excess antigenic peptide and T cell affecting molecules to limit the stimulation of irrelevant T cell subsets. The same applies to antigenic peptides not complexed to MHC molecules, which can also be removed by centrifugation through a molecular weight cut-off filter.

Thus, an embodiment of the present invention relates to the method as described herein, wherein the expansion solution is filtered before contact with the sample.

Another embodiment of the present invention relates to the method as described herein, wherein the expansion solution is filtered by centrifugation through molecular weight cut-off filters.

An advantage of the aAPC scaffolds of the present invention is that they allow simultaneous expansion of different T cell specificities because the cross-reactivity when using multiple different aAPC scaffolds is reduced to a minimum as explained above. The method of the present invention is therefore also effective for samples containing a variety of T cells with different specificities.

Therefore, an embodiment of the present invention relates to the method as described herein, wherein said sample of step i) comprises T-cells of at least 2 different specificities, such as at least 5 different specificities, such as at least 10 different specificities, such as at least 15 different specificities, such as at least 20 different specificities, or such as at least 50 different specificities.

Another embodiment of the present invention relates to the method as described herein, wherein said solution comprising an aAPC scaffold comprises at least 2 different aAPC scaffolds, such as at least 5 different aAPC scaffolds, such as at least 10 different aAPC scaffolds, such as at least 15 different aAPC scaffolds, such as at least 20 different aAPC scaffolds, or such as at least 20 different aAPC scaffolds.

Yet another embodiment of the present invention relates to the method as described herein, wherein T-cells of at least 2 different specificities are stimulated and expanded in parallel in the same sample, such as at least 5 different specificities, such as at least 10 different specificities, such as at least 15 different specificities, or such as at least 20 different specificities.

A further embodiment of the present invention relates to the method as described herein, wherein the method comprises the following steps:

i. providing a sample comprising T cells with at least 5 different specificities,
ii. contacting said sample with an expansion solution comprising at least 5 different aAPC scaffolds,
iii. parallel stimulation and expansion of said T cells with at least 5 different specificities for said at least 5 different aAPC scaffolds in culture, and
iv. harvesting the T cells of step iii) from the culture to obtain an expanded antigen-specific population of T cells with at least 5 different specificities.

The sample comprising the T cells to be expanded may originate from any source, but is typically extracted from blood, a tissue or a body fluid. Thus, an embodiment of the present invention relates to the method as described herein, wherein the sample is selected from the group consisting of peripheral blood mononuclear cells, tumors, tissue, bone marrow, biopsies, serum, blood, plasma, saliva, lymph fluid, pleura fluid, cerospinal fluid and synovial fluid.

The sample comprising the T cells to be expanded according to the method described herein may also be selected from stem cells or, TCR modified/transduced cells.

The method of the present invention may be used to expand any T cell expressing the TCR necessary for interaction with the pMHC molecule on the aAPC scaffold. The T cells suitable for expansion by the method of the present invention therefore include, but are not limited to, CD8 T cells, CD4 T cells, regulatory T cells, natural killer T (NKT) cells, alpha-beta T cells, gamma-delta T cells, NK cells, innate mucosal-associated invariant T (MAIT) cells, and lymphokine-activated killer (LAK) cells.

T-cell receptor (TCR) gene therapy does not rely on the pre-existing presence of tumor-reactive T cells, and does allow one to target defined cancer antigenic peptides of choice. This approach is based on the observation that antigen specificities can be transferred between T cells by introducing genes encoding the TCRα- and β-chain that together form the αβ-TCR heterodimer. Thus, introduction of genes encoding a tumor-reactive TCR can be used to re-direct patient-derived cells (autologous) or non-patient derived cells (heterologous) cells toward an antigen of interest, thereby establishing a tumor-reactive T-cell compartment that would be otherwise absent. By now, several TCR engineered therapeutic approaches have shown clinical activity in solid tumors. Most of these TCR therapeutic approaches depend on ex vivo expansion of TCR transduced cells. These cells could be autologous or heterologous T cells, NK cells, MAIT cells or NKT cells. Since the cancer-specific TCR gene is transduced into the cells these do not rely on the pre-existing presence of any TCR and thus need not necessarily be T cells.

Thus, an embodiment of the present invention relates to the method as described herein, wherein the T cells are selected from the group consisting of CD8 T cells, CD4 T cells, regulatory T cells, natural killer T (NKT) cells, gamma-delta T cells, NK cells and innate mucosal-associated invariant T (MAIT) cells.

A preferred embodiment of the present invention relates to the method as described herein, wherein the T cells are CD8 T cells.

Yet another embodiment of the present invention relates to the method as described herein, wherein the T cells are CAR T cells.

For the re-introduction of an expanded T cell population into a patient to be meaningful from a therapeutic perspective, it is necessary that the extracted T cells are expanded to a clinically relevant number. Expansion of T cells by the method of the present invention may be on the order of 100-3000 fold. The number of cells available before re-introduction into a patient may be in the range of $10^5$-$10^{12}$ cells per administration, such as $10^5$-$10^{10}$ cells per administration, such as $10^6$-$10^9$ cells per administration. Cells are administered in a volume of 20 mL to 1 L depending on the route of administration.

Therefore, an embodiment of the present invention relates to the method as described herein, wherein the T cells are expanded to a clinically relevant number.

As described above for the aAPC scaffold, the MHC class I molecules may present a variety of antigenic peptides. The same considerations regarding the choice of antigenic peptides apply for the method. Thus, an embodiment of the present invention relates to the method as described herein, wherein the antigenic peptide of the pMHC is a cancer-associated epitope or virus epitope.

Another embodiment of the present invention relates to the method as described herein, wherein the antigenic peptide comprises a cancer-associated epitope or virus epitope.

Another embodiment of the present invention relates to the method as described herein, wherein the cancer-associated epitope is a virus epitope associated with a virus-induced cancer.

Yet another embodiment of the present invention relates to the method as described, wherein the virus epitope is from a virus selected from the group consisting of human papillomavirus (HPV), Merkel cell polyomavirus (MCV), cytomegalovirus (CMV), Epstein-Barr virus (EBV), human T-lymphotropic virus (HTLV), hepatitis B virus (HBV), hepatitis C virus (HCV) and influenza virus.

Use of the Expanded T-Cell Population

It is envisioned that the expanded T cell population obtained by the method of the present invention can be used effectively in a treatment regimen focusing on adoptive immunotherapy (or adoptive cell transfer). In such a treatment regimen, immune-reactive T cells from a subject in need of treatment are extracted. The subject may be any mammal, such as humans, cows, pigs, birds, dogs, cats, mice, rats and the like. The source of the T cells may for example be peripheral blood mononuclear cells, tumors, tissue, bone marrow, biopsies, serum, blood, plasma, saliva, lymph fluid, pleura fluid, cerospinal fluid or synovial fluid.

Once extracted from the subject, the sample containing the T cells of the desired specificity or specificities is expanded using an aAPC scaffold customized to the subject and the condition or the disease to be treated. This expansion is conducted in accordance with the method of the present invention as described above. When the T cell population has been expanded to a clinically relevant number, it is administered to the subject to induce an immune response and treat the disease.

Consequently, an aspect of the present invention relates to an expanded T cell population obtained by the method as described herein.

T cell populations expanded with the aAPC scaffolds disclosed herein have several favourable characteristics, such as high fraction of antigen specific cells, multicytokine secretion profile, young phenotype and less exhaustion. Multicytokine secretion profile may be characterized by simultaneous secretion of INF-γ and TNF-α, and cytotoxic degranulation. A young phenotype may be characterized by high expression of activators, such as CD28. Decreased exhaustion may be characterized by low expression of inhibitors, such as PD1. Thus, an embodiment of the present invention relates to an expanded T cell population obtained by the method as described herein, wherein the expanded T cell population possess at least one, such as at least two, such as least three, characteristic selected from the group consisting of:
  i. antigen specific T cells after 2 weeks of culturing are expanded at least 10-fold,
  ii. secretion of INF-γ and TNF-α upon later antigen challenge,
  iii. high expression of CD28, and
  iv. low expression of PD1.

Another embodiment of the present invention relates to an expanded T cell population obtained by the method as described herein, wherein the expanded T cell population comprises the following characteristics:
  i. antigen specific T cells after 2 weeks of culturing are expanded at least 10-fold, and
  ii. secretion of INF-γ and TNF-α upon later antigen challenge, A further embodiment of the present invention relates to an expanded T cell population obtained by the method as described herein, wherein the expanded T cell population comprises the following characteristics:
  i. antigen specific T cells after 2 weeks of culturing are expanded at least 10-fold,
  ii. secretion of INF-γ and TNF-α upon later antigen challenge,
  iii. high expression of CD28, and
  iv. low expression of PD1.

An even further embodiment of the present invention relates to an expanded T cell population obtained by the method as described herein, wherein antigen specific T cells after 2 weeks of culturing are expanded at least 10-fold, such as at least 25-fold, such as at least 50-fold, such as at least 100-fold, such as at least 1000-fold, such as at least 5000-fold.

Yet another embodiment of the present invention relates to an expanded T cell population obtained by the method as described herein, wherein antigen specific T cells after 2 weeks of culturing are expanded in the range of 10-fold to 5000-fold, such as 100-fold to 1000-fold.

An additional embodiment of the present invention relates to an expanded T cell population obtained by the method as described herein, wherein high expression of CD28 is defined as at least two fold increased expression of CD28, such as at least five fold increased expression, such as at least ten fold increased expression, compared to CD28 expression of unexpanded unspecific T cells in the sample.

Another embodiment of the present invention relates to an expanded T cell population obtained by the method as described herein, wherein low expression of PD1 is defined as at maximum half (50%) the expression of PD1, such as at maximum a quarter (25%) expression, such as at maximum a tenth (10%) expression, compared to PD1 expression of unexpanded unspecific T cells in the sample.

A fourth aspect of the present invention relates to an expanded T-cell population obtained by the method as described herein for use as a medicament.

More specifically, an embodiment of the of the present invention relates to a method for adoptive immunotherapy of a disease or disorder comprising
 i. extracting a sample comprising T cells from a subject,
 ii. contacting said sample with an expansion solution comprising an aAPC scaffold as described herein,
 iii. stimulating and expanding T cells with specificity for said aAPC scaffold in culture,
 iv. harvesting the T cells of step iii) from the culture to obtain an expanded antigen-specific population of T cells, and
 v. administering the expanded antigen-specific population of T cells to the subject in an amount effective to induce an immune response.

As described above for the aAPC scaffold, the MHC class I molecules may present a variety of antigenic peptides. The same considerations regarding the choice of antigenic peptides apply for the use of the expanded T-cell population obtained by the method of the present invention.

Thus, another aspect of the present invention relates to an expanded T-cell population obtained by the method as described herein for use in the treatment of a cancer or viral condition.

An embodiment of the present invention relates to the expanded T-cell population for use as described herein, wherein the cancer is associated with a viral condition.

Another embodiment of the present invention relates to the expanded T-cell population for use as described herein, wherein the viral condition is associated with a virus selected from the group consisting of human papillomavirus (HPV), Merkel cell polyomavirus (MCV), cytomegalovirus (CMV), Epstein-Barr virus (EBV), human T-lymphotropic virus (HTLV), hepatitis B virus (HBV), hepatitis C virus (HCV) and influenza virus.

The expanded T cell population obtained by the method as described herein may be formulated in a pharmaceutical composition further comprising one or more adjuvants and/or excipients and/or a pharmaceutically acceptable carrier. The excipients may include, but are not limited to, buffers, suspending agents, dispersing agents, solubilising agents, pH-adjusting agents and/or preserving agents.

The pharmaceutical composition may be used in adoptive immunotherapy (or adoptive cell transfer) for administration either locally or systemically via any route, such as intravenous, intraperitoneal, intramuscular, subcutaneous, transdermal or oral.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1: Expansion of Antigen-Specific CD8 T Cells Using Antigen Presenting Scaffold (FIG. 2)

HLA-A1 FLU BP-VSD (VSDGGPNLY (SEQ ID NO:29)) specific CD8 T cells from a healthy donor were expanded in parallel in the presence of either antigen presenting scaffold with the ratio 1:10:5:5:5 (scaffold:pMHC:B7-2:IL-15:IL-21), free FLU BP-VSD peptide (SEQ ID NO:29), IL-15, and IL-21 cytokines, or antigen presenting scaffold with the ratio 1:10:5:5:5 carrying an irrelevant peptide specificity in the MHC complex. aAPC scaffolds were prepared with wild type MHC. All cultures were supplemented with 20 IU/ML IL-2 and cultured for 2 weeks. The expansion of the HLA-A1 FLU BP-VSD specific CD8 T cells were traced by tetramer staining once a week. Representative dot plots are shown in FIG. 2.

Conclusion: (FIGS. 2A-D) This experiment demonstrates that it is feasible to expand antigen-specific CD8 T cells with low frequent baseline responses in a pMHC directed manner, using antigen presenting scaffolds. When comparing expansion of cells stimulated with peptide, IL-15 and IL-21 added freely in the culture media, and cells stimulated with antigen presenting scaffolds, it is clear that cells stimulated with antigen presenting scaffolds have expanded the most both in frequency and in absolute number of specific CD8 T cell (see FIGS. 2E-F). Furthermore, antigen presenting scaffolds carrying irrelevant peptide MHC specificity were not able to stimulate A1 FLU BP-VSD specific CD8 T cell expansion, demonstrating that the cells cannot benefit from the co-attached cytokines and co-stimulatory molecules, without established pMHC directed interaction.

Example 2: Production of Cys-Mutant MHC (Antigen/Peptide Receptive) and Assembly of Artificial Antigen Presenting Cell (aAPC) Scaffolds for Specific T Cell Expansion Here is described how aAPC scaffolds can be made by coupling MHC complexes and T cell affecting molecules, such as cytokines and stimulatory molecules, to dextran via a streptavidin-biotin interaction. In this example, both wt MHC as well as disulfide stabilized Cys-mutant MHC were prepared and used for assembly of aAPC scaffolds. In principle, biotin-streptavidin can be replaced by any dimerization domain, where one half of the dimerization domain is coupled to the MHC complex or T cell affecting molecule and the other half is coupled to dextran or similar scaffold backbone.

Streptavidin modified dextran is commercially available in various sizes of dextran such as MW 250 KDa, 750 KDa, 2000 KDa from Fina Biosolutions and from Immudex with dextran of approximately 270 KDa.

Both wt MHC and Cys-mutant MHC were produced by classical E. coli expression, here exemplified using the heavy chain of wt HLA-A 02:01 with an Avi-tag (SEQ ID NO: 17) and the heavy chain of Cys-mutant HLA-A 02:01 with an Avi-tag (SEQ ID NO: 14), respectively. Briefly, both wt MHC and MHC Cys-mutant protein and light chain beta-2 microglobulin (β2M) protein were produced in *E. coli* using pET series plasmid. Inclusion bodies containing the *E. coli* produced proteins were harvested by sonication, lysing the *E. coli* cells in lysis buffer (Tris-Cl 50 mM, pH 8.0, 1 mM EDTA, 25% sucrose). Soluble fraction of denatured protein was harvested from inclusion bodies by washing in detergent buffer (Tris-Cl 20 mM, pH 7.5, 200 mM NaCl, 2 mM EDTA, NP40 1%, Deoxycholic acid 1%), and wash buffer (0.5% Triton X-100, 1 mM EDTA), followed by 48 hour incubation at 4° C. in re-solubilization buffer (HEPES 50 mM, pH 6.5, 8 M urea, 0.1 mM β-mercaptoethanol) and stored in −80° C. until used for MHC class I monomer production.

Cys-mutant MHC monomers were made by in vitro folding (folding buffer: 100 mM Tris-Cl, pH 8.0, 400 mM L-arginine, 2 mM EDTA, and protease inhibitor cocktail) of Cys-mutant MHC protein and β2M in the presence of a helper molecule, such as e.g. a dipeptide/tripeptide/small molecule. wt MHC were made like Cys-mutant MHC monomers except that no helper molecules were included. Instead the wt MHC molecule was refolded in the presence of the UV-labile peptide KILGFVF-X-V (SEQ ID NO:24), where X refers to a UV sensitive amino acid, 3-amino-2-(2-nitrophenyl) propionic acid, which upon exposure to UV light breaks the full length peptide. The reduced binding affinity of the resulting cleaved peptide fragments to the MHC molecules enables binding of incoming exchange antigenic peptide.

MHC monomers were purified by conventional size exclusion chromatography. Alternatively, other standard protein purification methods could be used. Purification of Cys-mutant MHC monomers by size exclusion chromatography can be performed using buffers with or without MHC monomer stabilizing helper molecules, such as the dipeptide glycine-leucine.

Such produced stable Cys-mutant MHC monomers without antigenic peptide (empty MHC monomers) are highly useful for the rapid generation of large numbers of antigenic peptide loaded MHC monomers for various research, diagnostic and therapeutic uses. Antigenic peptide loaded Cys-mutant MHC (pMHC) monomers can be prepared by incubating 100 μM peptide with 200 μg/ml of Cys-mutant empty MHC monomers for 30-60 minutes at room temperature. Wt pMHC can be produced from MHC monomers with UV-labile peptides by including 200 μM antigen-peptide of choice and subsequent exposure of the monomer to UV light at 360 nm for 1 hour.

pMHC and T cell affecting molecules, such as cytokines and co-stimulatory molecules, can be biotinylated by both standard chemical and enzymatic protocols. For example, pMHC can be enzymatically biotinylated by including a biotinylation consensus peptide sequence in the MHC heavy chain allowing site-specific biotinylation using BirA enzyme and free biotin. Cytokines and co-stimulatory molecules are commercially available from suppliers such as BioLegend and PreProtech. These proteins are readily biotinylated by using commercially available biotinylation reagents such as EZ-Link Sulfo-NHS-LC-Biotin from ThermoFisher Scientific and reacting according to supplier's protocol.

In the examples described herein, aAPC scaffolds were assembled via the streptavidin-biotin interaction. Briefly, biotinylated molecules and streptavidin conjugated dextran was combined in aqueous buffer, such as PBS, in relative stoichiometry according to the examples described below to give a final concentration of 60 nM assembled aAPC scaffold. The aAPC scaffold was allowed to assemble at 4° C. for one hour and was thereafter kept at 4° C. until addition to the cell culture. Assembled scaffolds can be stored at 4° C. for at least one month. Assembled aAPC scaffold can be purified and separated from unbound antigenic peptide, pMHC, cytokines and co-stimulatory molecules by centrifuging unbound molecules through a MW cut-off filter such as an Amicon Ultra centrifugal filter units Ultra-4, MWCO 100 kDa.

The T cell cultures were established from human PBMCs or TILs and initiated with $2 \times 10^6$ cells/ml in 48 well flat bottom culture plates and cultured for 2 weeks at 37° C. and 5% $CO_2$. The cells were stimulated twice a week by adding 0.2 nM final aAPC scaffold in 1 mL fresh X-VIVO 15 media supplemented with 5% heat inactivated human serum. After 1 week of culturing, the cells were transferred to 24 well flat bottom culture plates, and once a week a sample was taken from the cultures for MHC tetramer staining to track the expansion of antigen-specific CD8 T cells by flow cytometry.

Example 3: Expansion of Antigen-Specific CD8 T Cells Using aAPC Scaffolds

Figure 3:
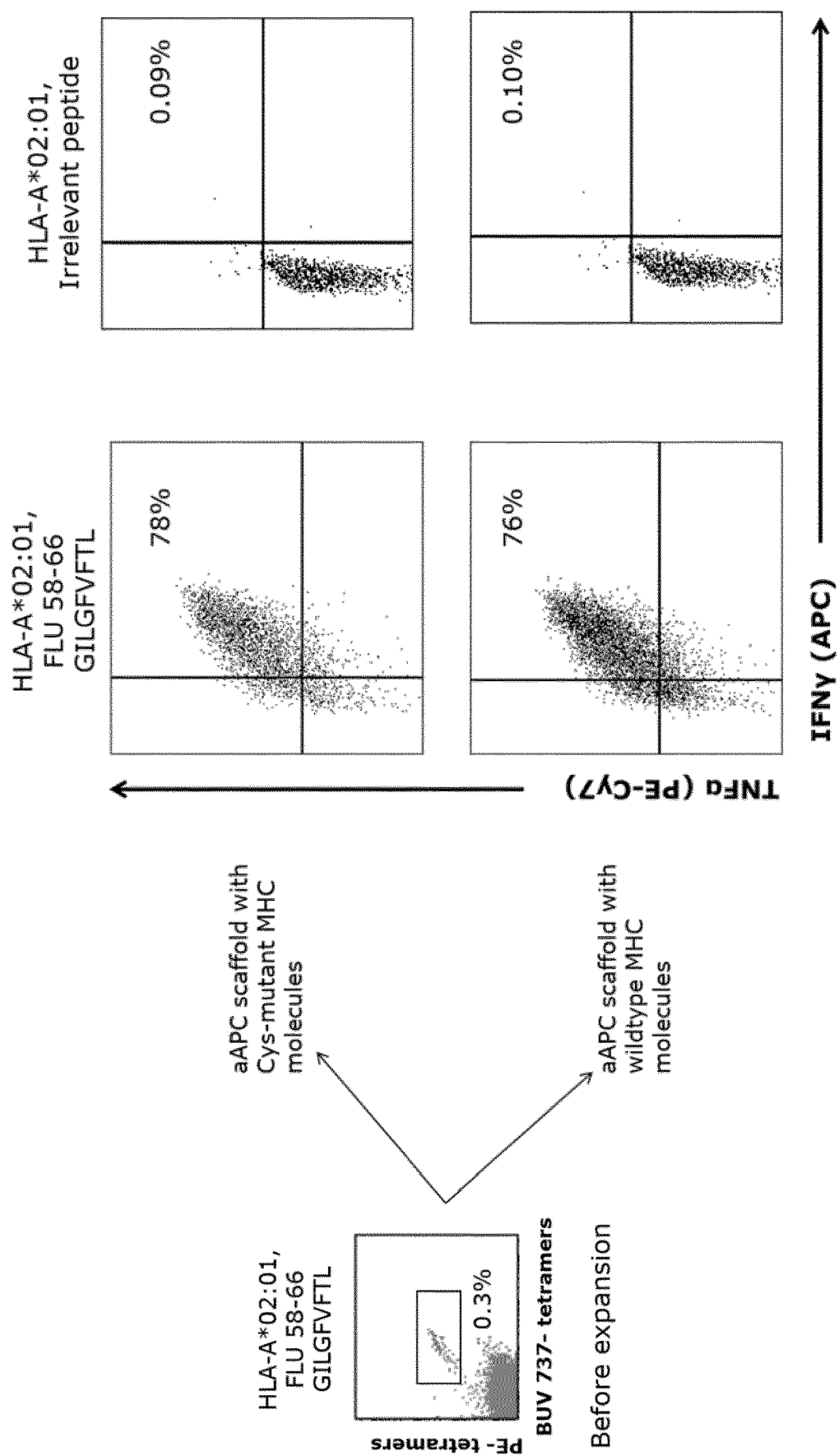
FIG. 3 shows dot plots of the expression of TNF-α and IFN-γ among CD8 T cells following stimulation with HLA-A*02:01, FLU 58-66 GILGFVFTL peptide (SEQ ID NO: 20) comparing functionality of CD8 T cells expanded with aAPC scaffolds assembled with Cys-mutant and with wild type MHC molecules. HLA-A*02:01, FLU 58-66 GILGFVFTL specific CD8 T cells with initial frequency of 0.3% (left, before expansion pMHC dual color tetramer staining plot) from healthy donor PBMCs were expanded for 10 days using aAPC scaffolds assembled with ratio 1:8:8:8 (scaffold:pMHC:IL-2:IL-21) and stimulated with FLU 58-66 GILGFVFTL peptide. aAPC scaffolds with irrelevant peptide (HLA-A*02:01 HIV Pol ILKEPVHGV (SEQ ID NO: 23)) specificity, used in expansion culture followed by peptide stimulation, were used as negative control. TNF-α antibody is PE-Cy7 labeled (Y-axis) and the IFN-γ antibody is APC labeled (X-axis). These stainings were made in duplicate, only one of each staining is shown.
Figure 4:
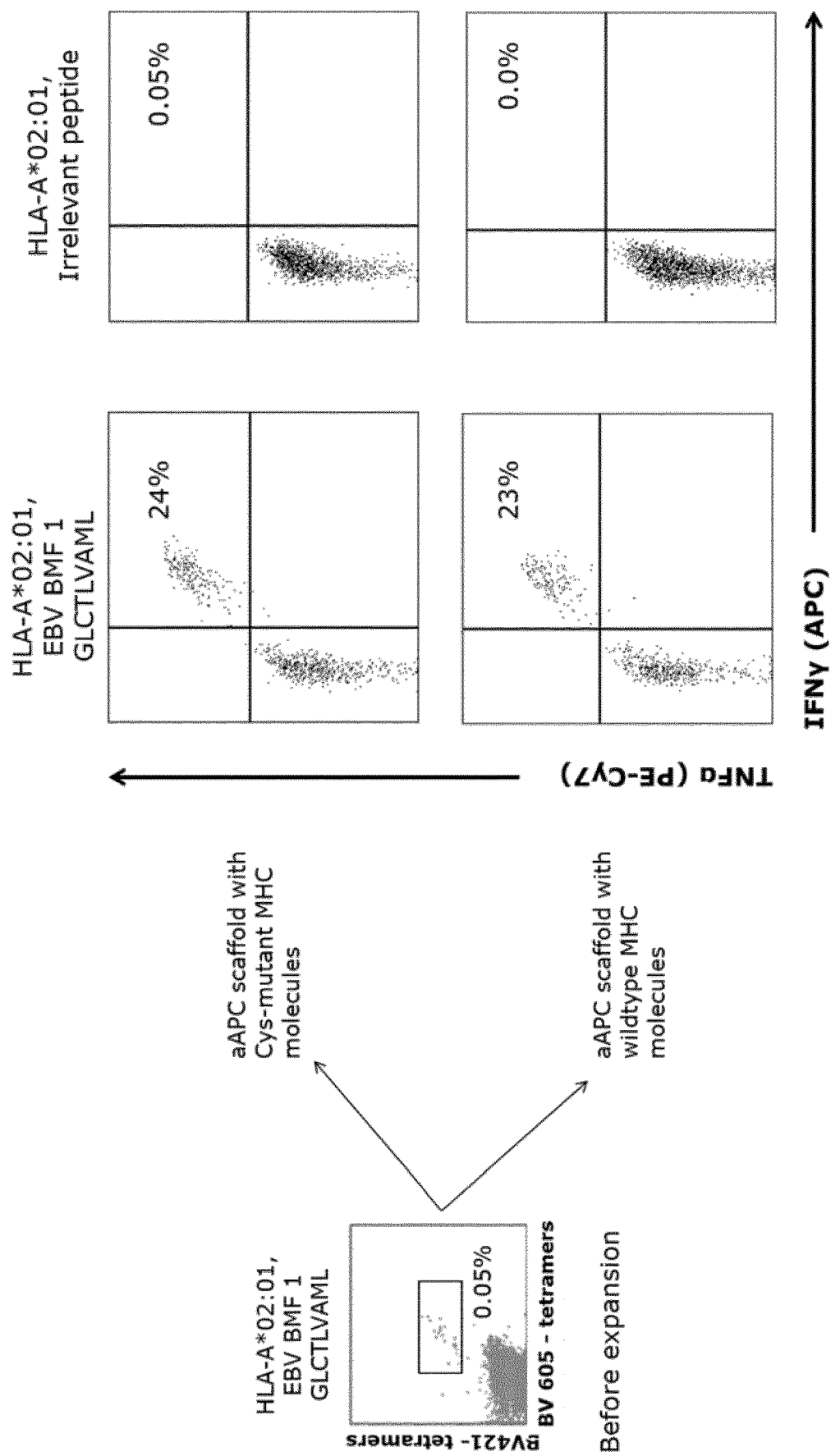
FIG. 4 shows dot plots of the expression of TNF-α and IFN-γ among CD8 T cells following stimulation with HLA-A*02:01, EBV BMF1 GLCTLVAML peptide (SEQ ID NO: 21) comparing functionality of CD8 T cells expanded with aAPC scaffolds assembled with Cys-mutant and with wild type MHC molecules. HLA-A*02:01, EBV BMF1 GLCTLVAML specific CD8 T cells with initial frequency of 0.05% (left, before expansion, pMHC dual color tetramer staining plot) from healthy donor PBMCs were expanded for 10 days using aAPC scaffolds assembled with ratio 1:8:8:8 (scaffold:pMHC:IL-2:IL-21) and stimulated with EBV BMF1 GLCTLVAML peptide. aAPC scaffolds with irrelevant peptide (HLA-A*02:01 HIV Pol ILKEPVHGV (SEQ ID NO:23)) specificity, used in expansion culture followed by peptide stimulation, were used as negative control. TNF-α antibody is PE-Cy7 labeled (Y-axis) and the IFN-γ antibody is APC labeled (X-axis). These stainings were made in duplicate, only one of each staining is shown.

Prepared Using Cys-Mutant MHC Monomers and their Functional Evaluation as Compared to aAPC Scaffolds Prepared with Wild Type MHC Monomers (FIGS. 3-4) Here is described assembly of aAPC scaffolds using Cys-mutant MHC class I HLA-A*02:01 monomers for FLU 58-66 GILGFVFTL (SEQ ID NO:20) and EBV BMF1 GLCTL-VAML (SEQ ID NO:21) and specific CD8 T cells expansion from healthy donor PBMCs using these aAPC scaffolds. A comparative functional evaluation with respect to aAPC scaffolds prepared from wild type MHC class I HLA-A*02:01 monomers is given. Data is shown in FIGS. 3 and 4.

Cys-mutant HLA-A*02:01 monomers were prepared as described in example 2. Briefly, a heavy chain construct containing Cys-mutant HLA-A*02:01 DNA sequence (SEQ ID NO: 14) and a wild type human β2M (SEQ ID NO: 15) construct were transformed into *E. coli* expression strain pLysS to produce these proteins. Inclusion bodies containing expressed proteins were harvested by standard procedure using sonication in lysis buffer followed by washing in detergent buffer, and wash buffer and solubilizing the protein in urea buffer for 48 hours at 4° C. to collect denatured soluble fraction of the proteins. A similar procedure was followed to produce the soluble denatured protein of wild type HLA-A 02:01.

The denatured soluble fraction of Cys-mutant HLA-A*02:01 was folded to produce monomers of Cys-mutant HLA-A*02:01. Heavy chain protein of Cys-mutant HLA-A*02:01 and β2M were mixed in 1:2 molar ratio in folding buffer containing Tris-Cl 100 mM, pH 8.0, L-Arginine 400 mM, and EDTA 2 mM in the presence of dipeptide Glycine-Leucine (GL). Post folding, monomers were biotinylated at the Avi-tag sequence incorporated in the heavy chain using a biotin-protein ligase enzyme reaction for 1 hour at 30° C. according to protocol from Avi-tag. These biotinylated monomers of Cys-mutant HLA-A*02:01 were purified by size exclusion chromatography (HPLC, Waters Corporation, USA). Since the folding reaction didn't include any HLA-A*02:01 specific antigenic peptide, the Cys-mutant HLA-A*02:01 monomers are empty and peptide receptive. Post purification, quality assessment of Cys-mutant HLA-A*02:01 monomers was performed for protein concentration and biotinylation and stored in −80° C. until further use.

Wild type HLA-A*02:01 monomers were prepared by a similar process as described above, but in the presence of a UV-labile HLA-A*02:01-specific peptide (SEQ ID NO:24), which is essential for the folding and stability of wild type MHC. Thus the purified and biotinylated wild type HLA-A*02:01 monomers would always be in this peptide associated form.

To assemble aAPC scaffolds with Cys-mutant HLA-A02:01 specific to FLU 58-66 GILGFVFTL (SEQ ID NO:20) or EBV BMF1 GLCTLVAML (SEQ ID NO:21), 100 UM peptide of each specificity, diluted in PBS, was mixed with 100 µg/mL Cys-mutant HLA-A02:01 monomers for 60 minutes in a 20 µL reaction in PBS. In parallel, cytokines, IL-2 and IL-21, were assembled on a dextran scaffold at a 1:8:8 molar ratio by incubating IL-2 and IL-21 with a dextran scaffold for 30 minutes. To these assembled cytokine dextran scaffolds, antigen-specific Cys-mutant HLA-A*02:01 monomers were added to a molar ratio of 1:8 and incubated for 30 minutes to generate antigen presenting scaffolds with a backbone, pMHC, IL-2, IL-21 ratio of 1:8:8:8. Any possible free streptavidin sites on the scaffolds were blocked by adding 20 µM D-Biotin and incubating for 20 minutes.

Since wild type HLA-A*02:01 monomers were associated with a pre-bound peptide, aAPC scaffolds using wild type HLA-A02:01 specific to FLU 58-66 GILGFVFTL (SEQ ID NO:20) or EBV BMF1 GLCTLVAML (SEQ ID NO:21) required an additional step to exchange the pre-bound peptide with the FLU 58-66 GILGFVFTL or EBV BMF1 GLCTLVAML specific peptides. 100 µg/ml wild type HLA-A*02::01 monomers were mixed with 200 UM antigenic peptide in PBS to a total volume of 20 µL and incubated under UV lamp (366 nm) for 60 minutes to facilitate exchange of pre-bound UV labile peptide with the antigenic specific peptide. Post reactions, aAPC scaffolds were assembled using the wild type HLA-A*02:01 monomers and cytokines at molar ratio of 1:8:8:8 (backbone: pMHC:IL-2:IL-21) as described above for Cys-mutant aAPC scaffolds. Scaffolds are stored at 4° C. until used for T cell expansion.

To evaluate and compare the aAPC scaffolds prepared using Cys-mutant and wild type HLA-A*02:01 molecules specific to FLU 58-66 GILGFVFTL and EBV BMF1 GLCTLVAML, parallel cultures with these two types of scaffolds were established using PBMCs from two different healthy donors corresponding to each specificity. Along with scaffolds of positive specificities, a negative control scaffold made with irrelevant peptide (HLA-A*02:01 HIV Pol ILKEPVHGV (SEQ ID NO:23)) was also included. All aAPC scaffolds based T cell expansions were initiated with 2×10$^6$ PBMCs per specificity in a 48 well flat bottom cell culture plate in X-vivo media supplemented with 5% human serum. 3 µl aAPC scaffold of each specificity was added four times every second or third day and culture were maintained for two weeks. 10 samples were collected to test for expansion using intracellular cytokine staining induced by antigen specific stimulation. Expanded cells of each specificity were challenged with 5 µM relevant antigenic peptide for two hours in X-vivo media supplemented with 5% human serum in a cell concentration of 300.000 cells/100 µL. After incubation with antigenic peptide, expanded cells were washed and first stained with relevant cell surface antibodies (CD3, CD4, CD8, and viability dye) followed by intracellular staining for TNFα (PE-Cy7) and IFNγ (APC) using cell permeabilization buffer. Cells were then fixed and analysed by flow cytometer.

Herein is given examples using two antigenic peptides. However, the present invention is not restricted to a delimited set of antigenic peptides. Other relevant peptides include, but are not limited to SEQ ID NO:25-28.

Conclusion: (FIGS. 3 and 4) This experiment demonstrates that it is feasible to expand antigen-specific CD8 T cells with low frequent baseline responses in a pMHC directed manner, using aAPC scaffolds in which a Cys-mutant variant of HLA-A*02:01 protein was used to present FLU 58-66 GILGFVFTL (FIG. 1) and EBV BMF1 GLCTLVAML (FIG. 2) antigens. The example demonstrates that the use of Cys-mutant MHC for rapid production and antigen diversification of aAPC scaffolds for expansion of antigen-specific T cells is feasible.

CD8 T cells expanded with Cys-mutant MHC aAPC scaffolds were found functionally comparable to aAPC scaffolds prepared with wild type MHC, as shown by the intracellular cytokine (TNFα and IFNγ) release by antigenic peptide specific expanded CD8 T cells for FLU 58-66 GILGFVFTL (FIG. 1) and EBV BMF1 GLCTLVAML (FIG. 2). The functional analysis also confirms that aAPC scaffolds with Cys-mutant MHC expand only antigen specific cells, as no expansion of irrelevant peptide specific CD8 T cells were observed.

In example 1 is shown that cells stimulated with aAPC scaffolds prepared with wt MHC molecules display superior expansion in terms of frequency and absolute number of specific CD8 T cells as compared to expansion and stimulation using free antigenic peptide and T cell affecting molecules. In this example is demonstrated that the Cys-mutant MHC aAPC scaffolds expand and stimulate CD8 T cells with similar efficiency to aAPC scaffolds prepared with wt MHC molecules. Consequently, the Cys-mutant MHC aAPC scaffolds are superior to expansion and stimulation using free antigenic peptide and T cell affecting molecules.

Figure 5:
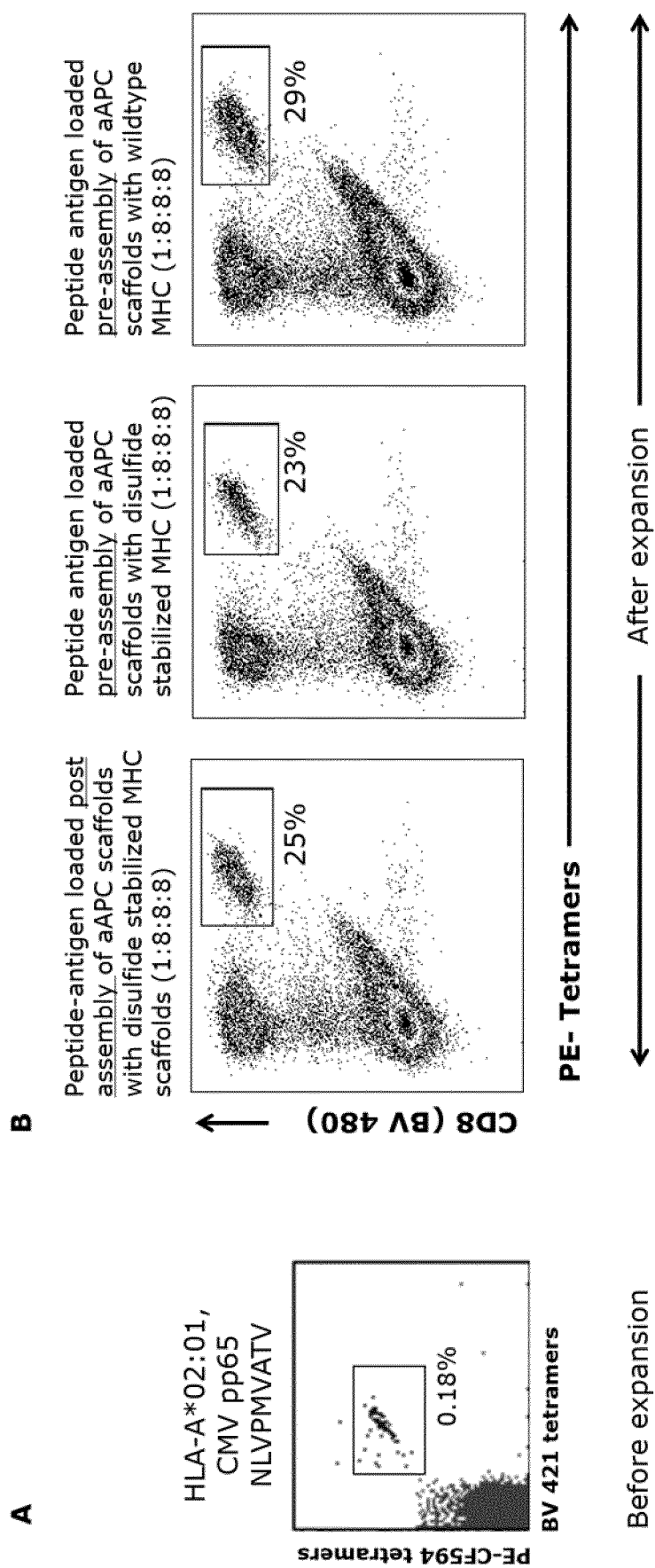
FIG. 5 shows tetramer staining dot plots of HLA-A*02:01 CMV pp65 NLVPMVATV (SEQ ID NO:22) specific CD8 T cells expanded using aAPC scaffolds comparing expansion efficiency of post assembly Cys-mutant MHC (i.e. loadable) aAPC scaffolds with antigen loaded pre assembly of scaffolds (either Cys-mutant or wild type MHC).
Figure 6:
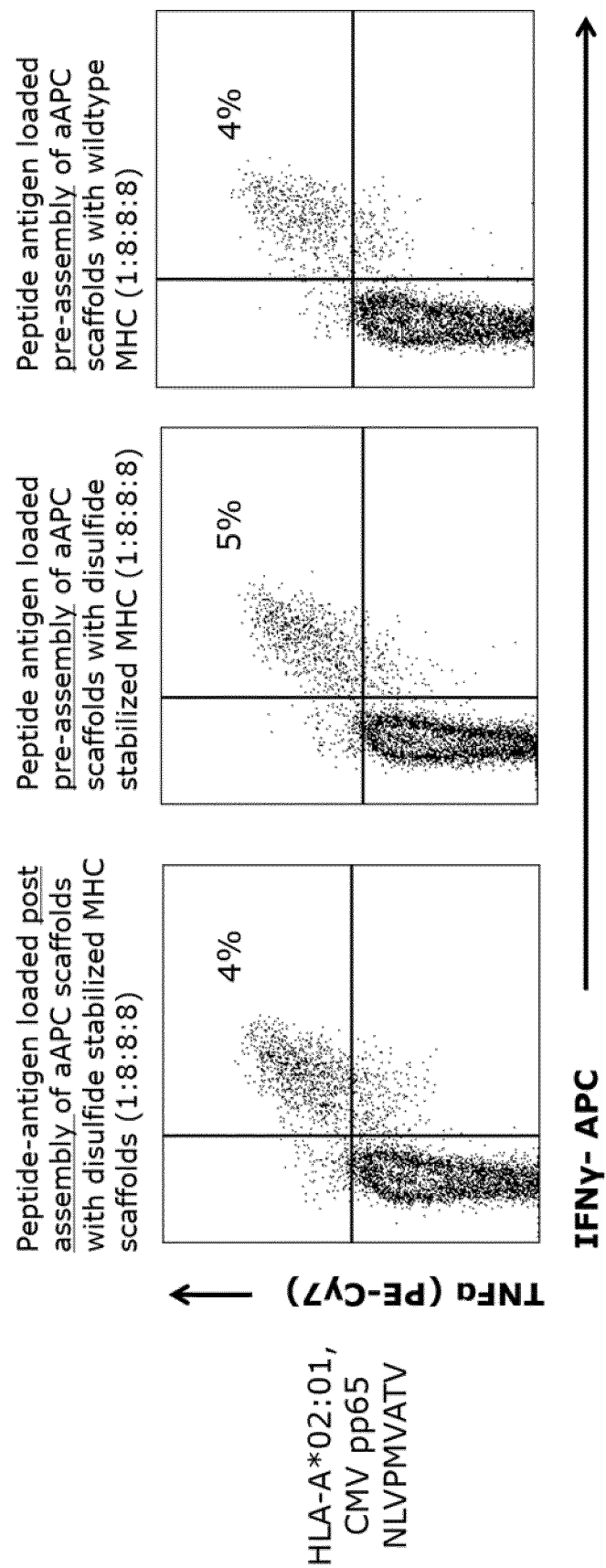
FIG. 6 shows dot plots showing the expression of TNF-α and IFN-γ among CD8 T cells following stimulation with HLA-A*02:01, CMV pp65 NLVPMVATV peptide (SEQ ID NO: 22) comparing functionality of CD8 T cells expanded with aAPC scaffolds assembled post assembly peptide-antigen loaded aAPC with Cys-mutant MHC, pre-loaded aAPC with Cys-mutant MHC, and pre-loaded aAPC with wild type MHC. TNF-α antibody is PE-Cy7 labeled (Y-axis) and the IFN-γ antibody is APC labeled (X-axis). These stainings were made in duplicate, only one of each staining is shown.
Figure 7:
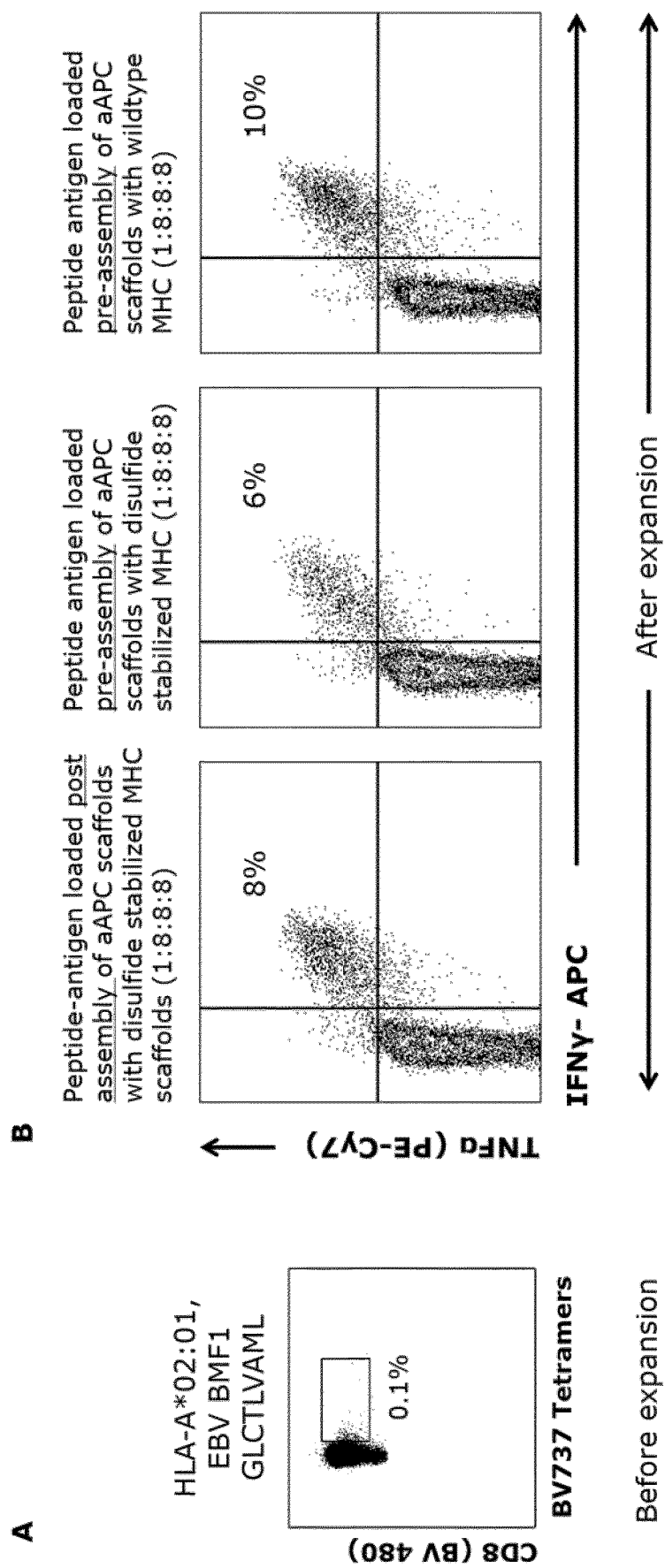
FIG. 7 shows dot plots of TNF-α and IFN-γ double positive CD8 T cells following stimulation with HLA-A*02:01, EBV BMF1 GLCTLVAML peptide (SEQ ID NO:21). HLA-A*02:01, EBV BMF1 GLCTLVAML specific CD8 T cells from healthy donor PBMCs were expanded for 10 days using aAPC scaffolds 1:8:8:8 (scaffold:MHC/pMHC:IL-2:IL-21) to compare the functionality of expanded CD8 T cells across aAPC scaffolds assembled post assembly peptide-antigen loaded aAPC with Cys-mutant MHC, pre-loaded aAPC with Cys-mutant MHC, and pre-loaded aAPC with wild type MHC (FIG. 7B). TNF-α antibody is PE-Cy7 labeled (Y-axis) and the IFN-γ antibody is APC labeled (X-axis). These stainings were made in duplicate, only one of each staining is shown. Baseline HLA-A*02:01, EBV BMF1 GLCTLVAML specific CD8 T cells in donor PBMCs is shown as measured by pMHC specific dual color tetramers as % of total CD8 T cells (FIG. 7A).

Example 4: Assembly of Antigen Artificial Antigen Presenting (aAPC) Scaffolds Using Disulfide Stabilized Empty MHC Class I and Specific T Cell Expansion Using the aAPC (FIGS. 5-7)

Here is described how aAPC scaffolds can be assembled using Cys-mutant MHC without antigenic peptide. Such aAPC scaffolds are antigenic peptide receptive and can thus be produce beforehand an antigen identification, e.g. in connection with personalized cancer immunotherapy where cancer peptide antigens are identified from full tumor sequencing. aAPC scaffolds are essentially assembled as described in examples 2 and 3 except that loading of antigenic peptide into the Cys-mutant MHC monomer is performed after assembly (post assembly) of aAPC scaffolds as opposed to loading of antigenic peptide into MHC before assembly (pre-assembly) of aAPC scaffolds.

These aAPC scaffolds with empty MHC molecules can be loaded with an antigenic peptide of interest in a single step, thereby converting them into pMHC specific aAPC scaffolds. Such antigen receptive aAPC scaffolds eliminate processing time to generate each pMHC specific aAPC scaffold and also limits batch specific variations since each pMHC aAPC scaffold is generated from a stable master batch of aAPC scaffolds with empty MHC molecules.

Described here is the use of such loadable (post-assembled) aAPC scaffolds for expanding HLA-A*02:01 CMV pp65 NLVPMVATV (SEQ ID NO:22) specific CD8 T cells from healthy donor PBMCs. A comparison of the quantitative expansion efficiency of post assembled aAPC scaffolds with (pre-assembled) aAPC scaffolds with pre-loaded antigenic peptide using either Cys-mutant MHC and wild type MHC molecules is given in FIG. 5. Functionality of these expanded CD8 T cells specific to HLA-A*02:01 CMV pp65 NLVPMVATV by post assembled aAPC scaffolds, pre-assembled aAPC scaffolds with Cys-mutant MHC, and pre-assembled aAPC scaffolds with wild type MHC were determined by measuring cytokine release (FIG. 6).

To further establish a general proof of concept, validation of CD8 T cells expansion with post assembled aAPC scaffolds was done by expansion and functionality assessment of HLA-A*02:01 EBV BMF1 GLCTLVAML (SEQ ID NO:21) specific CD8 T cells from a different healthy donor PBMCs. The results were compared with the expansion by pre-assembled aAPC scaffolds with Cys-mutant MHC, and pre-assembled aAPC scaffolds with wild type MHC (FIG. 7).

To assemble empty aAPC scaffolds, Cys-mutant MHC class I monomers were produced as describe in example 2, except that antigenic peptide was not loaded immediately. These biotinylated empty MHC monomers, cytokines, and co-stimulatory molecules were assembled on streptavidin modified dextran via the streptavidin-biotin interaction to generate antigenic receptive aAPC scaffolds with empty MHC class I molecules.

The process of assembling empty aAPC scaffolds using Cys-mutant HLA-A*02:01 molecules was conducted as follows. The dextran scaffold backbone was first incubated with biotinylated IL-2 and IL-21 in a molar ratio of 1:8:8 for 30 minutes at 4° C. in PBS buffer. Thereafter, 100 µg/mL of Cys-mutant MHC (empty) monomers were added and incubated for 30 minutes at 4° C. to generate post assembly loadable aAPC scaffolds with a molar ratio of 1:8:8:8 (scaffold:Cys-mutant MHC:IL-2:IL-21). Any remaining empty streptavidin binding site on the dextran backbone were blocked by adding 20 UM D-Biotin. Since these aAPC scaffolds does not contain any antigen specificity, large batches of these loadable aAPC scaffolds of HLA-A*02:01 were stored at 4° C. until further use.

Post assembly loadable aAPC scaffolds of HLA-A*02:01 were then evaluated to expand HLA-A*02:01 CMV pp65 NLVPMVATV (SEQ ID NO: 22) specific CD8 T cells from healthy donor PBMCs. On the day of initiating expansion cultures, empty aAPC scaffolds of HLA-A*02:01 were converted to HLA-A*02:01 CMV pp65 NLVPMVATV specific aAPC scaffolds by directly adding the antigenic peptide to the empty aAPC scaffolds. Briefly, 100 UM peptide, diluted in PBS, was incubated with to 20 µL empty aAPC scaffold and incubated for 30 minutes. Such aAPC scaffolds generated by converting post assembly loadable aAPC scaffolds in a single step, were then used to setup expansion cultures. 3 µL of specific aAPC scaffolds were added to 2×10⁶ PBMCs and cultures were initiated in a 48 well plate in X-vivo media supplemented with 5% serum. The cultures were then maintained for two weeks with three more additions of 3 µL aAPC scaffolds over the span of two weeks. In parallel, a similar expansion culture of HLA-A*02:01 CMV pp65 NLVPMVATV specificity were initiated using pre-assembled aAPC scaffolds made from wild type and Cys-mutant HLA-A*02:01 monomers. The expansion cultures from this setup were used for comparative evaluation with the expansion efficiency of loadable aAPC scaffolds. After 10 days, samples were collected and CD8 T cell expansions of each specificity were determined for each specificity using pMHC tetramers (FIG. 5).

From these expanded cultures another set of expanded cells were collected to evaluate functionality and compare across all three types of aAPC scaffolds (post assembly loaded aAPC scaffold with Cys-mutant MHC, pre-assembly loaded aAPC scaffold with Cys-mutant MHC, and pre-assembly loaded aAPC scaffold with wild type MHC).

For functional assessment expanded cells were challenged with HLA-A*02:01 CMV pp65 NLVPMVATV antigen to induce and detect antigen stimulated cytokines TNFα and IFNγ as markers of cytotoxic killing. CD8 T cells that express these markers simultaneously are interpreted as having high killing capacity. Cells were challenged with 5 µM relevant peptide for two hours in X-vivo media supplemented with 5% human serum in a cell concentration of 300000 cells/100 µL. After incubation with antigenic peptide, expanded cells were washed and first stained with relevant cell surface antibodies (CD3, CD4, CD8, and viability dye) followed by intracellular staining for TNFα (PE-Cy7) and IFNγ (APC) using cell permeabilization buffer. Cells were then fixed and analysed by flow cytometer (FIG. 6).

In an additional validation experiment for post assembly loadable aAPC scaffolds, HLA-A*02:01 EBV BMF1 GLCTLVAML (SEQ ID NO:21) specific CD8 T cells from a different healthy donor PBMCs were expanded by using post assembly loadable aAPC scaffolds (1:8:8:8). These scaffolds were converted to antigen specific pMHC scaffolds by adding 100 UM EBV BMF1 GLCTLVAML peptide to 20 µL loadable aAPC scaffolds and incubated for 30 minutes to generate HLA-A*02:01 EBV BMF1 GLCTLVAML specific aAPC scaffolds. HLA-A*02:01 EBV BMF1 GLCTLVAML specific aAPC scaffolds using wild type or Cys-mutant MHC molecules were generated as described in example 2.

Expansion cultures specific to HLA-A*02:01 EBV BMF1 GLCTLVAML were initiated using the three types of aAPC scaffolds from healthy donor PBMCs in a 48 well plate and maintained in X-vivo media supplemented with 5% human serum for two weeks with stimulation at every third day with relevant aAPC scaffold. Functional assessment of the expanded CD8 T cells was done after 10 days of expansion by collecting 300.000 cells for each specificity and measuring intracellular cytokine release after challenging with antigenic peptide as described in example 3. Briefly, expanded cells were challenged with 5 µM EBV BMF1 GLCTLVAML peptide for two hours in X-vivo media supplemented with 5% human serum in a cell concentration of 300.000 cells/100 µL. After incubation with antigenic peptide, expanded cells were washed and first stained with relevant cell surface antibodies (CD3, CD4, CD8, and viability dye) followed by intracellular staining for TNFα (PE-Cy7) and IFNγ (APC) using cell permeabilization buffer. Cells were then fixed and analysed by flow cytometer (FIG. 7).

Conclusion: (FIGS. 5-7) This experiment demonstrates that it is feasible to expand antigen-specific CD8 T cells with low frequent baseline responses using post assembly loadable aAPC scaffolds which are converted to antigen specific aAPC scaffolds in a single step of antigenic peptide loading. FIG. 5 shows expansion efficiency of such post assembly loadable aAPC scaffolds specific for HLA-A*02:01 CMV pp65 NLVPMVATV (SEQ ID NO:22) CD8 T cells which were expanded from 0.18% of total CD8+ T cells at baseline (FIG. 5A) to 25% of total CD8+ T cells (FIG. 5B). The efficiency was comparable to pre-assembled aAPC scaffolds using both wild type as well as Cys-mutant MHC molecules. Functionality, as measured with antigen specific cytokine release, of these expanded CD8 T cells were also found comparable across all three variant (post assembly loaded aAPC scaffold with Cys-mutant MHC, pre-assembly loaded aAPC scaffold with Cys-mutant MHC, and pre-assembly loaded aAPC with wild type MHC) (FIG. 6). Results in FIG. 7 further establishes the functionality of expanded CD8 T cells specific to HLA-A*02:01 EBV BMF1 GLCTLVAML (SEQ ID NO: 21) using post assembly loadable aAPC scaffolds from different donor PBMCs. This shows that the post assembly loadable aAPC scaffolds provide efficient T cell stimulation and activates multi-functional T cells, thus providing an advantageous aAPC scaffold as they can be stored at 4° C. in loadable form until use and can be converted to any specificity of aAPC scaffold in a single-step addition of antigenic peptide.

Putting together these examples demonstrates that the use of empty Cys-mutant MHC for rapid production and antigen diversification of aAPC scaffolds for expansion of antigen-specific T cells is feasible. This is advantageous in an adoptive T cell transfer setting where rapid expansion of patient derived cancer-specific T cells is essential for a positive clinical outcome.

Herein is given examples using two antigenic peptides. However, the present invention is not restricted to a delimited set of antigenic peptides. Other relevant peptides include, but are not limited to SEQ ID NO:25-28.

Example 5: TCR Recognition of Disulfide Stabilized (Cys-Mutant) pMHC Tetramers

In this example we compared the ability of wt pMHC to recognize TCR with the ability of Cys-mutant pMHC to recognize the same TCR. This was done to verify that the Cys-mutant pMHC present peptide antigens to TCR's in a similar fashion as wt pMHC.

Briefly, pMHC tetramers were prepared from biotinylated wt pMHC monomers that were combined with flourochrome conjugated streptavidin. Biotinylated pMHC monomers and Cys-mutant MHC monomers were prepared essentially as described in example 2. Antigenic peptide specific MHC tetramers (pMHC) using wt HLA-A*02:01 monomers were prepared as described in Example 4.

Briefly, wt HLA-A*02:01 monomers (pre-bound with UV labile peptide KILGFVF-X-V (SEQ ID NO:24)) were exchanged for antigenic peptide by incubating 100 μg/mL wt HLA-A02:01 monomers with 200 UM antigenic peptide in a 20 μl reaction volume in PBS buffer for one hour under UV lamp (366 nm wavelength). These post exchange antigenic peptide specific monomers were then conjugated with fluorophore labelled streptavidin to make antigenic peptide specific tetramers, each tetramer specificity was prepared with two different fluorophores to detect CD8 T cells of each specificity with two different colors for conformational analysis. pMHC tetramers using Cys-mutant MHC molecules were prepared by directly incubating 200 UM antigenic peptide with 100 μg/mL Cys-mutant MHC monomers, as they are devoid of any pre-bound antigenic peptide and thus does not require any exchange process, for one hour in 20 μL reaction volume. Antigenic peptide specific Cys-mutant MHC monomers were then tetramerised by incubating with fluorophore labelled streptavidin in two different colors for each specificity.

Figure 8:
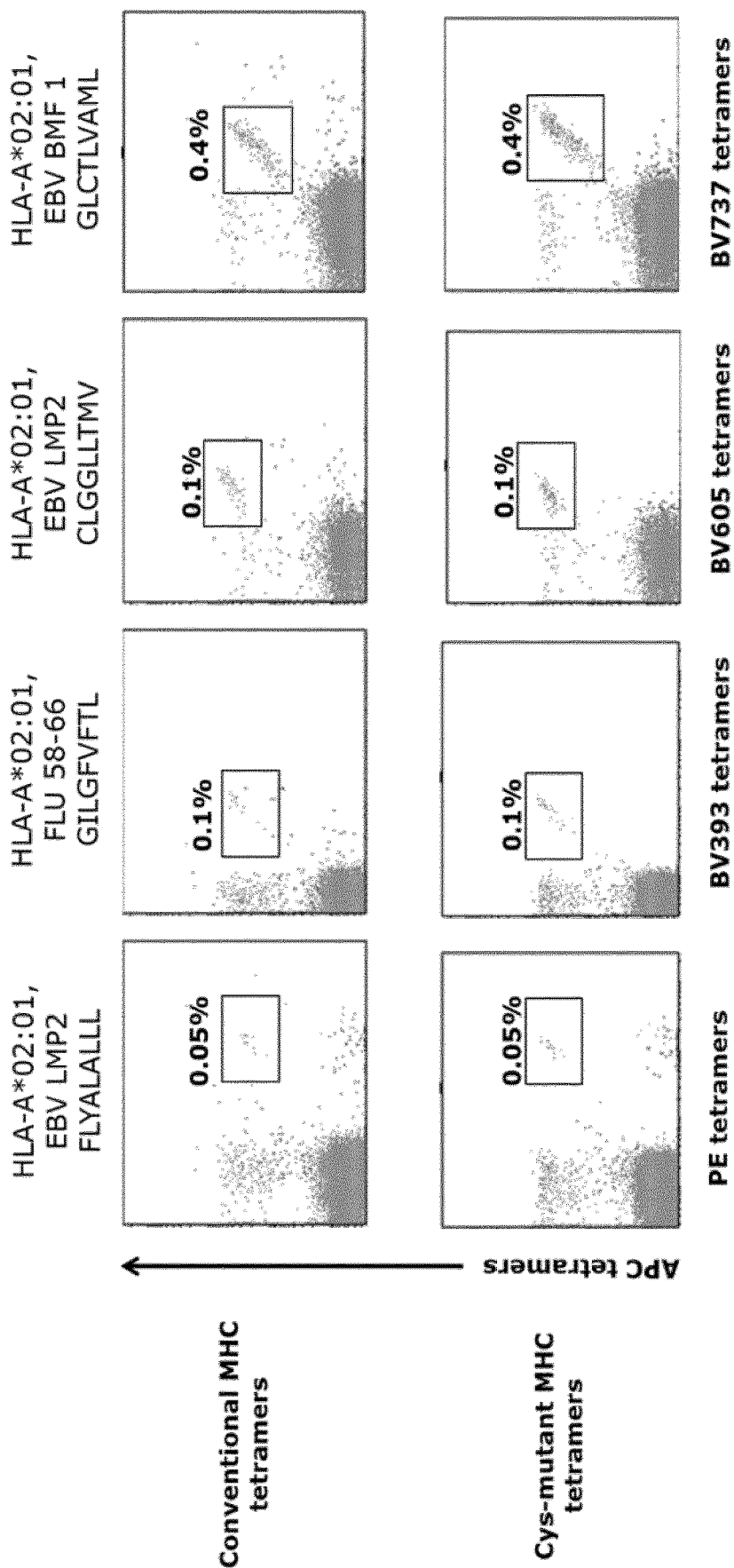
FIG. 8 shows dot plots of flow cytometry analysis comparing TCR recognition of HLA-A*02:01 antigen specific CD8 T cells using pMHC tetramers prepared with wt MHC (top panel) or with Cys-mutant pMHC tetramers (bottom panel). Four different antigen specificities were analysed to verify that Cys-mutant MHC recognizes CD8 T cell TCR in comparative manner with wt MHC. CD8 positive T cells are represented in percentage of total CD8 T cells and detected in two colors, hence double positive dot plots (X and Y axis).

For comparative analysis of TCR recognition, wt and Cys-mutant MHC tetramers were prepared for four different HLA-A*02:01 antigen specificities; EBV LMP2 FLYALALLL (SEQ ID NO:26), FLU 58-66 GILGFVFTL (SEQ ID NO:20), EBV LMP2 CLGGLLTMV (SEQ ID NO:25), and EBV BMF1 GLCTLVAML (SEQ ID NO:21). The wt and Cys-mutant MHC tetramers were used to detect for CD8 T cells from healthy donor and evaluated for antigenic peptide specific T cells as percentage of total CD8 T cells (FIG. 8).

Conclusion: This example demonstrates that Cys-mutant MHC has the same capacity as wt MHC to bind antigenic peptide specific T cells. Both forms of pMHC monomers can be converted into MHC tetramers, and is shown to equally efficient detect the same population of antigenic peptide specific T cells.

Example 6: Functional Capacity of aAPC Scaffold Expanded T Cells in Cancer Model In this example we isolate human cancer-specific tumor infiltrating lymphocytes (TILs) from tumor material. TILs are expanded using aAPC scaffolds and tested for functional capacity in cancer models. T cells expanded with aAPC scaffolds are benchmarked to T cells expanded with state-off-the-art TIL expansion protocol by rapid expansion using high dose of IL-2.

The anti-tumor activity of the aAPC scaffold expanded T cells are investigated in a 3D microtumor model. Fresh melanoma tissue is processed within 24 hours after surgery. Tissue samples are washed, minced, and mildly digested using blend of collagenase enzymes. Hereafter, the microtumor preparations are sequentially filtered through cell strainers to separate 3D microtumors with a size of >50 μm. These 3D microtumors are expanded under serum-free conditions. Anti-tumor reactivity of the aPC scaffold expanded T cells is assessed in co-culture with 3D microtumors established from the same patient using a fluorescent dye-based cytotoxicity assay. The cytotoxic response of 3D microtumor cells towards autologous cell products (controls) is assessed over a period of up to 96 hours. In parallel to the above mentioned cytotoxicity analyses, the extent of 3D microtumor infiltration by respective cell products is analyzed using live cell 3D confocal fluorescence microscopy.

Conclusion: This example show that T cells expanded using aAPC scaffolds have anti-tumor reactivity against autologous cancer microtumors.

Example 7: In Vivo Anti-Tumor Activity of aAPC Scaffold Expanded T Cells in Humanized Mouse Model In this example we demonstrate the in vivo anti-tumor activity of aAPC scaffold expanded T cells in a humanized huIL2-NOG mouse, which was recently reported to model and predict the clinical activity of adoptively transferred melanoma-derived TILs.

Briefly, tumors are engrafted into NOD/SCID/IL2Rγ (NOG) mice. Following engraftment, the tumors are serially transplanted into three to five NOG mice or three to five NOG mice transgenic for human IL-2 (huIL2-NOG). The huIL2-NOG mice are treated with aAPC expanded T cells by injection into the tail vein. Tumor growth is compared between tumor-bearing mice treated or untreated with adoptive T cell transfer by caliper measurement or imaging (dependent on tumor type). T cells expanded in mice are immune-phenotyped and analyzed for inhibitory and stimulatory signals.

Conclusion: The example demonstrates that aAPC scaffold expanded T cells have in vivo anti-tumor reactivity.

Example 8: Expansion of Antigen-Specific CD8 T Cells Using aAPC Scaffolds with Neoleukin-2/15 (Neo-2/15)

In this example is described assembly of aAPC scaffolds with Neo-2/15 using wild type MHC class I HLA-A*01:01 monomers for A1 CMV pp65 YSEHPTFTSQY (SEQ ID NO: 30) and specific CD8 T cells expansion from healthy donor PBMCs using these aAPC scaffolds (FIG. 9).

Wild type HLA A*02:01 monomers were prepared by a similar process as described in example 2, but in the presence of a UV-labile HLA A*01:01-specific peptide STAPG-X-LEY (SEQ ID NO:31), where X refers to a UV sensitive amino acid, 3-amino-2-(2-nitrophenyl) propionic acid, which upon exposure to UV light breaks the full length peptide, and which is essential for the folding and stability of wild type MHC. Thus, the purified and biotinylated wild type HLA A*01:01 monomers would always be in this peptide associated form.

Since aAPC scaffolds with wild type HLA-A*01:01 monomers were associated with a pre-bound peptide, aAPC scaffolds using wild type HLA-A*01:01 monomers for A1 CMV pp65 YSEHPTFTSQY required peptide exchange of the pre-bound peptide with the CMV pp65 YSEHPTFTSQY specific peptide. 100 µg/ml wild type HLA-A*01:01 monomers were mixed with 200 UM antigenic peptide in PBS to a total volume of 20 µL and incubated under UV lamp (366 nm) for 60 minutes to facilitate exchange of pre-bound UV labile peptide with the antigenic specific peptide. Post reactions, aAPC scaffolds were assembled using the wild type HLA-A*01:01 monomers and cytokines. Scaffolds are stored at 4° C. until used for T cell expansion.

aAPC scaffold based T cell expansion was initiated with $2 \times 10^6$ PBMCs per specificity in a 48 well flat bottom cell culture plate in X-vivo media supplemented with 5% human serum. 3 µl aAPC scaffold was added four times every second or third day and culture was maintained for two weeks. 10 samples were collected to test for expansion using intracellular cytokine staining induced by antigen specific stimulation. Expanded cells were challenged with 5 UM relevant antigenic peptide for two hours in X-vivo media supplemented with 5% human serum in a cell concentration of 300.000 cells/100 µL. After incubation with antigenic peptide, expanded cells were washed and first stained with relevant cell surface antibodies (CD3, CD4, CD8, and viability dye) followed by intracellular staining for TNFα (PE-Cy7) and IFNγ (APC) using cell permeabilization buffer. Cells were then fixed and analysed by flow cytometer.

Herein is given an example using one antigenic peptide. However, the present invention is not restricted to a delimited set of antigenic peptides. Other relevant peptides include, but are not limited to SEQ ID NO:25-28.

Conclusion: This experiment demonstrates that it is feasible to expand antigen-specific CD8 T cells with low frequent baseline responses in a pMHC directed manner, using aAPC scaffolds displaying Neo-2/15 in combination with HLA-A*01:01 CMV pp65 YSEHPTFTSQY antigen (FIG. 9). The example demonstrates that the use of aAPC scaffolds displaying Neo-2/15 in combination with HLA-A*01:01 for rapid production of antigen-specific T cells is feasible.

CD8 T cells expanded with Neo-2/15 aAPC scaffolds were found functionally comparable to aAPC scaffolds prepared with IL-2, as shown by the intracellular cytokine (TNFα and IFNγ) release by antigenic peptide specific expanded CD8 T cells for HLA-A*01:01 CMV pp65 YSEHPTFTSQY antigen (FIG. 9). The functional analysis also confirms that aAPC scaffolds with Neo-2/15 expand only antigen specific cells, as no expansion of irrelevant peptide specific CD8 T cells were observed.

In example 1 is shown that cells stimulated with aAPC scaffolds prepared with wt MHC molecules display superior expansion in terms of frequency and absolute number of specific CD8 T cells as compared to expansion and stimulation using free antigenic peptide and T cell affecting molecules. In example 3 is demonstrated that the Cys-mutant MHC aAPC scaffolds expand and stimulate CD8 T cells with similar efficiency to aAPC scaffolds prepared with wt MHC molecules. In this example is demonstrated that aAPC scaffolds with Neo-2/15 favourably expand and stimulate antigen-specific CD8 T cells.

REFERENCES

WO2002072631
WO2009003492
WO2009094273
US2011/318380
U.S. Pat. No. 9,494,588

The invention claimed is:

1. An artificial antigen presenting cell (aAPC) scaffold comprising:
a polymeric backbone to which are attached:
   i. at least two different gamma-chain receptor cytokines selected from the group consisting of IL-21, IL-2, IL-15, IL-4, IL-7 and IL-9, wherein the cytokines comprise at least IL-21, and
   ii. at least one MHC class I molecule,
wherein the at least one MHC class I molecule comprises a heavy chain comprising an alpha-1 domain and an alpha-2 domain connected by a disulfide bridge formed between a mutant cysteine residue positioned in the alpha-1 domain and a mutant cysteine residue positioned in the alpha-2 domain,
wherein the heavy chain comprises an amino acid sequence selected from:
   a. SEQ ID NO: 1, or
   b. an amino acid sequence having at least 85% sequence identity to the sequence in (a), and
wherein said amino acid sequence comprises the mutant cysteine residue positioned in the alpha-1 domain and the mutant cysteine residue positioned in the alpha-2 domain,
wherein the spatial distance between the mutant cysteine residue positioned in the alpha-1 domain and the mutant cysteine residue positioned in the alpha-2 domain is between 2 and 10 angstroms,
wherein the mutant cysteine residue in the alpha-1 domain is at amino acid residue 84 or 85 and the mutant cysteine residue positioned in the alpha-2 domain is at amino acid residue 139, relative to SEQ ID NO: 1.

2. The aAPC scaffold according to claim 1, wherein the heavy chain comprises an amino acid sequence selected from any one of SEQ ID NOs: 2-6.

3. The aAPC scaffold according to claim 1, wherein the polymeric backbone comprises at least 5 MHC class I molecules.

4. The aAPC scaffold according to claim 1, wherein the cytokines are selected from the group consisting of IL-21, IL-2 and IL-15.

5. The aAPC scaffold according to claim 1, wherein the at least one MHC class I molecule comprises a peptide-binding groove free of antigenic peptide.

6. The aAPC scaffold according to claim 1, wherein the MHC class I molecule comprises a peptide-binding groove comprising an antigenic peptide (pMHC).

7. A method for simultaneous in vitro stimulation and expansion of T cells, comprising:
   i. providing a sample comprising T cells,
   ii. contacting said sample with an expansion solution comprising the aAPC scaffold according to claim 6,
   iii. stimulating and expanding the T cells with specificity for said aAPC scaffold in culture, and
   iv. harvesting the T cells of step iii) from the culture to obtain an expanded antigen-specific population of T cells.

8. The aAPC scaffold according to claim 6, wherein the at least two different gamma-chain receptor cytokines are IL-21 and IL-2 in the ratio 1:8:8:8 (scaffold:pMHC:IL-2:IL-21); or IL-21 and IL-15 in the ratio 1:10:5:5 or the ratio 1:15:5:5 (scaffold:pMHC:IL-15:IL-21).

9. A kit for expansion of T cells, the kit comprising:
   i. a first container comprising at least one aAPC scaffold according to claim 1, and
   ii. a second container comprising at least one antigenic peptide,
   wherein the contents of the first container and the second container are configured to be combined.

10. The aAPC scaffold according to claim 1, wherein said polymeric backbone comprises at least one additional T cell affecting molecule selected from the group consisting of co-stimulatory molecules, adhesion molecules, and antibodies.

11. The aAPC scaffold according to claim 1, wherein the cytokines and MHC class I molecules are attached to the polymeric backbone via non-covalent interactions between coupling agents located on the polymeric backbone and affinity tags on the cytokines and MHC class I molecules.

12. The aAPC scaffold according to claim 1, wherein the at least two different gamma-chain receptor cytokines are IL-21 and IL-2; or IL-21 and IL-15.

13. The aAPC scaffold according to claim 1, wherein the at least two different gamma-chain receptor cytokines are IL-21 and IL-2.

14. The aAPC scaffold of claim 1, wherein the heavy chain comprises an amino acid sequence having at least 90% sequence identity to the sequence of SEQ ID NO: 1.

15. The aAPC scaffold of claim 1, wherein the heavy chain comprises an amino acid sequence having at least 95% sequence identity to the sequence of SEQ ID NO: 1.

16. The aAPC scaffold of claim 1, wherein the heavy chain comprises an amino acid sequence having at least 98% sequence identity to the sequence of SEQ ID NO: 1.

* * * * *

SEQUENCE LISTING

```
<160> NUMBER OF SEQ ID NOS: 31

<210> SEQ ID NO 1
<211> LENGTH: 275
<212> TYPE: PRT
<213> ORGANISM: Homo sapiens
<220> FEATURE:
<221> NAME/KEY: WT HLA-A 0201 heavy chain w/o TM domain
<222> LOCATION: (1)..(1)

<400> SEQUENCE: 1

Gly Ser His Ser Met Arg Tyr Phe Phe Thr Ser Val Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Gln Arg Met Glu Pro Arg
        35                  40                  45
```

```
Ala Pro Trp Ile Glu Gln Glu Gly Pro Glu Tyr Trp Asp Gly Glu Thr
    50                  55                  60
Arg Lys Val Lys Ala His Ser Gln Thr His Arg Val Asp Leu Gly Thr
 65                  70                  75                  80
Leu Arg Gly Tyr Tyr Asn Gln Ser Glu Ala Gly Ser His Thr Val Gln
                85                  90                  95
Arg Met Tyr Gly Cys Asp Val Gly Ser Asp Trp Arg Phe Leu Arg Gly
            100                 105                 110
Tyr His Gln Tyr Ala Tyr Asp Gly Lys Asp Tyr Ile Ala Leu Lys Glu
        115                 120                 125
Asp Leu Arg Ser Trp Thr Ala Ala Asp Met Ala Ala Gln Thr Thr Lys
    130                 135                 140
His Lys Trp Glu Ala Ala His Val Ala Glu Gln Leu Arg Ala Tyr Leu
145                 150                 155                 160
Glu Gly Thr Cys Val Glu Trp Leu Arg Arg Tyr Leu Glu Asn Gly Lys
                165                 170                 175
Glu Thr Leu Gln Arg Thr Asp Ala Pro Lys Thr His Met Thr His His
            180                 185                 190
Ala Val Ser Asp His Glu Ala Thr Leu Arg Cys Trp Ala Leu Ser Phe
        195                 200                 205
Tyr Pro Ala Glu Ile Thr Leu Thr Trp Gln Arg Asp Gly Glu Asp Gln
    210                 215                 220
Thr Gln Asp Thr Glu Leu Val Glu Thr Arg Pro Ala Gly Asp Gly Thr
225                 230                 235                 240
Phe Gln Lys Trp Ala Ala Val Val Val Pro Ser Gly Gln Glu Gln Arg
                245                 250                 255
Tyr Thr Cys His Val Gln His Glu Gly Leu Pro Lys Pro Leu Thr Leu
            260                 265                 270
Arg Trp Glu
        275

<210> SEQ ID NO 2
<211> LENGTH: 274
<212> TYPE: PRT
<213> ORGANISM: Homo sapiens
<220> FEATURE:
<221> NAME/KEY: Cys-mut HLA-A 0201 heavy chain w/o TM domain
<222> LOCATION: (1)..(1)

<400> SEQUENCE: 2

Gly Ser His Ser Met Arg Tyr Phe Phe Thr Ser Val Ser Arg Pro Gly
 1               5                  10                  15
Arg Gly Glu Pro Arg Phe Ile Ala Val Gly Tyr Val Asp Asp Thr Gln
             20                 25                  30
Phe Val Arg Phe Asp Ser Asp Ala Ala Ser Gln Arg Met Glu Pro Arg
         35                 40                  45
Ala Pro Trp Ile Glu Gln Glu Gly Pro Glu Tyr Trp Asp Gly Glu Thr
     50                 55                  60
Arg Lys Val Lys Ala His Ser Gln Thr His Arg Val Asp Leu Gly Thr
 65                 70                  75                  80
Leu Arg Gly Cys Tyr Asn Gln Ser Glu Ala Gly Ser His Thr Val Gln
                85                  90                  95
Arg Met Tyr Gly Cys Asp Val Gly Ser Asp Trp Arg Phe Leu Arg Gly
            100                 105                 110
Tyr His Gln Tyr Ala Tyr Asp Gly Lys Asp Tyr Ile Ala Leu Lys Glu
        115                 120                 125
```

-continued

Asp Leu Arg Ser Trp Thr Ala Ala Asp Met Cys Ala Gln Thr Thr Lys
130                 135                 140

His Lys Trp Glu Ala Ala His Val Ala Glu Gln Leu Arg Ala Tyr Leu
145                 150                 155                 160

Glu Gly Thr Cys Val Glu Trp Leu Arg Arg Tyr Leu Glu Asn Gly Lys
                165                 170                 175

Glu Thr Leu Gln Arg Thr Asp Ala Pro Lys Thr His Met Thr His His
            180                 185                 190

Ala Val Ser Asp His Glu Ala Thr Leu Arg Cys Trp Ala Leu Ser Phe
        195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Val Pro Ser Gly Gln Glu Gln Arg
                245                 250                 255

Tyr Thr Cys His Val Gln His Glu Gly Leu Pro Lys Pro Leu Thr Leu
            260                 265                 270

Arg Trp

<210> SEQ ID NO 3
<211> LENGTH: 274
<212> TYPE: PRT
<213> ORGANISM: Homo sapiens
<220> FEATURE:
<221> NAME/KEY: Cys-mut HLA-A 0101 heavy chain w/o TM domain
<222> LOCATION: (1)..(1)

<400> SEQUENCE: 3

Gly Ser His Ser Met Arg Tyr Phe Phe Thr Ser Val Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Gln Lys Met Glu Pro Arg
        35                  40                  45

Ala Pro Trp Ile Glu Gln Glu Gly Pro Glu Tyr Trp Asp Gln Glu Thr
    50                  55                  60

Arg Asn Met Lys Ala His Ser Gln Thr Asp Arg Ala Asn Leu Gly Thr
65                  70                  75                  80

Leu Arg Gly Cys Tyr Asn Gln Ser Glu Asp Gly Ser His Thr Ile Gln
                85                  90                  95

Ile Met Tyr Gly Cys Asp Val Gly Pro Asp Gly Arg Phe Leu Arg Gly
            100                 105                 110

Tyr Arg Gln Asp Ala Tyr Asp Gly Lys Asp Tyr Ile Ala Leu Asn Glu
        115                 120                 125

Asp Leu Arg Ser Trp Thr Ala Ala Asp Met Cys Ala Gln Ile Thr Lys
    130                 135                 140

Arg Lys Trp Glu Ala Val His Ala Ala Glu Gln Arg Arg Val Tyr Leu
145                 150                 155                 160

Glu Gly Arg Cys Val Asp Gly Leu Arg Arg Tyr Leu Glu Asn Gly Lys
                165                 170                 175

Glu Thr Leu Gln Arg Thr Asp Pro Pro Lys Thr His Met Thr His His
            180                 185                 190

Pro Ile Ser Asp His Glu Ala Thr Leu Arg Cys Trp Ala Leu Gly Phe
        195                 200                 205

Tyr Pro Ala Glu Ile Thr Leu Thr Trp Gln Arg Asp Gly Glu Asp Gln
        210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Pro Ser Gly Glu Glu Gln Arg
                245                 250                 255

Tyr Thr Cys His Val Gln His Glu Gly Leu Pro Lys Pro Leu Thr Leu
                260                 265                 270

Arg Trp

<210> SEQ ID NO 4
<211> LENGTH: 274
<212> TYPE: PRT
<213> ORGANISM: Homo sapiens
<220> FEATURE:
<221> NAME/KEY: Cys-mut HLA-A 0301 heavy chain w/o TM domain
<222> LOCATION: (1)..(1)

<400> SEQUENCE: 4

Gly Ser His Ser Met Arg Tyr Phe Phe Thr Ser Val Ser Arg Pro Gly
1               5                   10                  15

Arg Gly Glu Pro Arg Phe Ile Ala Val Gly Tyr Val Asp Asp Thr Gln
                20                  25                  30

Phe Val Arg Phe Asp Ser Asp Ala Ala Ser Gln Arg Met Glu Pro Arg
            35                  40                  45

Ala Pro Trp Ile Glu Gln Glu Gly Pro Glu Tyr Trp Asp Gln Glu Thr
        50                  55                  60

Arg Asn Val Lys Ala Gln Ser Gln Thr Asp Arg Val Asp Leu Gly Thr
65                  70                  75                  80

Leu Arg Gly Cys Tyr Asn Gln Ser Glu Ala Gly Ser His Thr Ile Gln
                85                  90                  95

Ile Met Tyr Gly Cys Asp Val Gly Ser Asp Gly Arg Phe Leu Arg Gly
                100                 105                 110

Tyr Arg Gln Asp Ala Tyr Asp Gly Lys Asp Tyr Ile Ala Leu Asn Glu
            115                 120                 125

Asp Leu Arg Ser Trp Thr Ala Ala Asp Met Cys Ala Gln Ile Thr Lys
130                 135                 140

Arg Lys Trp Glu Ala Ala His Glu Ala Glu Gln Leu Arg Ala Tyr Leu
145                 150                 155                 160

Asp Gly Thr Cys Val Glu Trp Leu Arg Arg Tyr Leu Glu Asn Gly Lys
                165                 170                 175

Glu Thr Leu Gln Arg Thr Asp Pro Pro Lys Thr His Met Thr His His
            180                 185                 190

Pro Ile Ser Asp His Glu Ala Thr Leu Arg Cys Trp Ala Leu Gly Phe
        195                 200                 205

Tyr Pro Ala Glu Ile Thr Leu Thr Trp Gln Arg Asp Gly Glu Asp Gln
        210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Pro Ser Gly Glu Glu Gln Arg
                245                 250                 255

Tyr Thr Cys His Val Gln His Glu Gly Leu Pro Lys Pro Leu Thr Leu
                260                 265                 270

Arg Trp

```
<210> SEQ ID NO 5
<211> LENGTH: 274
<212> TYPE: PRT
<213> ORGANISM: Homo sapiens
<220> FEATURE:
<221> NAME/KEY: Cys-mut HLA-A 1101 heavy chain w/o TM domain
<222> LOCATION: (1)..(1)

<400> SEQUENCE: 5

Gly Ser His Ser Met Arg Tyr Phe Tyr Thr Ser Val Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Gln Arg Met Glu Pro Arg
        35                  40                  45

Ala Pro Trp Ile Glu Gln Glu Gly Pro Glu Tyr Trp Asp Gln Glu Thr
    50                  55                  60

Arg Asn Val Lys Ala Gln Ser Gln Thr Asp Arg Val Asp Leu Gly Thr
65                  70                  75                  80

Leu Arg Gly Cys Tyr Asn Gln Ser Glu Asp Gly Ser His Thr Ile Gln
                85                  90                  95

Ile Met Tyr Gly Cys Asp Val Gly Pro Asp Gly Arg Phe Leu Arg Gly
            100                 105                 110

Tyr Arg Gln Asp Ala Tyr Asp Gly Lys Asp Tyr Ile Ala Leu Asn Glu
        115                 120                 125

Asp Leu Arg Ser Trp Thr Ala Ala Asp Met Cys Ala Gln Ile Thr Lys
    130                 135                 140

Arg Lys Trp Glu Ala Ala His Ala Ala Glu Gln Arg Ala Tyr Leu
145                 150                 155                 160

Glu Gly Arg Cys Val Glu Trp Leu Arg Arg Tyr Leu Glu Asn Gly Lys
                165                 170                 175

Glu Thr Leu Gln Arg Thr Asp Pro Pro Lys Thr His Met Thr His His
            180                 185                 190

Pro Ile Ser Asp His Glu Ala Thr Leu Arg Cys Trp Ala Leu Gly Phe
        195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Val Pro Ser Gly Glu Glu Gln Arg
                245                 250                 255

Tyr Thr Cys His Val Gln His Glu Gly Leu Pro Lys Pro Leu Thr Leu
            260                 265                 270

Arg Trp

<210> SEQ ID NO 6
<211> LENGTH: 274
<212> TYPE: PRT
<213> ORGANISM: Homo sapiens
<220> FEATURE:
<221> NAME/KEY: Cys-mut HLA-A 2402 heavy chain w/o TM domain
<222> LOCATION: (1)..(1)

<400> SEQUENCE: 6

Gly Ser His Ser Met Arg Tyr Phe Ser Thr Ser Val Ser Arg Pro Gly
1               5                   10                  15

Arg Gly Glu Pro Arg Phe Ile Ala Val Gly Tyr Val Asp Asp Thr Gln
```

```
                20                  25                  30
Phe Val Arg Phe Asp Ser Asp Ala Ala Ser Gln Arg Met Glu Pro Arg
             35                  40                  45

Ala Pro Trp Ile Glu Gln Glu Gly Pro Glu Tyr Trp Asp Glu Glu Thr
         50                  55                  60

Gly Lys Val Lys Ala His Ser Gln Thr Asp Arg Glu Asn Leu Arg Ile
 65                  70                  75                  80

Ala Leu Arg Cys Tyr Asn Gln Ser Glu Ala Gly Ser His Thr Leu Gln
                 85                  90                  95

Met Met Phe Gly Cys Asp Val Gly Ser Asp Gly Arg Phe Leu Arg Gly
            100                 105                 110

Tyr His Gln Tyr Ala Tyr Asp Gly Lys Asp Tyr Ile Ala Leu Lys Glu
        115                 120                 125

Asp Leu Arg Ser Trp Thr Ala Ala Asp Met Cys Ala Gln Ile Thr Lys
    130                 135                 140

Arg Lys Trp Glu Ala Ala His Val Ala Glu Gln Arg Ala Tyr Leu
145                 150                 155                 160

Glu Gly Thr Cys Val Asp Gly Leu Arg Arg Tyr Leu Glu Asn Gly Lys
                165                 170                 175

Glu Thr Leu Gln Arg Thr Asp Pro Pro Lys Thr His Met Thr His His
            180                 185                 190

Pro Ile Ser Asp His Glu Ala Thr Leu Arg Cys Trp Ala Leu Gly Phe
        195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Val Pro Ser Gly Glu Glu Gln Arg
                245                 250                 255

Tyr Thr Cys His Val Gln His Glu Gly Leu Pro Lys Pro Leu Thr Leu
            260                 265                 270

Arg Trp

<210> SEQ ID NO 7
<211> LENGTH: 274
<212> TYPE: PRT
<213> ORGANISM: Homo sapiens
<220> FEATURE:
<221> NAME/KEY: Cys-mut HLA-B 0702 heavy chain w/o TM domain
<222> LOCATION: (1)..(1)

<400> SEQUENCE: 7

Gly Ser His Ser Met Arg Tyr Phe Tyr Thr Ser Val Ser Arg Pro Gly
  1               5                  10                  15

Arg Gly Glu Pro Arg Phe Ile Ser Val Gly Tyr Val Asp Asp Thr Gln
             20                  25                  30

Phe Val Arg Phe Asp Ser Asp Ala Ala Ser Pro Arg Glu Glu Pro Arg
         35                  40                  45

Ala Pro Trp Ile Glu Gln Glu Gly Pro Glu Tyr Trp Asp Arg Asn Thr
     50                  55                  60

Gln Ile Tyr Lys Ala Gln Ala Gln Thr Asp Arg Glu Ser Leu Arg Asn
 65                  70                  75                  80

Leu Arg Gly Cys Tyr Asn Gln Ser Glu Ala Gly Ser His Thr Leu Gln
                 85                  90                  95

Ser Met Tyr Gly Cys Asp Val Gly Pro Asp Gly Arg Leu Leu Arg Gly
```

```
            100                 105                 110
His Asp Gln Tyr Ala Tyr Asp Gly Lys Asp Tyr Ile Ala Leu Asn Glu
            115                 120                 125

Asp Leu Arg Ser Trp Thr Ala Ala Asp Thr Cys Ala Gln Ile Thr Gln
130                 135                 140

Arg Lys Trp Glu Ala Ala Arg Glu Ala Glu Gln Arg Arg Ala Tyr Leu
145                 150                 155                 160

Glu Gly Glu Cys Val Glu Trp Leu Arg Arg Tyr Leu Glu Asn Gly Lys
                165                 170                 175

Asp Lys Leu Glu Arg Ala Asp Pro Pro Lys Thr His Val Thr His His
            180                 185                 190

Pro Ile Ser Asp His Glu Ala Thr Leu Arg Cys Trp Ala Leu Gly Phe
            195                 200                 205

Tyr Pro Ala Glu Ile Thr Leu Thr Trp Gln Arg Asp Gly Glu Asp Gln
            210                 215                 220

Thr Gln Asp Thr Glu Leu Val Glu Thr Arg Pro Ala Gly Asp Arg Thr
225                 230                 235                 240

Phe Gln Lys Trp Ala Ala Val Val Val Pro Ser Gly Glu Glu Gln Arg
                245                 250                 255

Tyr Thr Cys His Val Gln His Glu Gly Leu Pro Lys Pro Leu Thr Leu
            260                 265                 270

Arg Trp

<210> SEQ ID NO 8
<211> LENGTH: 274
<212> TYPE: PRT
<213> ORGANISM: Homo sapiens
<220> FEATURE:
<221> NAME/KEY: Cys-mut HLA-B 0801 heavy chain w/o TM domain
<222> LOCATION: (1)..(1)

<400> SEQUENCE: 8

Gly Ser His Ser Met Arg Tyr Phe Asp Thr Ala Met Ser Arg Pro Gly
1               5                   10                  15

Arg Gly Glu Pro Arg Phe Ile Ser Val Gly Tyr Val Asp Asp Thr Gln
                20                  25                  30

Phe Val Arg Phe Asp Ser Asp Ala Ala Ser Pro Arg Glu Glu Pro Arg
            35                  40                  45

Ala Pro Trp Ile Glu Gln Glu Gly Pro Glu Tyr Trp Asp Arg Asn Thr
        50                  55                  60

Gln Ile Phe Lys Thr Asn Thr Gln Thr Asp Arg Glu Ser Leu Arg Asn
65                  70                  75                  80

Leu Arg Gly Cys Tyr Asn Gln Ser Glu Ala Gly Ser His Thr Leu Gln
                85                  90                  95

Ser Met Tyr Gly Cys Asp Val Gly Pro Asp Gly Arg Leu Leu Arg Gly
            100                 105                 110

His Asn Gln Tyr Ala Tyr Asp Gly Lys Asp Tyr Ile Ala Leu Asn Glu
            115                 120                 125

Asp Leu Arg Ser Trp Thr Ala Ala Asp Thr Cys Ala Gln Ile Thr Gln
130                 135                 140

Arg Lys Trp Glu Ala Ala Arg Val Ala Glu Gln Asp Arg Ala Tyr Leu
145                 150                 155                 160

Glu Gly Thr Cys Val Glu Trp Leu Arg Arg Tyr Leu Glu Asn Gly Lys
                165                 170                 175

Asp Thr Leu Glu Arg Ala Asp Pro Pro Lys Thr His Val Thr His His
```

```
                    180                 185                 190
Pro Ile Ser Asp His Glu Ala Thr Leu Arg Cys Trp Ala Leu Gly Phe
            195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Arg Thr
225                 230                 235                 240

Phe Gln Lys Trp Ala Ala Val Val Pro Ser Gly Glu Glu Gln Arg
                245                 250                 255

Tyr Thr Cys His Val Gln His Glu Gly Leu Pro Lys Pro Leu Thr Leu
            260                 265                 270

Arg Trp

<210> SEQ ID NO 9
<211> LENGTH: 274
<212> TYPE: PRT
<213> ORGANISM: Homo sapiens
<220> FEATURE:
<221> NAME/KEY: Cys-mut HLA-B 1501 heavy chain w/o TM domain
<222> LOCATION: (1)..(1)

<400> SEQUENCE: 9

Gly Ser His Ser Met Arg Tyr Phe Tyr Thr Ala Met Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Pro Arg Met Ala Pro Arg
        35                  40                  45

Ala Pro Trp Ile Glu Gln Glu Gly Pro Glu Tyr Trp Asp Arg Glu Thr
    50                  55                  60

Gln Ile Ser Lys Thr Asn Thr Gln Thr Tyr Arg Glu Ser Leu Arg Asn
65                  70                  75                  80

Leu Arg Gly Cys Tyr Asn Gln Ser Glu Ala Gly Ser His Thr Leu Gln
                85                  90                  95

Arg Met Tyr Gly Cys Asp Val Gly Pro Asp Gly Arg Leu Leu Arg Gly
            100                 105                 110

His Asp Gln Ser Ala Tyr Asp Gly Lys Asp Tyr Ile Ala Leu Asn Glu
        115                 120                 125

Asp Leu Ser Ser Trp Thr Ala Ala Asp Thr Cys Ala Gln Ile Thr Gln
    130                 135                 140

Arg Lys Trp Glu Ala Ala Arg Glu Ala Glu Gln Trp Arg Ala Tyr Leu
145                 150                 155                 160

Glu Gly Leu Cys Val Glu Trp Leu Arg Arg Tyr Leu Glu Asn Gly Lys
                165                 170                 175

Glu Thr Leu Gln Arg Ala Asp Pro Pro Lys Thr His Val Thr His His
            180                 185                 190

Pro Ile Ser Asp His Glu Ala Thr Leu Arg Cys Trp Ala Leu Gly Phe
        195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Arg Thr
225                 230                 235                 240

Phe Gln Lys Trp Ala Ala Val Val Pro Ser Gly Glu Glu Gln Arg
                245                 250                 255

Tyr Thr Cys His Val Gln His Glu Gly Leu Pro Lys Pro Leu Thr Leu
```

```
<210> SEQ ID NO 10
<211> LENGTH: 274
<212> TYPE: PRT
<213> ORGANISM: Homo sapiens
<220> FEATURE:
<221> NAME/KEY: Cys-mut HLA-B 3501 heavy chain w/o TM domain
<222> LOCATION: (1)..(1)

<400> SEQUENCE: 10
```

Gly Ser His Ser Met Arg Tyr Phe Tyr Thr Ala Met Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Pro Arg Thr Glu Pro Arg
        35                  40                  45

Ala Pro Trp Ile Glu Gln Glu Gly Pro Glu Tyr Trp Asp Arg Asn Thr
    50                  55                  60

Gln Ile Phe Lys Thr Asn Thr Gln Thr Tyr Arg Glu Ser Leu Arg Asn
65                  70                  75                  80

Leu Arg Gly Cys Tyr Asn Gln Ser Glu Ala Gly Ser His Ile Ile Gln
                85                  90                  95

Arg Met Tyr Gly Cys Asp Leu Gly Pro Asp Gly Arg Leu Leu Arg Gly
            100                 105                 110

His Asp Gln Ser Ala Tyr Asp Gly Lys Asp Tyr Ile Ala Leu Asn Glu
        115                 120                 125

Asp Leu Ser Ser Trp Thr Ala Ala Asp Thr Cys Ala Gln Ile Thr Gln
    130                 135                 140

Arg Lys Trp Glu Ala Ala Arg Val Ala Glu Gln Leu Arg Ala Tyr Leu
145                 150                 155                 160

Glu Gly Leu Cys Val Glu Trp Leu Arg Arg Tyr Leu Glu Asn Gly Lys
                165                 170                 175

Glu Thr Leu Gln Arg Ala Asp Pro Pro Lys Thr His Val Thr His His
            180                 185                 190

Pro Val Ser Asp His Glu Ala Thr Leu Arg Cys Trp Ala Leu Gly Phe
        195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Arg Thr
225                 230                 235                 240

Phe Gln Lys Trp Ala Ala Val Val Val Pro Ser Gly Glu Glu Gln Arg
                245                 250                 255

Tyr Thr Cys His Val Gln His Glu Gly Leu Pro Lys Pro Leu Thr Leu
            260                 265                 270

Arg Trp

```
<210> SEQ ID NO 11
<211> LENGTH: 274
<212> TYPE: PRT
<213> ORGANISM: Homo sapiens
<220> FEATURE:
<221> NAME/KEY: Cys-mut HLA-B 4402 heavy chain w/o TM domain
<222> LOCATION: (1)..(1)

<400> SEQUENCE: 11
```

```
Gly Ser His Ser Met Arg Tyr Phe Tyr Thr Ala Met Ser Arg Pro Gly
1               5                   10                  15

Arg Gly Glu Pro Arg Phe Ile Thr Val Gly Tyr Val Asp Asp Thr Leu
            20                  25                  30

Phe Val Arg Phe Asp Ser Asp Ala Thr Ser Pro Arg Lys Glu Pro Arg
        35                  40                  45

Ala Pro Trp Ile Glu Gln Gly Pro Glu Tyr Trp Asp Arg Glu Thr
50                  55                  60

Gln Ile Ser Lys Thr Asn Thr Gln Thr Tyr Arg Glu Asn Leu Arg Thr
65                  70                  75                  80

Ala Leu Arg Cys Tyr Asn Gln Ser Glu Ala Gly Ser His Ile Ile Gln
                85                  90                  95

Arg Met Tyr Gly Cys Asp Val Gly Pro Asp Gly Arg Leu Leu Arg Gly
            100                 105                 110

Tyr Asp Gln Asp Ala Tyr Asp Gly Lys Asp Tyr Ile Ala Leu Asn Glu
        115                 120                 125

Asp Leu Ser Ser Trp Thr Ala Ala Asp Thr Cys Ala Gln Ile Thr Gln
130                 135                 140

Arg Lys Trp Glu Ala Ala Arg Val Ala Glu Gln Asp Arg Ala Tyr Leu
145                 150                 155                 160

Glu Gly Leu Cys Val Glu Ser Leu Arg Arg Tyr Leu Glu Asn Gly Lys
                165                 170                 175

Glu Thr Leu Gln Arg Ala Asp Pro Pro Lys Thr His Val Thr His His
            180                 185                 190

Pro Ile Ser Asp His Glu Val Thr Leu Arg Cys Trp Ala Leu Gly Phe
        195                 200                 205

Tyr Pro Ala Glu Ile Thr Leu Thr Trp Gln Arg Asp Gly Glu Asp Gln
210                 215                 220

Thr Gln Asp Thr Glu Leu Val Glu Thr Arg Pro Ala Gly Asp Arg Thr
225                 230                 235                 240

Phe Gln Lys Trp Ala Ala Val Val Val Pro Ser Gly Glu Glu Gln Arg
                245                 250                 255

Tyr Thr Cys His Val Gln His Glu Gly Leu Pro Lys Pro Leu Thr Leu
            260                 265                 270

Arg Trp

<210> SEQ ID NO 12
<211> LENGTH: 274
<212> TYPE: PRT
<213> ORGANISM: Mus musculus
<220> FEATURE:
<221> NAME/KEY: Cys-mut H-2Kb heavy chain w/o TM domain
<222> LOCATION: (1)..(1)

<400> SEQUENCE: 12

Gly Pro His Ser Leu Arg Tyr Phe Val Thr Ala Val Ser Arg Pro Gly
1               5                   10                  15

Leu Gly Glu Pro Arg Tyr Met Glu Val Gly Tyr Val Asp Asp Thr Glu
            20                  25                  30

Phe Val Arg Phe Asp Ser Asp Ala Glu Asn Pro Arg Tyr Glu Pro Arg
        35                  40                  45

Ala Arg Trp Met Glu Gln Glu Gly Pro Glu Tyr Trp Glu Arg Glu Thr
50                  55                  60

Gln Lys Ala Lys Gly Asn Glu Gln Ser Phe Arg Val Asp Leu Arg Thr
65                  70                  75                  80
```

Leu Leu Gly Cys Tyr Asn Gln Ser Lys Gly Ser His Thr Ile Gln
                85                  90                  95

Val Ile Ser Gly Cys Glu Val Gly Ser Asp Gly Arg Leu Leu Arg Gly
            100                 105                 110

Tyr Gln Gln Tyr Ala Tyr Asp Gly Cys Asp Tyr Ile Ala Leu Asn Glu
            115                 120                 125

Asp Leu Lys Thr Trp Thr Ala Ala Asp Met Cys Ala Leu Ile Thr Lys
130                 135                 140

His Lys Trp Glu Gln Ala Gly Glu Ala Glu Arg Leu Arg Ala Tyr Leu
145                 150                 155                 160

Glu Gly Thr Cys Val Glu Trp Leu Arg Arg Tyr Leu Lys Asn Gly Asn
                165                 170                 175

Ala Thr Leu Leu Arg Thr Asp Ser Pro Lys Ala His Val Thr His His
            180                 185                 190

Ser Arg Pro Glu Asp Lys Val Thr Leu Arg Cys Trp Ala Leu Gly Phe
            195                 200                 205

Tyr Pro Ala Asp Ile Thr Leu Thr Trp Gln Leu Asn Gly Glu Glu Leu
            210                 215                 220

Ile Gln Asp Met Glu Leu Val Glu Thr Arg Pro Ala Gly Asp Gly Thr
225                 230                 235                 240

Phe Gln Lys Trp Ala Ser Val Val Pro Leu Gly Lys Glu Gln Tyr
                245                 250                 255

Tyr Thr Cys His Val Tyr His Gln Gly Leu Pro Glu Pro Leu Thr Leu
            260                 265                 270

Arg Trp

<210> SEQ ID NO 13
<211> LENGTH: 274
<212> TYPE: PRT
<213> ORGANISM: Mus musculus
<220> FEATURE:
<221> NAME/KEY: Cys-mut H-2Db heavy chain w/o TM domain
<222> LOCATION: (1)..(1)

<400> SEQUENCE: 13

Gly Pro His Ser Met Arg Tyr Phe Glu Thr Ala Val Ser Arg Pro Gly
1               5                   10                  15

Leu Glu Glu Pro Arg Tyr Ile Ser Val Gly Tyr Val Asp Asn Lys Glu
                20                  25                  30

Phe Val Arg Phe Asp Ser Asp Ala Glu Asn Pro Arg Tyr Glu Pro Arg
            35                  40                  45

Ala Pro Trp Met Glu Gln Glu Gly Pro Glu Tyr Trp Glu Arg Glu Thr
50                  55                  60

Gln Lys Ala Lys Gly Gln Glu Gln Trp Phe Arg Val Ser Leu Arg Asn
65                  70                  75                  80

Leu Leu Gly Cys Tyr Asn Gln Ser Ala Gly Gly Ser His Thr Leu Gln
                85                  90                  95

Gln Met Ser Gly Cys Asp Leu Gly Ser Asp Trp Arg Leu Leu Arg Gly
            100                 105                 110

Tyr Leu Gln Phe Ala Tyr Glu Gly Arg Asp Tyr Ile Ala Leu Asn Glu
            115                 120                 125

Asp Leu Lys Thr Trp Thr Ala Ala Asp Met Cys Ala Gln Ile Thr Arg
130                 135                 140

Arg Lys Trp Glu Gln Ser Gly Ala Ala Glu His Tyr Lys Ala Tyr Leu
145                 150                 155                 160

```
Glu Gly Glu Cys Val Glu Trp Leu His Arg Tyr Leu Lys Asn Gly Asn
            165                 170                 175

Ala Thr Leu Leu Arg Thr Asp Ser Pro Lys Ala His Val Thr His His
        180                 185                 190

Pro Arg Ser Lys Gly Glu Val Thr Leu Arg Cys Trp Ala Leu Gly Phe
            195                 200                 205

Tyr Pro Ala Asp Ile Thr Leu Thr Trp Gln Leu Asn Gly Glu Glu Leu
        210                 215                 220

Thr Gln Asp Met Glu Leu Val Glu Thr Arg Pro Ala Gly Asp Gly Thr
225                 230                 235                 240

Phe Gln Lys Trp Ala Ser Val Val Val Pro Leu Gly Lys Glu Gln Asn
            245                 250                 255

Tyr Thr Cys Arg Val Tyr His Glu Gly Leu Pro Glu Pro Leu Thr Leu
            260                 265                 270

Arg Trp

<210> SEQ ID NO 14
<211> LENGTH: 291
<212> TYPE: PRT
<213> ORGANISM: Homo sapiens
<220> FEATURE:
<221> NAME/KEY: Cys-mut HLA-A 0201 heavy chain + Avi-tag w/o TM domain
<222> LOCATION: (1)..(1)

<400> SEQUENCE: 14

Gly Ser His Ser Met Arg Tyr Phe Phe Thr Ser Val Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Gln Arg Met Glu Pro Arg
        35                  40                  45

Ala Pro Trp Ile Glu Gln Glu Gly Pro Glu Tyr Trp Asp Gly Glu Thr
    50                  55                  60

Arg Lys Val Lys Ala His Ser Gln Thr His Arg Val Asp Leu Gly Thr
65                  70                  75                  80

Leu Arg Gly Cys Tyr Asn Gln Ser Glu Ala Gly Ser His Thr Val Gln
                85                  90                  95

Arg Met Tyr Gly Cys Asp Val Gly Ser Asp Trp Arg Phe Leu Arg Gly
            100                 105                 110

Tyr His Gln Tyr Ala Tyr Asp Gly Lys Asp Tyr Ile Ala Leu Lys Glu
        115                 120                 125

Asp Leu Arg Ser Trp Thr Ala Ala Asp Met Cys Ala Gln Thr Thr Lys
    130                 135                 140

His Lys Trp Glu Ala Ala His Val Ala Glu Gln Leu Arg Ala Tyr Leu
145                 150                 155                 160

Glu Gly Thr Cys Val Glu Trp Leu Arg Arg Tyr Leu Glu Asn Gly Lys
                165                 170                 175

Glu Thr Leu Gln Arg Thr Asp Ala Pro Lys Thr His Met Thr His His
            180                 185                 190

Ala Val Ser Asp His Glu Ala Thr Leu Arg Cys Trp Ala Leu Ser Phe
        195                 200                 205

Tyr Pro Ala Glu Ile Thr Leu Thr Trp Gln Arg Asp Gly Glu Asp Gln
    210                 215                 220

Thr Gln Asp Thr Glu Leu Val Glu Thr Arg Pro Ala Gly Asp Gly Thr
225                 230                 235                 240
```

```
Phe Gln Lys Trp Ala Ala Val Val Pro Ser Gly Gln Glu Gln Arg
                245                 250                 255

Tyr Thr Cys His Val Gln His Glu Gly Leu Pro Lys Pro Leu Thr Leu
            260                 265                 270

Arg Trp Ala Ser Gly Leu Asn Asp Ile Phe Glu Ala Gln Lys Ile Glu
        275                 280                 285

Trp His Glu
    290
```

```
<210> SEQ ID NO 15
<211> LENGTH: 98
<212> TYPE: PRT
<213> ORGANISM: Homo sapiens
<220> FEATURE:
<221> NAME/KEY: Beta-2 microglobulin (B2M)
<222> LOCATION: (1)..(1)

<400> SEQUENCE: 15
```

```
Gln Arg Thr Pro Lys Ile Gln Val Tyr Ser Arg His Pro Ala Glu Asn
1               5                   10                  15

Gly Lys Ser Asn Phe Leu Asn Cys Tyr Val Ser Gly Phe His Pro Ser
            20                  25                  30

Asp Ile Glu Val Asp Leu Leu Lys Asn Gly Glu Arg Ile Glu Lys Val
        35                  40                  45

Glu His Ser Asp Leu Ser Phe Ser Lys Asp Trp Ser Phe Tyr Leu Leu
    50                  55                  60

Tyr Tyr Thr Glu Phe Thr Pro Thr Glu Lys Asp Glu Tyr Ala Cys Arg
65                  70                  75                  80

Val Asn His Val Thr Leu Ser Gln Pro Lys Ile Val Lys Trp Asp Arg
                85                  90                  95

Asp Met
```

```
<210> SEQ ID NO 16
<211> LENGTH: 387
<212> TYPE: PRT
<213> ORGANISM: Homo sapiens
<220> FEATURE:
<221> NAME/KEY: Cys-mut HLA-A 0201 B2M + linker + heavy chain fusion w/o
    TM domain
<222> LOCATION: (1)..(1)

<400> SEQUENCE: 16
```

```
Gln Arg Thr Pro Lys Ile Gln Val Tyr Ser Arg His Pro Ala Glu Asn
1               5                   10                  15

Gly Lys Ser Asn Phe Leu Asn Cys Tyr Val Ser Gly Phe His Pro Ser
            20                  25                  30

Asp Ile Glu Val Asp Leu Leu Lys Asn Gly Glu Arg Ile Glu Lys Val
        35                  40                  45

Glu His Ser Asp Leu Ser Phe Ser Lys Asp Trp Ser Phe Tyr Leu Leu
    50                  55                  60

Tyr Tyr Thr Glu Phe Thr Pro Thr Glu Lys Asp Glu Tyr Ala Cys Arg
65                  70                  75                  80

Val Asn His Val Thr Leu Ser Gln Pro Lys Ile Val Lys Trp Asp Arg
                85                  90                  95

Asp Met Gly Gly Gly Gly Ser Gly Gly Gly Gly Ser Gly Gly Gly Gly
                100                 105                 110

Ser Gly Ser His Ser Met Arg Tyr Phe Phe Thr Ser Val Ser Arg Pro
        115                 120                 125
```

Gly Arg Gly Glu Pro Arg Phe Ile Ala Val Gly Tyr Val Asp Asp Thr
130                 135                 140

Gln Phe Val Arg Phe Asp Ser Asp Ala Ala Ser Gln Arg Met Glu Pro
145                 150                 155                 160

Arg Ala Pro Trp Ile Glu Gln Glu Gly Pro Glu Tyr Trp Asp Gly Glu
                165                 170                 175

Thr Arg Lys Val Lys Ala His Ser Gln Thr His Arg Val Asp Leu Gly
                180                 185                 190

Thr Leu Arg Gly Cys Tyr Asn Gln Ser Glu Ala Gly Ser His Thr Val
            195                 200                 205

Gln Arg Met Tyr Gly Cys Asp Val Gly Ser Asp Trp Arg Phe Leu Arg
210                 215                 220

Gly Tyr His Gln Tyr Ala Tyr Asp Gly Lys Asp Tyr Ile Ala Leu Lys
225                 230                 235                 240

Glu Asp Leu Arg Ser Trp Thr Ala Ala Asp Met Cys Ala Gln Thr Thr
                245                 250                 255

Lys His Lys Trp Glu Ala Ala His Val Ala Glu Gln Leu Arg Ala Tyr
            260                 265                 270

Leu Glu Gly Thr Cys Val Glu Trp Leu Arg Arg Tyr Leu Glu Asn Gly
        275                 280                 285

Lys Glu Thr Leu Gln Arg Thr Asp Ala Pro Lys Thr His Met Thr His
290                 295                 300

His Ala Val Ser Asp His Glu Ala Thr Leu Arg Cys Trp Ala Leu Ser
305                 310                 315                 320

Phe Tyr Pro Ala Glu Ile Thr Leu Thr Trp Gln Arg Asp Gly Glu Asp
                325                 330                 335

Gln Thr Gln Asp Thr Glu Leu Val Glu Thr Arg Pro Ala Gly Asp Gly
                340                 345                 350

Thr Phe Gln Lys Trp Ala Ala Val Val Val Pro Ser Gly Gln Glu Gln
            355                 360                 365

Arg Tyr Thr Cys His Val Gln His Glu Gly Leu Pro Lys Pro Leu Thr
        370                 375                 380

Leu Arg Trp
385

<210> SEQ ID NO 17
<211> LENGTH: 291
<212> TYPE: PRT
<213> ORGANISM: Homo sapiens
<220> FEATURE:
<221> NAME/KEY: WT HLA-A 0201 heavy chain + Avi-tag w/o TM domain
<222> LOCATION: (1)..(1)

<400> SEQUENCE: 17

Gly Ser His Ser Met Arg Tyr Phe Phe Thr Ser Val Ser Arg Pro Gly
1               5                   10                  15

Arg Gly Glu Pro Arg Phe Ile Ala Val Gly Tyr Val Asp Asp Thr Gln
                20                  25                  30

Phe Val Arg Phe Asp Ser Asp Ala Ala Ser Gln Arg Met Glu Pro Arg
            35                  40                  45

Ala Pro Trp Ile Glu Gln Glu Gly Pro Glu Tyr Trp Asp Gly Glu Thr
        50                  55                  60

Arg Lys Val Lys Ala His Ser Gln Thr His Arg Val Asp Leu Gly Thr
65                  70                  75                  80

Leu Arg Gly Tyr Tyr Asn Gln Ser Glu Ala Gly Ser His Thr Val Gln
                85                  90                  95

-continued

```
Arg Met Tyr Gly Cys Asp Val Gly Ser Asp Trp Arg Phe Leu Arg Gly
                100                 105                 110

Tyr His Gln Tyr Ala Tyr Asp Gly Lys Asp Tyr Ile Ala Leu Lys Glu
            115                 120                 125

Asp Leu Arg Ser Trp Thr Ala Ala Asp Met Ala Ala Gln Thr Thr Lys
130                 135                 140

His Lys Trp Glu Ala Ala His Val Ala Glu Gln Leu Arg Ala Tyr Leu
145                 150                 155                 160

Glu Gly Thr Cys Val Glu Trp Leu Arg Arg Tyr Leu Glu Asn Gly Lys
                165                 170                 175

Glu Thr Leu Gln Arg Thr Asp Ala Pro Lys Thr His Met Thr His His
            180                 185                 190

Ala Val Ser Asp His Glu Ala Thr Leu Arg Cys Trp Ala Leu Ser Phe
        195                 200                 205

Tyr Pro Ala Glu Ile Thr Leu Thr Trp Gln Arg Asp Gly Glu Asp Gln
210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Val Pro Ser Gly Gln Glu Gln Arg
                245                 250                 255

Tyr Thr Cys His Val Gln His Glu Gly Leu Pro Lys Pro Leu Thr Leu
            260                 265                 270

Arg Trp Glu Ala Ser Gly Leu Asn Asp Ile Phe Glu Ala Gln Lys Ile
        275                 280                 285

Glu Trp His
    290

<210> SEQ ID NO 18
<211> LENGTH: 404
<212> TYPE: PRT
<213> ORGANISM: Homo sapiens
<220> FEATURE:
<221> NAME/KEY: Cys-mut HLA-A 0201 B2M + linker + heavy chain + Avi-tag
        w/o TM
<222> LOCATION: (1)..(1)

<400> SEQUENCE: 18

Gln Arg Thr Pro Lys Ile Gln Val Tyr Ser Arg His Pro Ala Glu Asn
1               5                   10                  15

Gly Lys Ser Asn Phe Leu Asn Cys Tyr Val Ser Gly Phe His Pro Ser
            20                  25                  30

Asp Ile Glu Val Asp Leu Leu Lys Asn Gly Glu Arg Ile Glu Lys Val
        35                  40                  45

Glu His Ser Asp Leu Ser Phe Ser Lys Asp Trp Ser Phe Tyr Leu Leu
    50                  55                  60

Tyr Tyr Thr Glu Phe Thr Pro Thr Glu Lys Asp Glu Tyr Ala Cys Arg
65                  70                  75                  80

Val Asn His Val Thr Leu Ser Gln Pro Lys Ile Val Lys Trp Asp Arg
                85                  90                  95

Asp Met Gly Gly Gly Gly Ser Gly Gly Gly Gly Ser Gly Gly Gly Gly
            100                 105                 110

Ser Gly Ser His Ser Met Arg Tyr Phe Phe Thr Ser Val Ser Arg Pro
        115                 120                 125

Gly Arg Gly Glu Pro Arg Phe Ile Ala Val Gly Tyr Val Asp Asp Thr
130                 135                 140
```

```
Gln Phe Val Arg Phe Asp Ser Asp Ala Ala Ser Gln Arg Met Glu Pro
145                 150                 155                 160

Arg Ala Pro Trp Ile Glu Gln Glu Gly Pro Glu Tyr Trp Asp Gly Glu
                165                 170                 175

Thr Arg Lys Val Lys Ala His Ser Gln Thr His Arg Val Asp Leu Gly
            180                 185                 190

Thr Leu Arg Gly Cys Tyr Asn Gln Ser Glu Ala Gly Ser His Thr Val
        195                 200                 205

Gln Arg Met Tyr Gly Cys Asp Val Gly Ser Asp Trp Arg Phe Leu Arg
    210                 215                 220

Gly Tyr His Gln Tyr Ala Tyr Asp Gly Lys Asp Tyr Ile Ala Leu Lys
225                 230                 235                 240

Glu Asp Leu Arg Ser Trp Thr Ala Ala Asp Met Cys Ala Gln Thr Thr
                245                 250                 255

Lys His Lys Trp Glu Ala Ala His Val Ala Glu Gln Leu Arg Ala Tyr
            260                 265                 270

Leu Glu Gly Thr Cys Val Glu Trp Leu Arg Arg Tyr Leu Glu Asn Gly
        275                 280                 285

Lys Glu Thr Leu Gln Arg Thr Asp Ala Pro Lys Thr His Met Thr His
290                 295                 300

His Ala Val Ser Asp His Glu Ala Thr Leu Arg Cys Trp Ala Leu Ser
305                 310                 315                 320

Phe Tyr Pro Ala Glu Ile Thr Leu Thr Trp Gln Arg Asp Gly Glu Asp
                325                 330                 335

Gln Thr Gln Asp Thr Glu Leu Val Glu Thr Arg Pro Ala Gly Asp Gly
            340                 345                 350

Thr Phe Gln Lys Trp Ala Ala Val Val Val Pro Ser Gly Gln Glu Gln
        355                 360                 365

Arg Tyr Thr Cys His Val Gln His Glu Gly Leu Pro Lys Pro Leu Thr
    370                 375                 380

Leu Arg Trp Ala Ser Gly Leu Asn Asp Ile Phe Glu Ala Gln Lys Ile
385                 390                 395                 400

Glu Trp His Glu

<210> SEQ ID NO 19
<211> LENGTH: 17
<212> TYPE: PRT
<213> ORGANISM: Artificial sequence
<220> FEATURE:
<223> OTHER INFORMATION: Avi-tag for biotinylation
<220> FEATURE:
<221> NAME/KEY: Avi-tag
<222> LOCATION: (1)..(1)

<400> SEQUENCE: 19

Ala Ser Gly Leu Asn Asp Ile Phe Glu Ala Gln Lys Ile Glu Trp His
1               5                   10                  15

Glu

<210> SEQ ID NO 20
<211> LENGTH: 9
<212> TYPE: PRT
<213> ORGANISM: Influenza virus
<220> FEATURE:
<221> NAME/KEY: FLU MP 58-66 GIL
<222> LOCATION: (1)..(1)

<400> SEQUENCE: 20
```

Gly Ile Leu Gly Phe Val Phe Thr Leu
1               5

<210> SEQ ID NO 21
<211> LENGTH: 9
<212> TYPE: PRT
<213> ORGANISM: Epstein-Barr virus
<220> FEATURE:
<221> NAME/KEY: EBV BMF1 GLC
<222> LOCATION: (1)..(1)

<400> SEQUENCE: 21

Gly Leu Cys Thr Leu Val Ala Met Leu
1               5

<210> SEQ ID NO 22
<211> LENGTH: 9
<212> TYPE: PRT
<213> ORGANISM: Cytomegalovirus
<220> FEATURE:
<221> NAME/KEY: CMV pp65 NLV
<222> LOCATION: (1)..(1)

<400> SEQUENCE: 22

Asn Leu Val Pro Met Val Ala Thr Val
1               5

<210> SEQ ID NO 23
<211> LENGTH: 9
<212> TYPE: PRT
<213> ORGANISM: Human immunodeficiency virus
<220> FEATURE:
<221> NAME/KEY: HIV Pol (C20)
<222> LOCATION: (1)..(1)

<400> SEQUENCE: 23

Ile Leu Lys Glu Pro Val His Gly Val
1               5

<210> SEQ ID NO 24
<211> LENGTH: 9
<212> TYPE: PRT
<213> ORGANISM: Artificial sequence
<220> FEATURE:
<223> OTHER INFORMATION: UV-labile peptide
<220> FEATURE:
<221> NAME/KEY: SITE
<222> LOCATION: (8)..(8)
<223> OTHER INFORMATION: Xaa refers to a UV sensitive amino acid,
      3-amino-2-(2-nitrophenyl) propionic acid

<400> SEQUENCE: 24

Lys Ile Leu Gly Phe Val Phe Xaa Val
1               5

<210> SEQ ID NO 25
<211> LENGTH: 9
<212> TYPE: PRT
<213> ORGANISM: Epstein-Barr virus
<220> FEATURE:
<221> NAME/KEY: EBV LMP2 CLG
<222> LOCATION: (1)..(1)

<400> SEQUENCE: 25

Cys Leu Gly Gly Leu Leu Thr Met Val
1               5

<210> SEQ ID NO 26

```
<211> LENGTH: 9
<212> TYPE: PRT
<213> ORGANISM: Epstein-Barr virus
<220> FEATURE:
<221> NAME/KEY: EBV LMP2 FLY
<222> LOCATION: (1)..(1)

<400> SEQUENCE: 26

Phe Leu Tyr Ala Leu Ala Leu Leu Leu
1               5

<210> SEQ ID NO 27
<211> LENGTH: 9
<212> TYPE: PRT
<213> ORGANISM: Epstein-Barr virus
<220> FEATURE:
<221> NAME/KEY: EBV BRLF1 YVL
<222> LOCATION: (1)..(1)

<400> SEQUENCE: 27

Tyr Val Leu Asp His Leu Ile Val Val
1               5

<210> SEQ ID NO 28
<211> LENGTH: 9
<212> TYPE: PRT
<213> ORGANISM: Cytomegalovirus
<220> FEATURE:
<221> NAME/KEY: CMV IE1 VLE
<222> LOCATION: (1)..(1)

<400> SEQUENCE: 28

Val Leu Glu Glu Thr Ser Val Met Leu
1               5

<210> SEQ ID NO 29
<211> LENGTH: 9
<212> TYPE: PRT
<213> ORGANISM: Influenza virus
<220> FEATURE:
<221> NAME/KEY: FLU BP-VSD
<222> LOCATION: (1)..(1)

<400> SEQUENCE: 29

Val Ser Asp Gly Gly Pro Asn Leu Tyr
1               5

<210> SEQ ID NO 30
<211> LENGTH: 11
<212> TYPE: PRT
<213> ORGANISM: Cytomegalovirus
<220> FEATURE:
<221> NAME/KEY: CMV pp65
<222> LOCATION: (1)..(1)

<400> SEQUENCE: 30

Tyr Ser Glu His Pro Thr Phe Thr Ser Gln Tyr
1               5                   10
```

```
<210> SEQ ID NO 31
<211> LENGTH: 9
<212> TYPE: PRT
<213> ORGANISM: Artificial sequence
<220> FEATURE:
<223> OTHER INFORMATION: UV-labile peptide
<220> FEATURE:
<221> NAME/KEY: SITE
<222> LOCATION: (6)..(6)
<223> OTHER INFORMATION: Xaa refers to a UV sensitive amino acid,
      3-amino-2-(2-nitrophenyl) propionic acid

<400> SEQUENCE: 31

Ser Thr Ala Pro Gly Xaa Leu Glu Tyr
1               5
```